US011913164B2

(12) United States Patent
Netravali et al.

(10) Patent No.: US 11,913,164 B2
(45) Date of Patent: Feb. 27, 2024

(54) MODIFIED CELLULOSIC COMPOSITIONS HAVING INCREASED HYDROPHOBICITY AND PROCESSES FOR THEIR PRODUCTION

(71) Applicant: CORNELL UNIVERSITY, Ithaca, NY (US)

(72) Inventors: Anil N. Netravali, Ithaca, NY (US); Yidong Zhong, Pembroke Pines, FL (US); Namrata V. Patil, Sunnyvale, CA (US)

(73) Assignee: CORNELL UNIVERSITY, Ithaca, NY (US)

(*) Notice: Subject to any disclaimer, the term of this patent is extended or adjusted under 35 U.S.C. 154(b) by 0 days.

(21) Appl. No.: 17/739,970

(22) Filed: May 9, 2022

(65) Prior Publication Data

US 2022/0364301 A1 Nov. 17, 2022

Related U.S. Application Data

(60) Division of application No. 15/832,725, filed on Dec. 5, 2017, now Pat. No. 11,326,303, which is a continuation-in-part of application No. PCT/US2016/036098, filed on Jun. 6, 2016.

(60) Provisional application No. 62/171,371, filed on Jun. 5, 2015.

(51) Int. Cl.
D06M 13/513 (2006.01)
D06M 13/325 (2006.01)
D06M 13/184 (2006.01)
D06M 11/79 (2006.01)
C08B 15/05 (2006.01)
C08B 15/10 (2006.01)
D06M 13/188 (2006.01)
D06M 10/00 (2006.01)
D06M 10/08 (2006.01)
D06M 101/06 (2006.01)

(52) U.S. Cl.
CPC ........... D06M 13/513 (2013.01); C08B 15/05 (2013.01); C08B 15/10 (2013.01); D06M 11/79 (2013.01); D06M 13/184 (2013.01); D06M 13/188 (2013.01); D06M 13/325 (2013.01); *D06M 10/003* (2013.01); *D06M 10/08* (2013.01); *D06M 2101/06* (2013.01); *D06M 2200/12* (2013.01); *D06M 2400/01* (2013.01)

(58) Field of Classification Search
CPC ............ D06M 13/513; D06M 13/325; D06M 13/184; D06M 13/188; D06M 11/79; D06M 10/08; D06M 10/003; D06M 2101/06; D06M 2200/12; D06M 2400/01; C08B 15/05; C08B 15/10
See application file for complete search history.

(56) References Cited

U.S. PATENT DOCUMENTS

| 2,734,005 | A | 2/1956 | Novak et al. |
| 3,840,382 | A | 10/1974 | Burke |
| 6,342,268 | B1 | 1/2002 | Samain |
| 8,202,614 | B2 | 6/2012 | Koene et al. |
| 2007/0020398 | A1 | 1/2007 | Lai et al. |
| 2007/0298216 | A1 | 12/2007 | Jing |
| 2010/0009188 | A1 | 1/2010 | Xin |
| 2010/0086604 | A1 | 4/2010 | Stellacci |
| 2011/0287245 | A1 | 11/2011 | Shamei et al. |
| 2014/0373757 | A1 | 12/2014 | Schoelkopf |

FOREIGN PATENT DOCUMENTS

| CN | 101768856 | * | 7/2010 | ............ D06M 11/79 |
| CN | 101768856 | A | 7/2010 | |
| CN | 201648821 | U | 11/2010 | |
| CN | 102465452 | A | 5/2012 | |
| CN | 103015179 | A | 4/2013 | |
| CN | 103334200 | A | 10/2013 | |
| CN | 103938432 | A | 7/2014 | |
| CN | 103343446 | B | 5/2015 | |
| CN | 104594028 | A | 5/2015 | |
| CN | 104687593 | A | 6/2015 | |
| EP | 2990527 | B1 | 2/2018 | |
| FR | 2984343 | A1 | 6/2013 | |

(Continued)

OTHER PUBLICATIONS

Zhou et al. Mechanism of Crosslinking of Papers with Polyfunctional Carboxylic Acids. Journal of Applied Polymer Sciences, vol. 58, 1523-1534 (1995).*
Lee et al. (Fabrication of Superhydrophobic Surface on a Cellulose-based Material via Chemical Modification, Bull. Korean Chem. Soc. 2014, vol. 35, No. 5, 1545).*
Hoefnagels et al., "Biomimetic Superhydrophobic and Highly Oleophobic Cotton Textiles," Langmuir, 23(26):13158-13163 (2007) (Abstract Only).
Joshi et al., "Nanostructured coatings for super hydrophobic textiles," Bulletin Mater Sci 35(6):933-938 (2012) (Abstract Only).

(Continued)

*Primary Examiner* — Amina S Khan
(74) *Attorney, Agent, or Firm* — FisherBroyles, LLP; Andrew K. Gonsalves

(57) ABSTRACT

The disclosure provides a composition comprising a modified cellulosic surface having aliphatic fatty acid molecules and amine-silica particles that are covalently bonded to cellulose fibers of the cellulosic surface. Also disclosed is a composition comprising a modified cellulosic surface including low surface energy molecules and amine functionalized nanotubes decorated with silica nanoparticles that are covalently bonded to cellulose fibers of the cellulosic surface. Also disclosed is a process for increasing hydrophobicity of a cellulosic surface. Also disclosed is a process for increasing hydrophobicity and surface roughness of a cellulosic surface. Also disclosed are products comprising the compositions and modified cellulosic surfaces of the present invention.

17 Claims, 30 Drawing Sheets

(56) References Cited

FOREIGN PATENT DOCUMENTS

| | | | |
|---|---|---|---|
| GB | 596154 A | 12/1947 | |
| KR | 200458615 Y1 | 6/2012 | |
| WO | WO 2005/071161 * | 8/2005 | ............ D21H 17/03 |
| WO | 2008045022 A2 | 4/2008 | |
| WO | 2010102882 A2 | 9/2010 | |
| WO | 2012089929 A1 | 7/2012 | |
| WO | 2014191901 A1 | 12/2014 | |
| WO | 2015083627 A1 | 6/2015 | |

OTHER PUBLICATIONS

Maleknnia et al., "Synthesis Super Hydrophobic Nano Silica for Application on Cotton Fabric," NanoCon 2013 (Oct. 16-18, 2013).
Song et al., "Approaching Super-Hydrophobicity from Cellulosic Materials: A Review," Nordic Pulp & Paper Research Journal, 28:216-238 (2013).
Xue et al., "Superhydrophoic Cotton Fabrics Prepared by Sol-Gel Coating of TiO2 and Surface Hydrophobization," Sci Technol Adv Mater 9:035001 (5 pp) (2008).
International Search Report, PCT/US2016/036098, dated Oct. 21, 2016.
Written Opinion, PCT/US2016/036098, dated Oct. 21, 2016.
Carpenter et al., "Influence of Scaffold Size on Bactericidal Activity of Nitric Oxide Releasing Silica Nanoparticles," ACS Nano, 5(9):7235-7244 (2011).
Lee et al., "Fabrication of Superhydrophobic Surface on a Cellulose-based Material via Chemical Modification," Bull. Korean Chem. Soc., 35(5):1545 (2014).

\* cited by examiner

Cellulosic Backbone

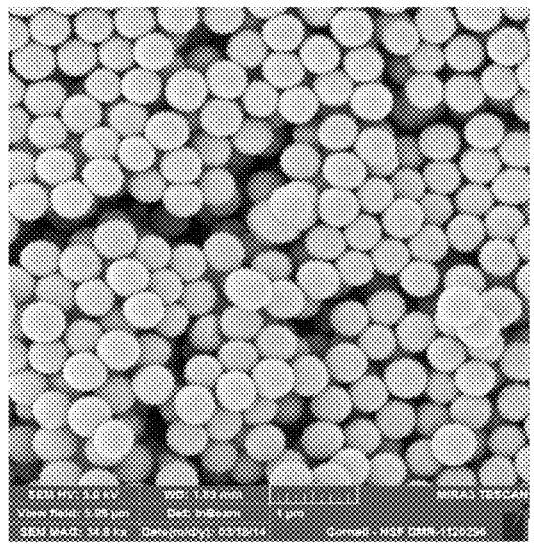
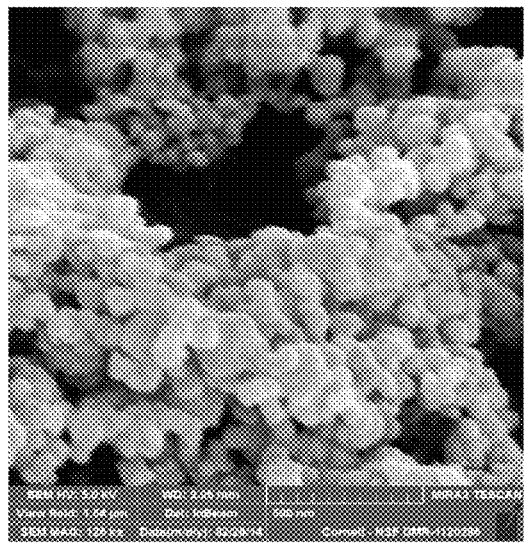
FIG. 12A  FIG. 12B
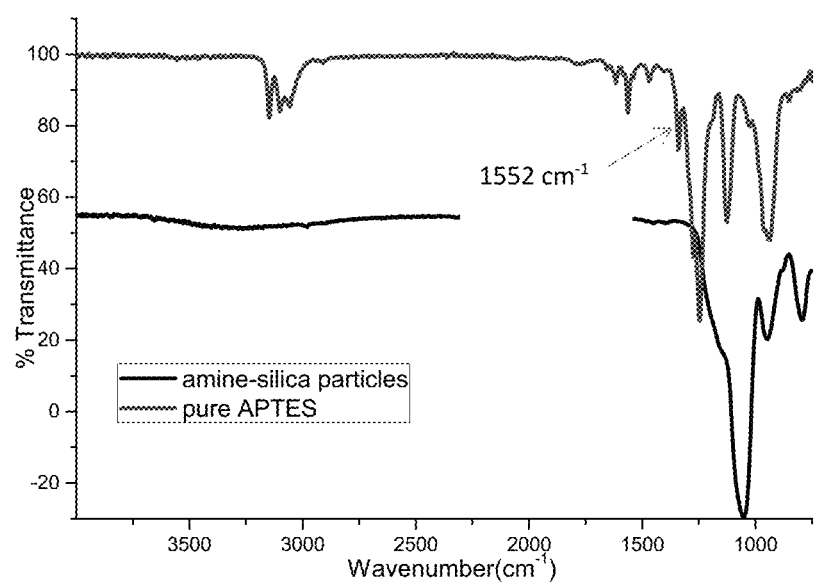
FIG. 13

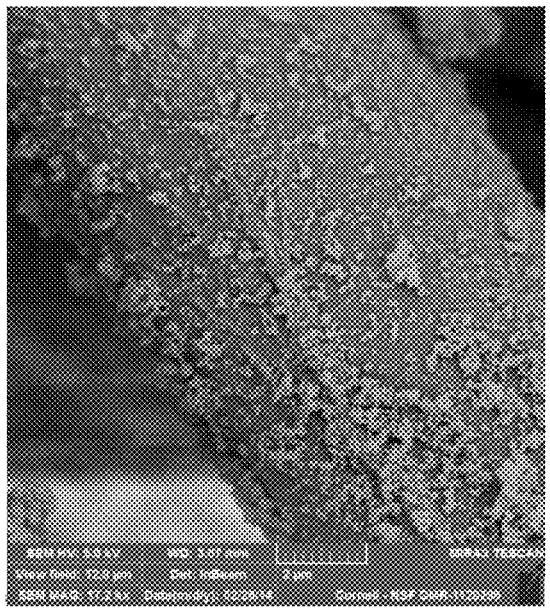 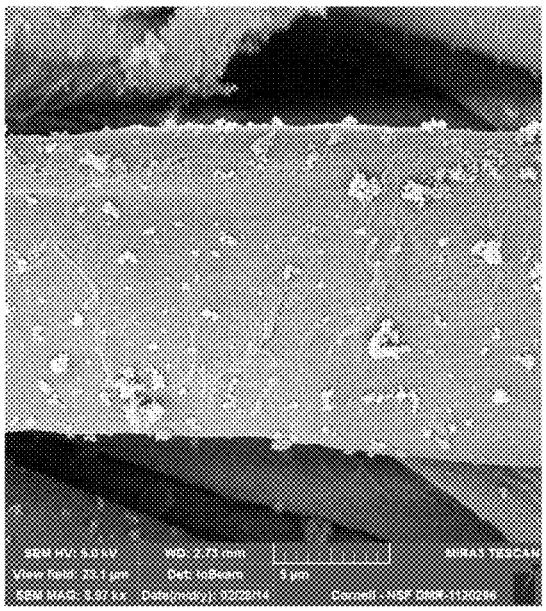
FIG. 19C  FIG. 19D
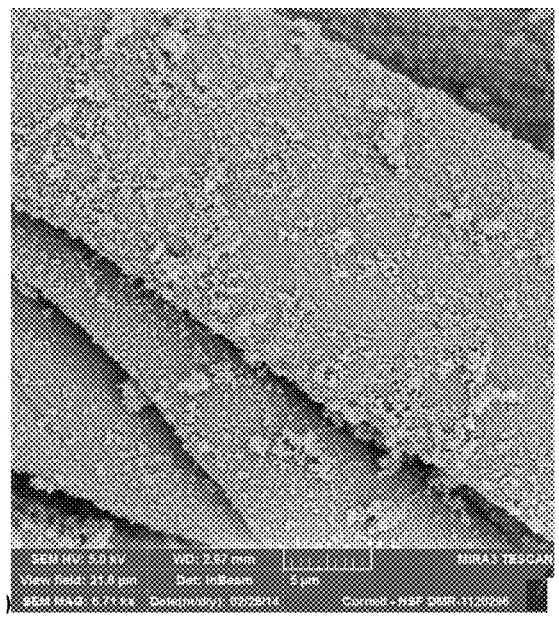 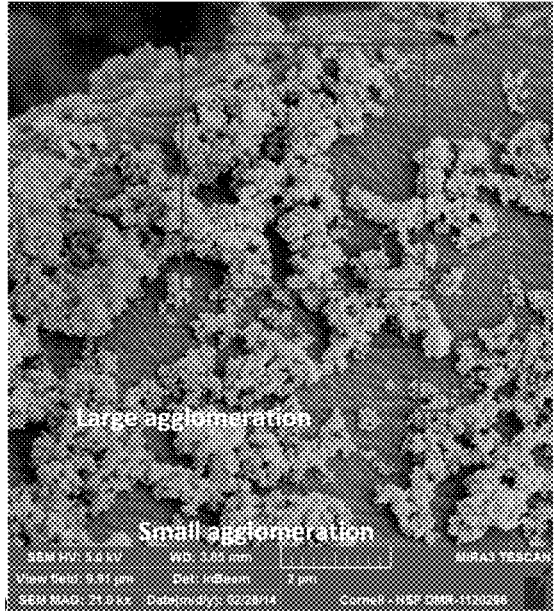
FIG. 20A  FIG. 20B

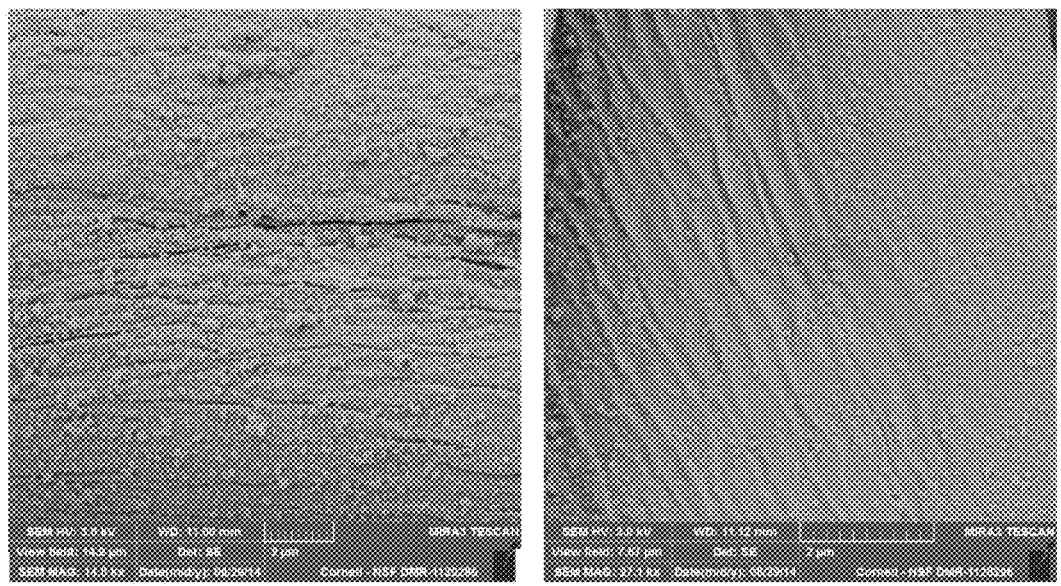
FIG. 28A  FIG. 28B
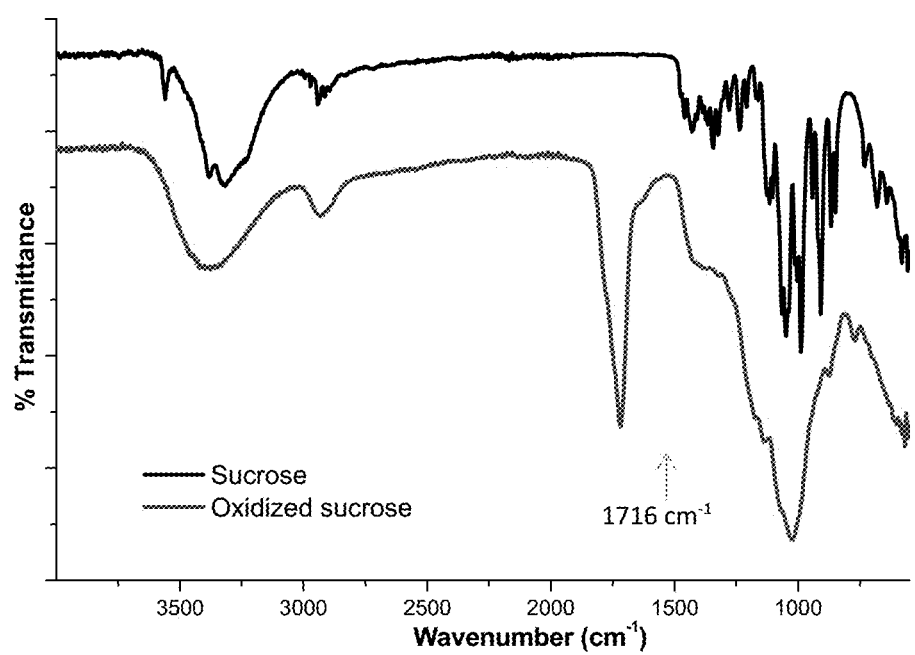
FIG. 29

Cellulosic Backbone

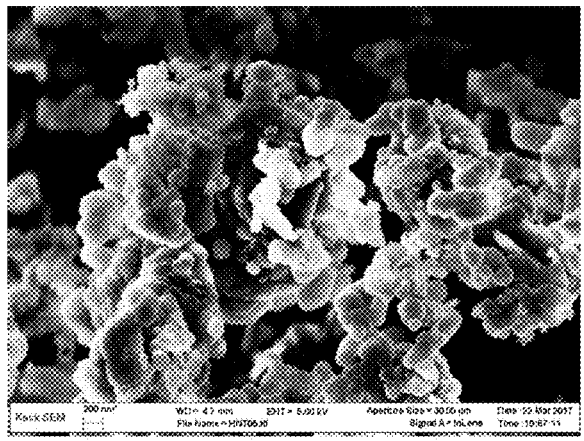
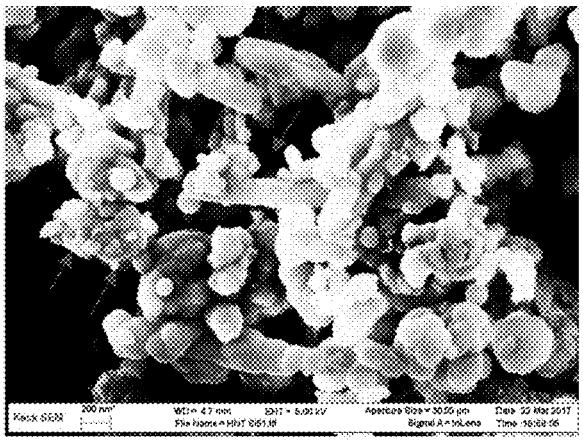
FIG. 47A                    FIG. 47B
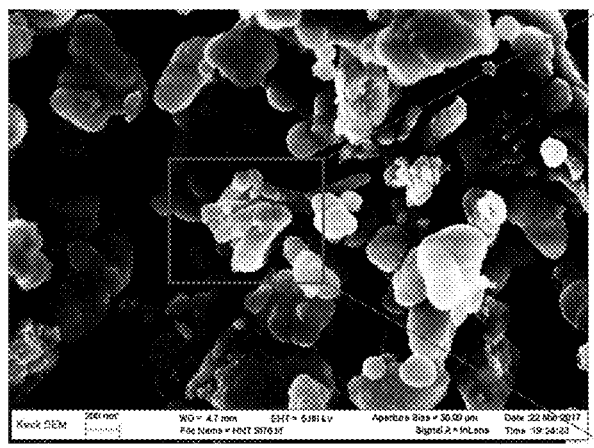
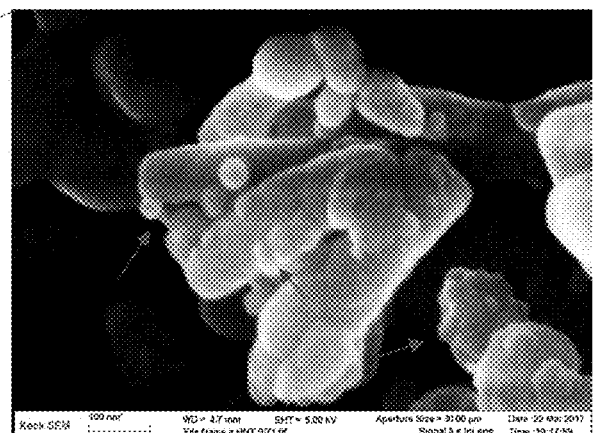
FIG. 47C                    FIG. 47D
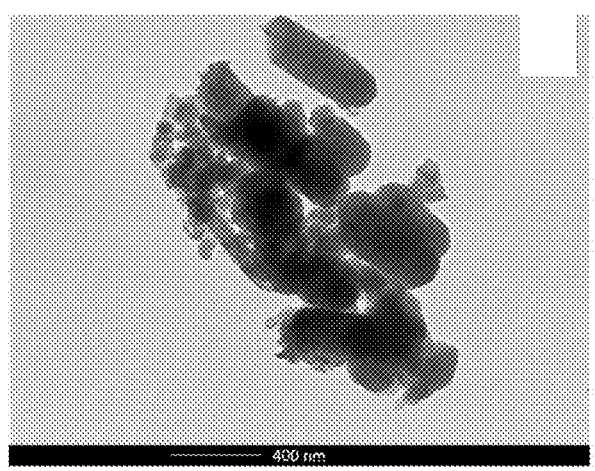
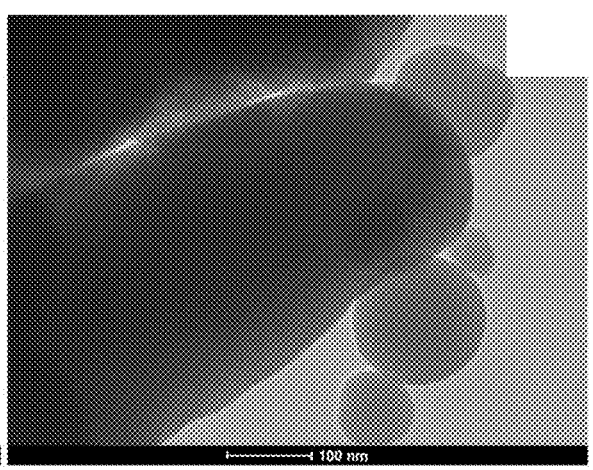
FIG. 48A                    FIG. 48B

MODIFIED CELLULOSIC COMPOSITIONS HAVING INCREASED HYDROPHOBICITY AND PROCESSES FOR THEIR PRODUCTION

CROSS-REFERENCE TO RELATED APPLICATIONS

This application is a divisional of co-pending U.S. patent application Ser. No. 15/832,725, filed Dec. 5, 2017, issuing as U.S. Pat. No. 11,326,303 on May 10, 2022, which is a continuation-in-part of International Application No. PCT/US2016/036098, filed Jun. 6, 2016, which claims priority benefit of U.S. Provisional Patent Application Ser. No. 62/171,371, filed Jun. 5, 2015, the disclosures of which are hereby incorporated by reference herein in their entirety.

FIELD OF THE INVENTION

The present invention generally relates to, inter alia, environment-friendly cellulosic compositions, products, and processes for their production. The processes of the present invention use 'green' chemistry principles to improve hydrophobicity and surface roughness of cellulosic compositions.

BACKGROUND OF THE INVENTION

Cotton is one of the most abundant natural fibers produced and used today (Klemm, D., Heublein, B., Fink, H. P., Bohn, A. "Cellulose: fascinating biopolymer and sustainable raw material." *Angewandte Chemie International Edition* 44.22 (2005): 3358-3393). Cotton is primarily made of cellulose, a linear homopolymer consisting of $\beta$-(1→4) linked D-glucose units. Within each glucose unit, three hydroxyl groups are attached to number 2, 3, and 6 carbons. Due to the polar nature of the hydroxyl groups, the entire cellulose molecule exhibits highly hydrophilic nature making it one of the most comfortable fibers, particularly in humid environments. However, the same property renders cotton its non-water repellency which precludes many applications of cotton including some apparel, e.g., swimsuits, umbrella, and many others. Viscose rayon, which is also cellulose, suffers from the same problem.

There are many treatments used to make cotton hydrophobic. However, most of these treatments use fluorine containing compounds. Fluorine containing compounds are inherently hydrophobic with very low surface energy and can provide the necessary water repellency. However, none of these treatments are environment-friendly or 'green' and suffer from severe pollution, particularly water pollution, as well as wastage of large quantities of water. As a result, there is a need for new processes using 'green' chemistry for such treatments. Indeed, many green chemical modifications of cellulose are possible using the three hydroxyl groups present on each glucose unit.

Water repellent cotton can significantly reduce apparel drying times, reducing the energy needs. Further, the use of synthetic fibers such as polyester, and dependence on petroleum, can be reduced in many applications. Applications such as diapers, bandages for wounds, etc., can be made all-natural by using water repellent cotton as the innermost layer while keeping the outer layers of absorbent cotton.

Naturally occurring fatty acids are biocompatible and biodegradable, the long alkyl backbone chain has much lower surface tension compared to the hydroxyl groups on cellulose. By grafting fatty chain onto cellulose surface the hydrophobicity of cellulose surface can be increased. However, both intra- and inter-molecular hydrogen bonding give cellulose highly aligned and packed (crystalline) structure. As a result, fatty acids show extremely low reactivity toward the cellulosic hydroxyl groups (Heinze, Th., and T. Liebert. "Unconventional methods in cellulose functionalization." *Progress in Polymer Science* 26, no. 9 (2001): 1689-1762).

To date, numerous methods have been published to facilitate the fatty acid reactivity toward cellulose (Wang, Pinglang, and Bernard Y. Tao. "Synthesis and characterization of long-chain fatty acid cellulose ester (FACE)." *Journal of applied polymer science* 52, no. 6 (1994): 755-761; Vaca-Garcia, C., S. Thiebaud, M. E. Borredon, and Giuseppe Gozzelino. "Cellulose esterification with fatty acids and acetic anhydride in lithium chloride/N, N-dimethylacetamide medium." *Journal of the American Oil Chemists' Society* 75, no. 2 (1998): 315-319). However, most of these reactions have been performed in homogenous solutions, which require proper solvent to dissolve the cellulose. On the other hand, some researchers have put an emphasis on enhancing the reactivity of the fatty acids, thus, making their reaction with cellulose easy. Some representatives include in-situ activation of carboxylic/fatty acids by dicyclohexyl-carbo-diimide (DCC), N,N'-carbonyldiimidazole (CDI) and p-toluenesulfonyl chloride. However, all these method involves extensively use of petroleum based chemicals, they are not sustainable, and some of them are highly toxic for humans, animals, and other living organisms (Chauvelon, G., L. Saulnier, A. Buleon, J-F. Thibault, C. Gourson, R. Benhaddou, R. Granet, and P. Krausz. "Acidic activation of cellulose and its esterification by long-chain fatty acid." *Journal of applied polymer science* 74, no. 8 (1999): 1933-1940).

Cotton fabrics are widely used in the apparel industry as they are soft, breathable and comfortable (Wu et al., *Advanced Functional Materials* 26:569 (2016); Yetisen et al., *ACS Nano*, 10:3042 (2016)). There is a great interest in making ultrahydrophobic cotton fabrics as it could increase their potential applications (Liu et al., *Journal of Materials Chemistry*, 17:1071 (2007)). Ultrahydrophobic surfaces exhibit extraordinary high water contact angles, by convention greater than 150° (Ma et al., *Advanced Materials*, 19:255 (2007)). It can be used in apparels to make water repellent outdoor gear, rainwear and self-cleaning clothing (Gu et al., *Cellulose*, 24:2635 (2017)). While perfluorinated compounds have worked well to make cotton hydrophobic, they have been recognized as emerging environmental pollutants as they are toxic and carcinogenic (Hekster et al., in *Reviews of Environmental Contamination and Toxicology*, Springer, 2003, 99). Lithographic or plasma etching techniques require expensive instruments, chemicals, and are only capable to fabricate small scale ultrahydrophobic surfaces. These techniques are limited to use of certain types of chemicals which makes it difficult to scale-up at an industrial level. Completely green and durable ultrahydrophobic modification of cotton has not been reported up to date.

The present invention is directed to overcoming these and other deficiencies in the art.

SUMMARY OF THE INVENTION

The present invention generally relates to, inter alia, environment-friendly cellulosic compositions, products, and processes for their production. The processes of the present invention involve the use of 'green' chemistry principles to improve hydrophobicity and/or surface roughness of cellulosic materials, thereby yielding modified cellulosic compositions having increased hydrophobicity and/or surface roughness. These modified cellulosic compositions are advantageous over the prior art materials in that they have more durable hydrophobicity and/or superhydrophobicity compared to cellulosic compositions not produced by the presently disclosed processes.

In one aspect, the present invention relates to a composition comprising a modified cellulosic surface comprising aliphatic fatty acid molecules and amine-silica particles that are covalently bonded to cellulose fibers of the cellulosic surface. The present invention also relates to a product comprising this composition. In one embodiment, the product is made of the composition so that the product has at least one surface comprising the modified cellulosic surface.

In another aspect, the present invention relates to a process for increasing hydrophobicity of a cellulosic surface. This process includes the steps of: (i) providing a cellulosic surface comprising cellulose fibers; and (ii) grafting a plurality of aliphatic fatty acid molecules onto the cellulosic surface to yield a modified cellulosic surface having increased hydrophobicity, where the grafting step comprises reacting fatty anhydride with hydroxyl groups of the cellulose fibers in order to covalently bond the aliphatic fatty acid molecules to the cellulose fibers, and where the grafting takes place without using any toxic reagents or exogenous solvents. The present invention also relates to a modified cellulosic surface having increased hydrophobicity, where the modified cellulosic surface is produced by the process described above. The present invention further relates to a product comprising the modified cellulosic surface produced by the process described above.

In another aspect, the present invention relates to a process for increasing hydrophobicity and surface roughness of a cellulosic surface. This process includes the steps of: (i) providing a cellulosic surface comprising cellulose fibers; (ii) depositing amine-silica particles onto the cellulosic surface, thereby increasing surface roughness of the cellulosic surface; and (iii) after the depositing step, grafting a plurality of aliphatic fatty acid molecules onto the cellulosic surface to yield a modified cellulosic surface having increased hydrophobicity, where the grafting comprises reacting fatty anhydride with hydroxyl groups of the cellulose fibers in order to covalently bond the aliphatic fatty acid molecules to the cellulose fibers, and where the depositing and grafting takes place without using any toxic reagents or exogenous solvents. In certain embodiments, this process further comprises treating the cellulosic surface with a green crosslinking agent prior to depositing the amine-silica particles thereon in order to facilitate said covalent bonding of the amine-silica particles to the cellulose fibers. In other embodiments, this process further comprises reacting the fatty anhydride with amine groups of the amine-silica particles so as to covalently bond aliphatic fatty acid molecules to the amine-silica particles. The present invention also relates to a modified cellulosic surface having increased hydrophobicity and increased surface roughness, where the modified cellulosic surface is produced by the process described above. The present invention further relates to a product comprising the modified cellulosic surface produced by the process described above.

Therefore, in particular embodiments as described in more detail herein, the present invention relates to, inter alia, 'green' methods using simple and non-toxic chemicals as raw materials to make cellulose, both cotton and viscose rayon fabrics water repellent. Both cotton and viscose rayon (including lyocell) fibers are commonly used in apparel. The present invention involves, inter alia, optimizing the disclosed 'green' methods to obtain the best possible water repellent property for the treated fabric. The developed techniques can also be used to make other cellulosic fibers such as jute, ramie, sisal, flax, etc., hydrophobic or superhydrophobic.

In a particular method of the present invention, plant-based aliphatic fatty acid chains are grafted onto cotton (or viscose) fabric surface to decrease the surface energy by using the alkyl chains of the fatty acids. Acetic anhydrides are used to enhance the reactivity. Although not meant to be limited thereto, microwave heating, an energy efficient method, can be used to reach the desired reaction temperature. In one embodiment, the present invention will be optimized to provide a process for obtaining the highest possible water contact angle.

In another particular method of the present invention, amine-silica micro- and nano-particles are used to increase the surface roughness of the cotton/viscose fibers. In one embodiment of this method, these particles can be physically deposited to mimic 'lotus leaf' topography and further chemically bonded to the cotton/viscose fiber (fabric) surface to obtain a durable hydrophobic treatment. Most nanotechnology-based methods to date involve depositing nanoparticles without any chemical bonding and, almost always, these particles separate from the fabric during washing resulting in loss of their water-repellent properties. Thus, in one embodiment, the present invention provides an optimized process to assure the chemical bonding of the particles and to obtain the highest possible water contact angle (>140°). Chemical bonding of the particles can achieve 'permanent' or durable hydrophobic characteristic. Different 'green' crosslinkers, based on natural chemistry, can be used to attach the micro- and nano-particles. In some cases the silica particles can be chemically modified to get the needed chemical groups to react with the hydroxyl groups on cellulose. The cotton/viscose fabrics (with particles attached) can be treated by fatty acid hydrophobic treatment (described in the earlier paragraph). The hydrophobic fatty acid surface plus the 'lotus leaf' topography should result in superhydrophobic fabric with very high contact angles. Resulting superhydrophobic cotton/viscose fabrics with covalently bonded particles can be subjected to several cycles of laboratory laundering to characterize its loss of hydrophobicity, if any.

In one embodiment of the above method of the present invention, two or more sizes of particles can be used to produce a fiber or fabric having higher hydrophobicity than fiber or fabric treated with a single size particle. Also, chemically binding the particles can be used to give a greater durable result compared to physically attaching the particles. In certain embodiments, this method can be used to give true lotus leaf effect.

In accordance with various aspects of the present invention, the surface chemistry, topography, contact angle, etc., of cotton/viscose fibers/fabrics will be fully characterized using various analytical tools. The tensile properties of the fabric also will be characterized to assess the damage, if any, to the fabric properties during processing. The durability of the hydrophobicity will be characterized using simulated laundry tests.

In a further aspect, the present disclosure provides a composition that comprises a modified cellulosic surface having low surface energy molecules and amine functionalized nanotubes decorated with silica nanoparticles that are covalently bonded to cellulose fibers of the cellulosic surface. The present disclosure also provides a product comprising the above described composition.

In another aspect, the present disclosure provides a process for increasing hydrophobicity and surface roughness of a cellulosic surface. This process involves the steps of: (i) providing a cellulosic surface comprising cellulose fibers; (ii) depositing amine functionalized nanotubes decorated with silica nanoparticles to the cellulose fibers, thereby increasing surface roughness of the cellulosic surface; and (iii) after the depositing step, grafting a plurality of low surface energy molecules onto the cellulosic surface to yield a modified cellulosic surface having increased hydrophobicity. Also provided is a modified cellulosic surface having increased hydrophobicity and increased surface roughness, where the modified cellulosic surface is produced by the above described process. Also provided is a product comprising this modified cellulosic surface.

These and other objects, features, and advantages of this invention will become apparent from the following detailed description of the various aspects of the invention taken in conjunction with the accompanying drawings.

BRIEF DESCRIPTION OF THE DRAWINGS

For the purpose of illustrating aspects of the present invention, there are depicted in the drawings certain embodiments of the invention. However, the invention is not limited to the precise arrangements and instrumentalities of the embodiments depicted in the drawings. Further, if provided, like reference numerals contained in the drawings are meant to identify similar or identical elements.

FIG. 7A: 10 min heating time was maintained;

FIG. 7B: 100% power level.

FIG. 9A: same microwave heating time with different power levels; FIG. 9B: same power level with different heating times.

FIG. 11A: Wenzel state and FIG. 11B: Cassie-Baxter state.

FIGS. 12A-12B: SEM images of amine-silica particles with diameter of: FIG. 12A: 458 nm; FIG. 12B: 107 nm.

FIG. 13: Graph illustrating ATR-FTIR spectra of amine-silica particles and pure APTES.

FIGS. 19A-19D: SEM images of small size amine-silica nanoparticles deposited on cotton fabric. Cotton fabric was first BTCA treated and activated, followed by immersing in 0.5% amine-silica particle solution (FIGS. 19A-19B); 0.1% amine-silica particle solution (FIG. 19C); 0.02% amine-silica particle solution (FIG. 19D).

FIGS. 20A-20H: SEM images of ultrasonication treated cotton fabric with physically deposited particles and before ultrasonication (FIGS. 20A-20B); after 2 min of ultrasonication (FIGS. 20C-20D); after 5 min of ultrasonication (FIGS. 20E-20F); after 10 min of ultrasonication (FIGS. 20G-20H).

FIGS. 28A-28B: SEM images of dual size particle deposited cotton fabric surface after 10 min ultrasonication (FIG. 28A) and after 20 min ultrasonication (FIG. 28B).

FIG. 29: Graph illustrating ATR-FTIR spectra of sucrose and oxidized sucrose.

FIG. 32A: BTCA crosslinked; and FIG. 32B: oxidized sucrose crosslinked.

FIG. 42A: 10 min heating time was maintained; FIG. 42B: 100% power level was maintained.

FIG. 44A: hydrophobic treatment involved same microwave heating time and different power levels; FIG. 44B: hydrophobic treatment involved same power level with different heating times.

FIGS. 47A-47D: SEM images of HNT decorated with Si nanospheres at higher magnification. FIG. 47A is an SEM image at lower magnification than FIG. 47B.

FIG. 47C is an SEM image at a higher magnification than FIG. 47B. FIG. 47D is an SEM image of a portion of the image shown in FIG. 47C and at a higher magnification than FIG. 47C.

FIGS. 48A-48B: TEM images of HNT decorated with Si nanospheres at higher magnification. FIG. 48A is a TEM image at a lower magnification than FIG. 48B.

FIG. 50A shows HNT with no silica nanospheres. FIG. 50B shows HNT with 0.1% silica nanospheres. FIG. 50C shows HNT with 0.3% silica nanospheres. FIG. 50D shows HNT with 0.5% silica nanospheres.

DETAILED DESCRIPTION OF THE INVENTION

Figure 1:
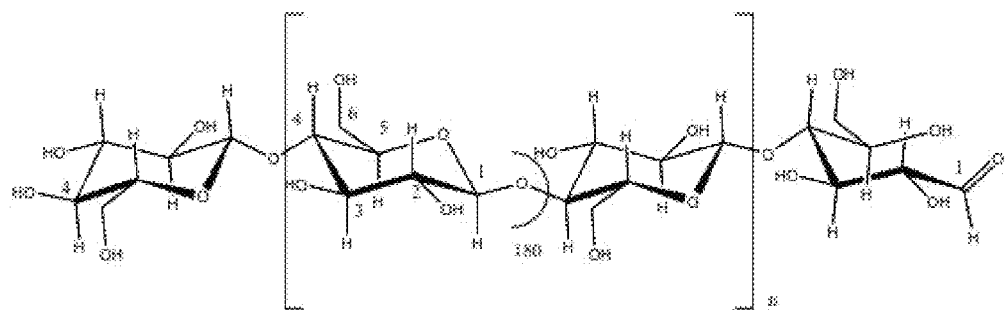
FIG. 1: Molecular structure of cellulose.

The present invention generally provides, inter alia, environment-friendly cellulosic compositions, products, and processes for their production. The processes of the present invention involve the use of 'green' chemistry principles to improve hydrophobicity and/or surface roughness of cellulosic materials, thereby yielding modified cellulosic compositions having increased hydrophobicity and/or surface roughness. These modified cellulosic compositions are advantageous over prior art cellulosic compositions in that they are more durable in terms of their hydrophobicity and/or superhydrophobicity compared to cellulosic compositions not produced by the presently disclosed processes.

In one aspect, the present invention provides a composition that comprises a modified cellulosic surface having aliphatic fatty acid molecules and amine-silica particles that are covalently bonded to cellulose fibers of the cellulosic surface.

The aliphatic fatty acid molecules of the modified cellulosic surface can have fatty chains that are either of uniform or different lengths.

While the lengths of the fatty chains of the modified cellulosic surface can be of any known length, particular embodiments can include fatty chains that comprise between about 3 and about 38 carbon atoms in length. More particularly, the fatty chains can correspond to the following fatty acids: propanoic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid, henatriacontanoic acid, dotriacontanoic acid, tritriacontanoic acid, tetratriacontanoic acid, pentatriacontanoic acid, hexatriacontanoic acid, heptatriacontanoic acid, and octatriacontanoic acid. Without meaning to limit the present invention, a preferred length of carbon atoms of the fatty chains described herein can range from 6 to 18 carbons.

One innovation of the present invention over the prior art is the use of acetic anhydride to facilitate the reaction between the aliphatic fatty acid molecules and the cellulose fibers. As described in more detail herein, fatty anhydride is prepared by reacting acetic anhydride with a fatty acid having a saturated or unsaturated aliphatic chain of between about 4 and about 38 carbon atoms. This is done without any harsh or toxic chemicals, which is in direct contrast with the industry standard of preparing hydrophobic and/or superhydrophobic materials and products having cellulosic surfaces.

The modified cellulosic surface of the composition of the present invention can be made from various sources of cellulose fibers. For example, in certain embodiments, the modified cellulosic surface can comprise cellulose fibers from a source such as, but not limited to, cotton, rayon, viscose rayon, liquid crystalline cellulose, lyocell fibers (e.g., TENCEL®), bacterial cellulose, jute, kenaf, ramie, sisal, flax, pineapple, banana, henequen, curaua, bagasse, bamboo, hemp, and fibrils derived from them.

The modified cellulosic surface of the composition of the present invention can have amine-silica particles that are of various sizes, including, without limitation, single sized, dual sized, or multiple sized (i.e., more than two different sizes) amine-silica particles. The amine-silica particles can be selected from sizes including, without limitation, 100-1500 nanometers (nm), and more particularly 200-300 nm, 300-400 nm, 400-500 nm, 500-1000 nm, and 500-1500 nm.

As provided herein, the modified cellulosic surface of the composition of the present invention has increased hydrophobicity as compared to its corresponding non-modified cellulosic surface.

The composition of the present invention having increased hydrophobicity over its non-modified cellulosic surface counterpart can comprise modified cellulosic surfaces that are hydrophobic or superhydrophobic. As used herein, the term "hydrophobic" refers to a material having a water contact angle of between about 900 and about 150°. As used herein, the term "superhydrophobic" refers to a material having a water contact angle of at least 1500 and, more particularly, of at least 153°, 155°, 160°, 165°, and 170°.

The modified cellulosic surface of the composition of the present invention has increased hydrophobicity durability than that of the non-modified cellulosic surface. As used herein, durability of the hydrophobic or superhydrophobic properties of the modified cellulosic surface can be measured by a laundering durability test, such as the American Association of Textile Chemists and Colorists (AATCC) test method 61-2003.

The modified cellulosic surface of the composition of the present invention can have increased surface roughness as compared to its corresponding non-modified cellulosic surface.

The composition of the present invention can be in various forms known in the art with respect materials having a cellulosic surface. Suitable forms of the composition of the present invention can include, without limitation, a form selected from the group consisting of fabric (woven, knitted, or nonwoven), yarn, fibers, filaments, microfibrils, and nanofibers.

In another aspect, the present invention provides a product comprising the composition described herein. In one embodiment, the product is made of the composition so that the product has at least one surface comprising the modified cellulosic surface.

In certain embodiments, the product is made of the composition so that the product has at least one surface comprising the modified cellulosic surface as described herein.

The product of the present invention can be any material or item that is used for protection, particularly as a water-repellant material. Suitable examples of such materials or items include, but are not limited to, any sort of apparel, outerwear, underwear, linens, blankets, coverings, banners, shoes, coats, jackets, sweaters, socks, headgear, tents, curtains, drapes, fabric, swimsuits, umbrellas, diapers, bandages for wounds, vehicle covers, awnings, and the like.

In another aspect, the present invention relates to a process for increasing hydrophobicity of a cellulosic surface. Generally, this process includes the steps of: (i) providing a cellulosic surface comprising cellulose fibers; and (ii) grafting a plurality of aliphatic fatty acid molecules onto the cellulosic surface to yield a modified cellulosic surface having increased hydrophobicity, where the grafting step comprises reacting fatty anhydride with hydroxyl groups of the cellulose fibers in order to covalently bond the aliphatic fatty acid molecules to the cellulose fibers, and where the grafting takes place without using any toxic reagents or exogenous solvents. Importantly, this process takes place in a 'green' environment due to the absence of such toxic reagents or exogenous solvents.

In certain embodiments of this process, heat is applied during the grafting step to facilitate the reaction between the fatty anhydride and the cellulose fibers. When heat is used in accordance with this process, the heat is applied at a temperature of between about 40° C. and about 220° C.

In accordance with this process, the aliphatic fatty acid molecules can have fatty chains of uniform or different lengths. The length of the fatty chains can be between about 3 and about 38 carbon atoms. Without meaning to limit the present invention, a preferred range of carbon atoms of the fatty chains described herein can be from 6 to 18 carbons. The fatty anhydride may be prepared by reacting acetic anhydride with a fatty acid having a saturated or unsaturated aliphatic chain of between about 4 and about 38 carbon atoms.

This process is effective to produce a modified cellulosic surface having a significantly lower surface energy value than that of the non-modified cellulosic surface. Further, this process is effective to produce a modified cellulosic surface having a significantly higher water contact angle than that of the non-modified cellulosic surface. More particularly, the water contact angle of the modified cellulosic surface is between about 90° and about 150°, which corresponds to a modified cellulosic surface that is considered to be hydrophobic. In other embodiments, the water contact angle of the modified cellulosic surface is greater than 150°, which corresponds to a modified cellulosic surface that is considered to be superhydrophobic. The modified cellulosic surface produced by the process of the present invention has increased hydrophobicity durability than that of the non-modified cellulosic surface. In accordance with the present invention, durability can be measured by a laundering durability test such as the American Association of Textile Chemists and Colorists (AATCC) test method 61-2003, which is known in the relevant art.

In accordance with this process of the present invention, the cellulosic surface can be in a form selected from the group consisting of fabric (woven, knitted, or nonwoven), yarn, fibers, filaments, microfibrils, and nanofibers.

In accordance with this process of the present invention, the cellulosic surface can comprise cellulose fibers from a source that includes, without limitation, cotton, rayon, viscose rayon, liquid crystalline cellulose, lyocell fibers (e.g., TENCEL®), bacterial cellulose, jute, kenaf, ramie, sisal, flax, pineapple, banana, henequen, curaua, bagasse, bamboo, hemp, and fibrils derived from them.

The present invention also relates to a modified cellulosic surface having increased hydrophobicity, where the modified cellulosic surface is produced by the process described above. The present invention further relates to a product comprising the modified cellulosic surface produced by the process described herein.

In another aspect, the present invention relates to a process for increasing hydrophobicity and surface roughness of a cellulosic surface. This process includes the steps of: (i) providing a cellulosic surface comprising cellulose fibers; (ii) depositing amine-silica particles onto the cellulosic surface, thereby increasing surface roughness of the cellulosic surface; and (iii) after the depositing step, grafting a plurality of aliphatic fatty acid molecules onto the cellulosic surface to yield a modified cellulosic surface having increased hydrophobicity, where the grafting comprises reacting fatty anhydride with hydroxyl groups of the cellulose fibers in order to covalently bond the aliphatic fatty acid molecules to the cellulose fibers, and where the depositing and grafting takes place without using any toxic reagents or exogenous solvents. Importantly, as in the previously described process, the currently described process also takes place in a 'green' environment due to the absence of such toxic reagents or exogenous solvents In accordance with this process of the present invention, the amine-silica particles are deposited in a form of an amine-silica particle dispersion. In certain embodiments, two different sized particles may be used ratios from about 10%-90% to about 90%-10%.

In accordance with this process of the present invention, the amine-silica particles can be deposited by physical deposition onto the cellulosic surface or by covalent bonding to the cellulose fibers of the cellulosic surface. Particular techniques for accomplishing the depositing of the amine-silica particles are further described herein.

In certain embodiments, this process further comprises treating the cellulosic surface with a green crosslinking agent prior to depositing the amine-silica particles thereon in order to facilitate said covalent bonding of the amine-silica particles to the cellulose fibers.

In accordance with this process of the present invention, suitable green crosslinking agents can include, without limitation, 1,2,3,4-Butanetetracarboxylic acid (BTCA), oxidized sucrose, oxidized higher sugars including raffinose, stachiose, lactose, maltose, and their combinations, and various molasses.

In other embodiments, this process further comprises reacting the fatty anhydride with amine groups of the amine-silica particles so as to covalently bond aliphatic fatty acid molecules to the amine-silica particles.

In accordance with this process of the present invention, the amine-silica particles can be of various sizes, including, without limitation, single sized, dual sized, or multiple sized (i.e., more than two different sizes) amine-silica particles. The amine-silica particles can be selected from sizes including, without limitation, 200-300 nanometers (nm), 300-400 nm, 400-500 nm, 500-1000 nm, and 500-1500 nm.

In certain embodiments of this process, heat is applied during the grafting step to facilitate the reaction between the fatty anhydride and the cellulose fibers. When heat is used in accordance with this process, the heat is applied at a temperature of between about 40° C. and about 220° C.

In accordance with this process, the aliphatic fatty acid molecules can have fatty chains of uniform or different lengths. The length of the fatty chains can be between about 3 and about 38 carbon atoms. Without meaning to limit the present invention, a preferred range of carbon atoms of the fatty chains described herein can be from 6 to 18 carbons. The fatty anhydride may be prepared by reacting acetic anhydride with a fatty acid having a saturated or unsaturated aliphatic chain of between about 4 and about 38 carbon atoms.

This process is effective to produce a modified cellulosic surface having a significantly lower surface energy value than that of the non-modified cellulosic surface. Further, this process is effective to produce a modified cellulosic surface having a significantly higher water contact angle than that of the non-modified cellulosic surface. More particularly, the water contact angle of the modified cellulosic surface is between about 90° and about 150°, which corresponds to a modified cellulosic surface that is considered to be hydrophobic. In other embodiments, the water contact angle of the modified cellulosic surface is greater than 150°, which corresponds to a modified cellulosic surface that is considered to be superhydrophobic. The modified cellulosic surface produced by the process of the present invention has increased hydrophobicity durability than that of the non-modified cellulosic surface. In accordance with the present invention, durability can be measured by a laundering durability test such as the American Association of Textile Chemists and Colorists (AATCC) test method 61-2003, which is known in the relevant art.

In accordance with this process of the present invention, the cellulosic surface can be in a form selected from the group consisting of fabric (woven, knitted, or nonwoven), yarn, fibers, filaments, microfibrils, and nanofibers.

In accordance with this process of the present invention, the cellulosic surface can comprise cellulose fibers from a source that includes, without limitation, cotton, rayon, viscose rayon, liquid crystalline cellulose, lyocell fibers (e.g., TENCEL®), bacterial cellulose, jute, kenaf, ramie, sisal, flax, pineapple, banana, henequen, curaua, bagasse, bamboo, hemp, and fibrils derived from them.

The present invention also relates to a modified cellulosic surface having increased hydrophobicity and increased surface roughness, where the modified cellulosic surface is produced by the process described above. The present invention further relates to a product comprising the modified cellulosic surface produced by the process described above.

As provided herein, in accordance with particular embodiments of the present invention, several green or greener methods to obtain water repellent (hydrophobic) cotton fabrics have been developed. While a range of hydrophobicity levels can be obtained in accordance with the processes of the present invention, some methods can produce superhydrophobic cotton fabrics with water contact angles of over 150° C. Such fabrics were characterized for their contact angle with water. The fabrics were also characterized to see their hydrophobic characteristic retention after several laundry cycles.

In one such method of the present invention, aliphatic fatty acid chains were grafted onto cotton (cellulose) fiber surface to decrease the surface energy by using the alkyl chains of the fatty acids. Acetic anhydride was used to facilitate the reactivity. Microwave heating, an energy efficient method, was used to reach the reaction temperature. In certain embodiments, the 'green' method described herein resulted in hydrophobic cotton fabric with a water contact angle of at least 137.48° (±2.79). In addition, in certain embodiments, it was shown that the hydrophobicity lasted for 37 cycles of laboratory laundry washes (equivalent to over 185 regular washes).

In another such method of the present invention, amine-silica submicron and nanoparticles were used to increase the surface roughness of cotton fabric. Methods for physically depositing single or dual size particles as well as chemically attaching the particles to cotton fiber surface have been developed and characterized. In accordance with the present invention, cotton fabric with physically deposited particles could be chemically crosslinked to obtain desired and possibly 'permanent' surface topography. Different 'green' crosslinkers (BTCA and oxidized sucrose) were used to attach the particles permanently. In certain embodiments, the laundry durability of final products were tested and found satisfactory in most cases. Resulting cotton fabrics were treated by fatty acid hydrophobic treatment (described in the earlier paragraph). Water contact angles of such fabrics were as high as 153.41° (±2.33). As described herein, these fabrics with water contact angles of greater than 150° are considered to be superhydrophobic (also referred to herein as "ultrahydrophobic"). Resulting crosslinked and hydrophobic cotton fabric allowed up to 24 cycles of laboratory laundering (over 120 regular washes) without the loss of hydrophobicity.

ADDITIONAL EMBODIMENTS OF ULTRAHYDROPHOBIC CELLULOSIC SURFACES AND RELATED PROCESSES

The present invention also provides, inter alia, the use of amine functionalized nanotubes decorated with silica nanoparticles to yield environment-friendly cellulosic compositions, products, and processes for their production.

In one aspect, the present disclosure provides a composition that comprises a modified cellulosic surface having low surface energy molecules and amine functionalized nanotubes decorated with silica nanoparticles that are covalently bonded to cellulose fibers of the cellulosic surface.

In one embodiment, the nanotubes are halloysite nanotubes (HNTs).

In one embodiment, the silica nanoparticles are silica nanospheres.

In one embodiment, the silica nanoparticles are present at a concentration of at least 0.1 percent, at least 0.3 percent, at least 0.5 percent, at least 0.6 percent, at least 0.7 percent, at least 0.8 percent, at least 0.9 percent, at least 1.0 percent, or higher.

In one embodiment, the low surface energy molecules are fatty acid molecules.

In one embodiment, the fatty acid molecules are aliphatic fatty acid molecules. The aliphatic fatty acid molecules can have fatty acid chain of uniform or different lengths. The length of the fatty acid chain can be between about 3 and about 38 carbon atoms.

In one embodiment, the fatty acid molecules are fatty anhydrides prepared by reacting acetic anhydride with a fatty acid having a saturated or unsaturated aliphatic chain of between about 4 and about 38 carbon atoms.

In one embodiment, the low surface energy molecules are heptanoic anhydrides.

In one embodiment, the modified cellulosic surface comprises cellulose fibers from a source selected from the group consisting of cotton, rayon, viscose rayon, liquid crystalline cellulose, lyocell fibers (e.g., TENCEL®), bacterial cellulose, jute, kenaf, ramie, sisal, flax, pineapple, banana, henequen, curaua, bagasse, bamboo, hemp, and fibrils derived from them.

In one embodiment, the silica nanoparticles are single sized, dual sized, or multiple sized (more than two sizes). The silica nanoparticles can have a size selected from the group consisting of 200-300 nanometers (nm), 300-400 nm, 400-500 nm, 500-1000 nm, 500-1500 nm, and 500-2000 nm.

In one embodiment, the modified cellulosic surface is ultrahydrophobic.

In one embodiment, the modified cellulosic surface has increased hydrophobicity as compared to its corresponding non-modified cellulosic surface.

In one embodiment, the modified cellulosic surface has increased hydrophobicity durability than that of the non-modified cellulosic surface, said durability being measured by a laundering durability test comprising American Association of Textile Chemists and Colorists (AATCC) test method 61-2003.

In one embodiment, the modified cellulosic surface has increased surface roughness as compared to its corresponding non-modified cellulosic surface.

In one embodiment, the composition is in a form selected from the group consisting of fabric (woven, knitted, or nonwoven), yarn, fibers, filaments, microfibrils, and nanofibers.

The present disclosure also provides a product comprising the above described composition.

In one embodiment, the product is made of said composition so that said product has at least one surface comprising said modified cellulosic surface.

In one embodiment, the product is selected from the group consisting of apparel, outerwear, underwear, linens, blankets, coverings, banners, shoes, coats, jackets, sweaters, socks, headgear, tents, curtains, drapes, fabric, swimsuits, umbrellas, diapers, bandages for wounds, vehicle covers, awnings, and the like.

In another aspect, the present disclosure provides a process for increasing hydrophobicity and surface roughness of a cellulosic surface. This process involves the steps of: (i) providing a cellulosic surface comprising cellulose fibers; (ii) depositing amine functionalized nanotubes decorated with silica nanoparticles to the cellulose fibers, thereby increasing surface roughness of the cellulosic surface; and (iii) after the depositing step, grafting a plurality of low surface energy molecules onto the cellulosic surface to yield a modified cellulosic surface having increased hydrophobicity.

In one embodiment of this process, the nanotubes are halloysite nanotubes (HNTs).

In one embodiment of this process, the silica nanoparticles are silica nanospheres.

In one embodiment of this process, the silica nanoparticles are present at a concentration of at least 0.1 percent, at least 0.3 percent, at least 0.5 percent, at least 0.6 percent, at least 0.7 percent, at least 0.8 percent, at least 0.9 percent, at least 1.0 percent, or higher.

In one embodiment of this process, the low surface energy molecules are fatty acid molecules.

In one embodiment of this process, the fatty acid molecules are aliphatic fatty acid molecules.

In one embodiment of this process, the aliphatic fatty acid molecules have fatty acid chain of uniform or different lengths.

In one embodiment of this process, the length of the fatty acid chain comprises between about 3 and about 38 carbon atoms.

In one embodiment of this process, the fatty acid molecules are fatty anhydrides prepared by reacting acetic anhydride with a fatty acid having a saturated or unsaturated aliphatic chain of between about 4 and about 38 carbon atoms.

In one embodiment of this process, the grafting comprises reacting fatty anhydride with hydroxyl groups of the cellulose fibers in order to covalently bond the aliphatic fatty acid molecules to the cellulose fibers, where the depositing and grafting takes place without using any toxic reagents or exogenous solvents.

In one embodiment of this process, the low surface energy molecules are heptanoic anhydrides.

In one embodiment of this process, the amine functionalized nanotubes decorated with silica nanoparticles are deposited in a form of a dispersion.

In one embodiment of this process, the amine functionalized nanotubes decorated with silica nanoparticles are deposited by physical deposition onto the cellulosic surface or by covalent bonding to the cellulose fibers of the cellulosic surface.

In one embodiment of this process, the process further includes treating the cellulosic surface with a green crosslinking agent prior to depositing the amine functionalized nanotubes decorated with silica nanoparticles thereon in order to facilitate said covalent bonding of the amine functionalized nanotubes decorated with silica nanoparticles to the cellulose fibers.

In one embodiment of this process, the green crosslinking agent is selected from the group consisting of 1,2,3,4-Butanetetracarboxylic acid (BTCA), oxidized sucrose, oxidized higher sugars including raffinose, stachiose, lactose, maltose, and their combinations, and various molasses.

In one embodiment of this process, the process further includes reacting a fatty anhydride with amine groups of the amine functionalized nanotubes decorated with silica nanoparticles so as to covalently bond aliphatic fatty acid molecules to the amine functionalized nanotubes decorated with silica nanoparticles.

In one embodiment of this process, the silica nanoparticles are single sized, dual sized, or multiple sized (more than two sizes).

In one embodiment of this process, the silica nanoparticles have a size selected from the group consisting of 200-300 nanometers (nm), 300-400 nm, 400-500 nm, 500-1000 nm, 500-1500 nm, and 500-2000 nm.

In one embodiment of this process, the heat is applied during the grafting step to facilitate the reaction between the fatty anhydride and the cellulose fibers.

In one embodiment of this process, the heat is applied at a temperature of between about 40° C. and about 220° C.

In one embodiment of this process, the modified cellulosic surface has a significantly lower surface energy value than that of the non-modified cellulosic surface.

In one embodiment of this process, the modified cellulosic surface has a significantly higher water contact angle than that of the non-modified cellulosic surface.

In one embodiment of this process, the water contact angle of the modified cellulosic surface is between about 900 and about 150°.

In one embodiment of this process, the water contact angle of the modified cellulosic surface is greater than 150°.

In one embodiment of this process, the modified cellulosic surface has increased hydrophobicity durability than that of the non-modified cellulosic surface, said durability being measured by a laundering durability test comprising American Association of Textile Chemists and Colorists (AATCC) test method 61-2003.

In one embodiment of this process, the cellulosic surface is in a form selected from the group consisting of fabric (woven, knitted, or nonwoven), yarn, fibers, filaments, microfibrils, and nanofibers.

In one embodiment of this process, the cellulosic surface comprises cellulose fibers from a source selected from the group consisting of cotton, rayon, viscose rayon, liquid crystalline cellulose, lyocell fibers (e.g., TENCEL®), bacterial cellulose, jute, kenaf, ramie, sisal, flax, pineapple, banana, henequen, curaua, bagasse, bamboo, hemp, and fibrils derived from them.

Also provided is a modified cellulosic surface having increased hydrophobicity and increased surface roughness, where the modified cellulosic surface is produced by the above described process. Also provided is a product comprising this modified cellulosic surface.

EXAMPLES

The following examples are intended to illustrate particular embodiments of the present invention, but are by no means intended to limit the scope of the present invention.

Example 1

'Green' Technology for Water Repellent (Hydrophobic) Cotton Fibers, Fabrics and Apparel This example of the present invention discusses 'Green' methods to obtain water repellent or hydrophobic cotton fabrics. The same methods can be used for other cellulosic fibers (e.g., viscose, Tencel®, ramie, jute, kenaf, sisal, flax, linen, etc.) and yarns, fabrics and apparel made using any of these fibers. These methods are described in more detail below.

Pretreatment of Cotton Fabric

Desized, scoured and bleached woven cotton fabric was used as raw material for treatment in this study. Fabric was cut into 10 cm×10 cm size and purified by 300 ml ethanol solution (ethanol to water volume ratio=8:2) in 500 mL Erlenmeyer flask at 50° C. for 20 min. The purpose of this pretreatment was to partially remove any remaining ash, hemicellulose and lignin and obtain as high cellulose content as possible.

Preparation of Fatty Anhydrides

A mixture of 26 g heptanoic acid and 20 g acetic anhydride were introduced in a petri dish. After evenly mixing these, petri dish was covered and placed into a microwave oven (900 W). The mixture was microwave heated at different power levels and for desired durations. Every time after the reaction was completed, the petri dish was taken out from the microwave oven and both the chemical mixture and the microwave oven were allowed to cool to room temperature.

Figure 2:
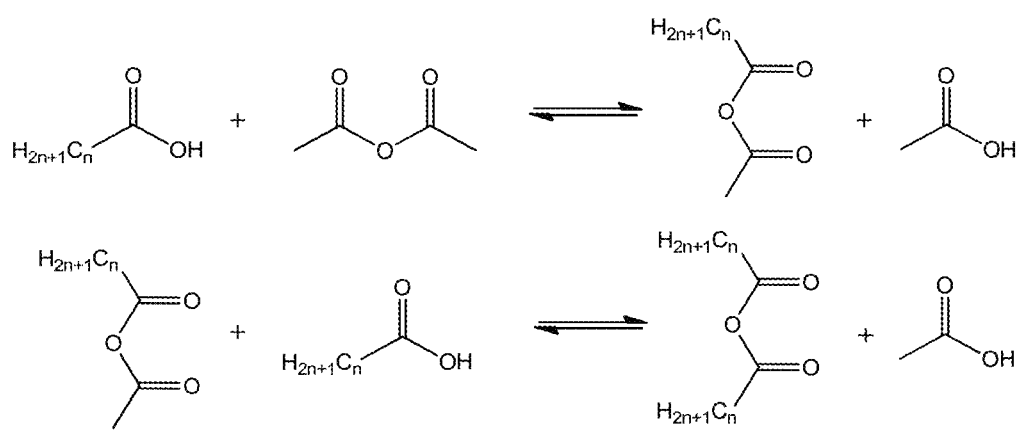
FIG. 2: Chemical process of fatty anhydride preparation.

Once the fatty acid with a melting point higher than room temperature was used, e.g., dodecanoic acid (melting point: 43.2° C.), the fatty acid was first completely melted by heating approximately 5 degrees above its melting point. After that acetic anhydride was added and stirred for 5 min to form a uniform mixture. FIG. 2 shows the reaction scheme for fatty anhydride preparation.

Hydrophobic Treatment of Cotton Fabric

Figure 3:
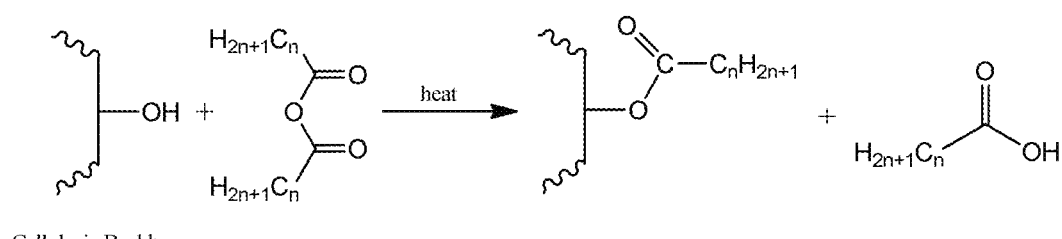
FIG. 3: Chemical reaction between cellulose and fatty anhydride.

Purified cotton fabric was put into the petri dish containing as-prepared fatty-acetic anhydride solution, making sure that the fabric is completely immersed in reaction mixture. Petri dish was then covered and placed into the microwave oven; the mixture was heated at different predetermined power levels and for different durations. During the microwave heating, the chemical reaction illustrated in FIG. 3 was expected to take place, where fatty anhydride will react with the hydroxyl groups on cellulose backbone. An ester bond will be formed with fatty acid as byproduct. Every time after the reaction was completed, the petri dish was removed from the microwave oven and the microwave oven was cooled to room temperature. The treated fabric was purified by Soxhlet extraction with ethanol to remove unreacted chemical residues for at least 12 hrs. The treated and purified fabric was dried in oven at 60° C. overnight.

ATR-FTIR Spectroscopy

Attenuated total reflectance-Fourier transform infrared spectroscopy (ATR-FTIR), the most straight forward technique, was used to confirm the successful esterification between cellulose and fatty acid. The ester carbonyl has stretch band around 1745 $cm^{-1}$. Besides the obvious carbonyl band, the peaks induced by long alkyl chain can be identified as well. For example, peak around 2950 $cm^{-1}$ is assigned to $CH_2$ anti-symmetric stretch, 2880 $cm^{-1}$ is assigned to $CH_2$ symmetric stretch, and 1280 $cm^{-1}$ is assigned to CH deformation.[12] While ATR-FITR spectra with these peaks present can be used to confirm the successful grafting of acyl chain, this technique is qualitative, and cannot be used to quantitatively determine the amount of acyl chains present on each anhydroglucose unit.

In this study all specimens were characterized using an FTIR spectrophotometer (Nicolet Magna-IR 560, Thermo Scientific, Waltham, MA). ATR-FTIR spectra were taken in the range of 4000-550 $cm^{-1}$ wavenumbers using a split pea accessory. The spectra were recorded as an average of 64 scans obtained at a resolution of 4 $cm^{-1}$.

Laundering Durability Test

Laundering durability evaluation was carried out in a modified version according to the American Association of Textile Chemists and Colorists (AATCC) Test Method 61-2003. The test was performed using a 500 mL flask containing 150 mL aqueous solution of Tide® laundry detergent (0.15%, w/w) and 50 stainless steel balls (diameter=6 mm), the test was performed at 49° C. and 40 rpm for 45 min. The size of the fabric specimens was 5 cm×5 cm for the test [6]. Each laundry cycle performed here is similar to that occurring in 5 hand or home launderings.

Tracking Fatty Anhydride Preparation by ATR-FTIR

Figure 4:
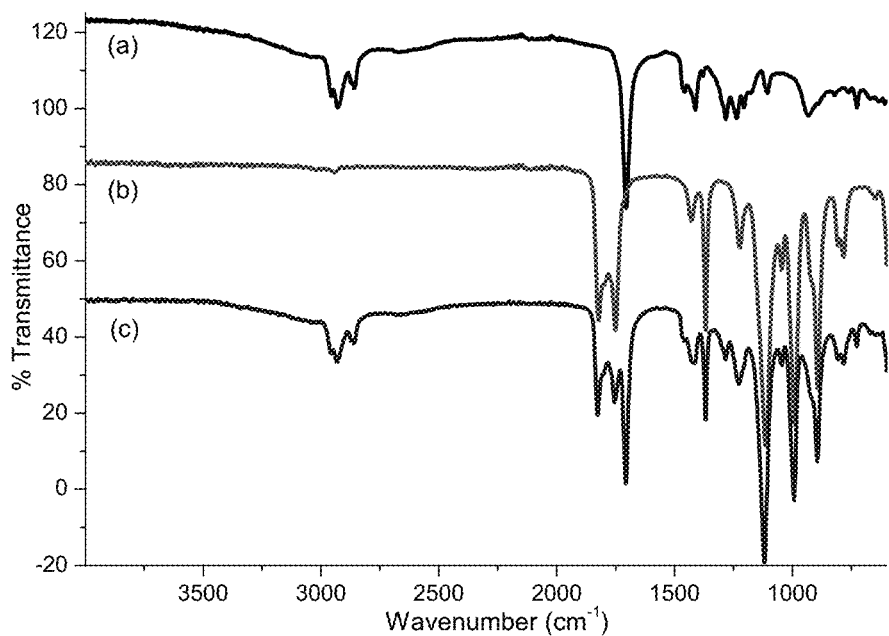
FIG. 4: Graph illustrating ATR-FTIR spectra a) pure heptanoic acid; b) pure acetic anhydride; c) mixture of heptanoic acid and acetic anhydride before microwave heating.

FIG. 4a shows the ATR-FTIR spectrum of pure heptanoic acid. Absorption peaks around 2800 $cm^{-1}$ are assigned to —$CH_2$ and —$CH_3$ groups in its long fatty alkyl chain, peak at 1706.6 $cm^{-1}$ is assigned to its carboxyl groups. FIG. 4b shows the ATR-FTIR spectrum of pure acetic anhydride. The two peaks for pure acetic anhydride at 1752.9 $cm^{-1}$ and 1826.3 $cm^{-1}$ are assigned to stretching vibrations of aldehyde carbonyl groups. FIG. 4c shows the ATR-FTIR spectrum of equal moles mixture of heptanoic acid and acetic anhydride before microwave heating. All peaks assigned to both heptanoic acid and acetic anhydride can be seen in this.

The High performance liquid chromatography (HPLC) analysis showed that at the end of the reaction, heptanoic acid was mostly consumed or gone and heptanoic-acetic anhydride and heptanoic anhydride remained. Same conclusion can be made based on ATR-FTIR analysis discussed above.

Figure 5:
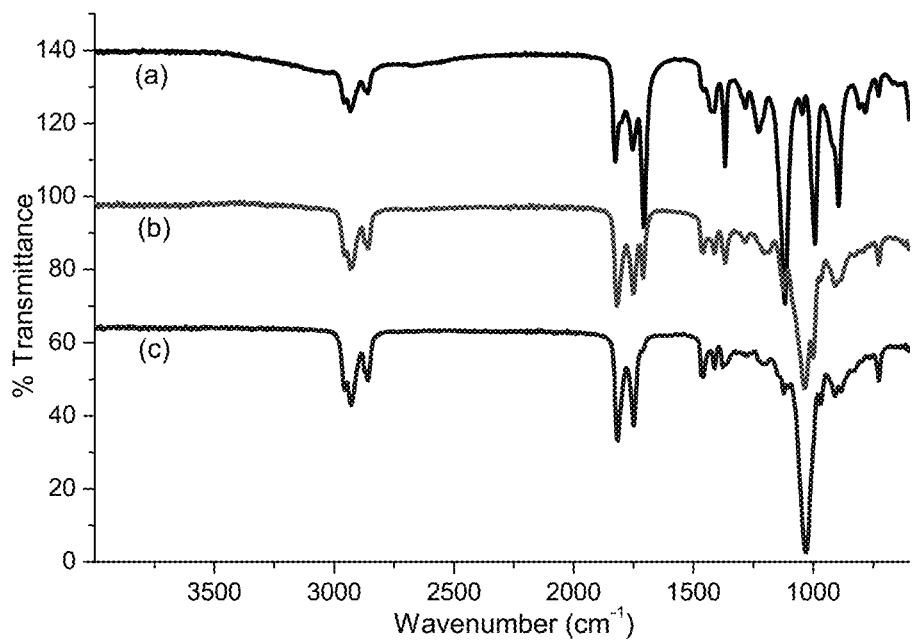
FIG. 5: Graph illustrating ATR-FTIR spectra of a) mixture of heptanoic acid and acetic anhydride before microwave heating; b) mixture of heptanoic acid and acetic anhydride after 100% power/8 min microwave heating; c) mixture of heptanoic acid and acetic anhydride after 100% power/15 min microwave heating.

FIG. 5a shows ATR-FTIR spectra of as-mixed equal moles of acetic anhydride and heptanoic acid (same as shown in FIG. 4c). FIG. 5b shows ATR-FTIR spectra of reaction mixture after microwave heating at 100% power for 8 min, the intensity of the peak at 1706.6 $cm^{-1}$ was significantly reduced. Since this peak is assigned to carboxyl group, the reduced peak intensity means a massive reduction in the quantity of heptanoic acid in the mixture. With further microwave heating to 15 min, as shown in FIG. 5c, the carboxyl peak at 1706.6 $cm^{-1}$ disappeared from the spectra, indicating the complete absence of the acid group. However, the intensity of two aldehyde peaks (1752.9 $cm^{-1}$ and 1826.3 $cm^{-1}$) remained unchanged. Based on FIG. 5c, we can conclude the formation of a new compound which contains alkyl chain and anhydride carbonyl group, in this case, heptanoic-acetic anhydride and heptanoic anhydride. However, from the ATR-FTIR spectra it is difficult to distinguish between heptanoic-acetic anhydride and heptanoic anhydride. As a result, end point of the reaction can only conclude complete consumption of heptanoic acid and formation of anhydride.

ATR-FTIR Analysis of Modified Cotton Fabric

Figure 6:
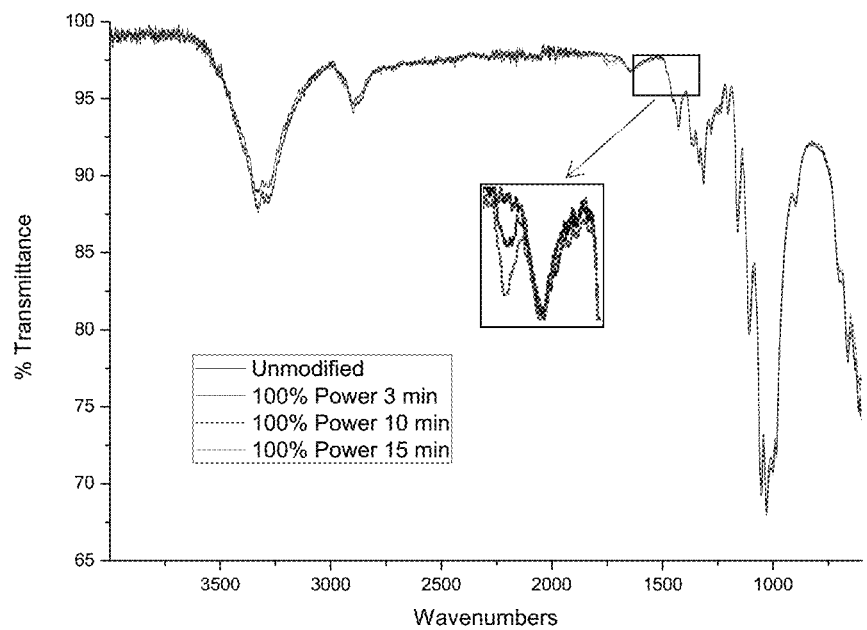
FIG. 6: Graph illustrating ATR-FTIR spectra of unmodified and hydrophobic modified cotton fabric.

ATR-FTIR was used to determine the ester formation and qualitatively compare the amount of ester group presented in cotton fabric treated to obtain hydrophobic characteristic. FIG. 6 shows ATR-FTIR spectra of cotton fabrics with different modification conditions (microwave heating times). When 100% power level of the microwave was used, increase in heating time from 3 min to 15 min resulted in larger peak intensity at 1728 $cm^{-1}$, indicating larger amount of fatty acyl groups grafted onto cellulose.

After 3 min heating at 100% power, the resulting cotton fabric shows no difference with pristine cotton fabric, which implies that there is only trace amount of fatty acyl groups were grafted or the amount is under the sensitivity of ATR-FTIR. However, spectra for cotton fabric after 10 min microwave heating shows new emerged peak at 1728 $cm^{-1}$. The cotton fabric with further heating time to 15 min shows an even stronger peak than one obtained for 10 min treatment.

Effect of Different Modification Conditions on Contact Angle

Figure 7A:
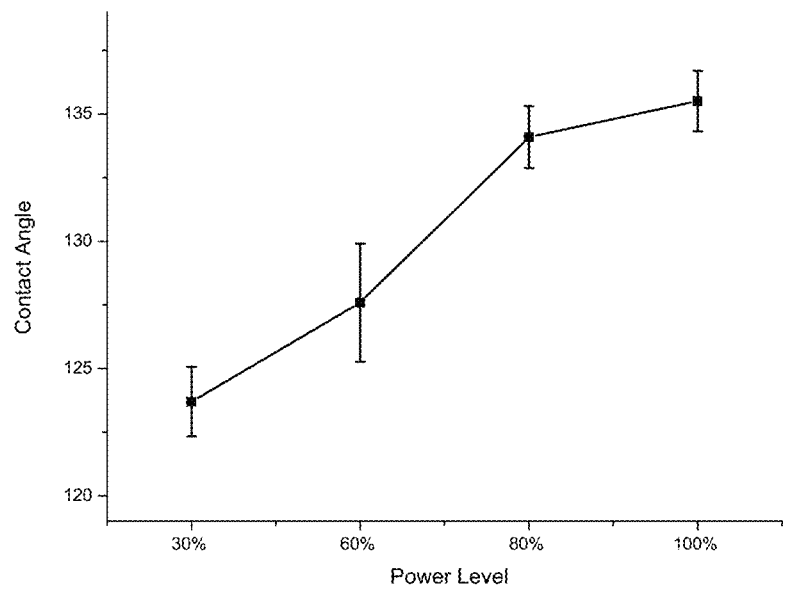
FIGS. 7A-7B: Graphs illustrating contact angles of modified cotton with different microwave heating conditions.

Hydrophobicity of the modified cotton fabric was evaluated by measuring contact angle with water. The pristine (unmodified) cotton fabric has a water contact angle of 0° since it spreads and/or absorbs water drop immediately. FIG. 7A shows that with 10 min of microwave heating a higher power level resulted in a higher contact angle. For example, at 30% power level, the corresponding contact angle was 123.7° and when the power level was increased to 100%, the corresponding contact angle reached 135.51°, an increase of about 12°.

Figure 7B:
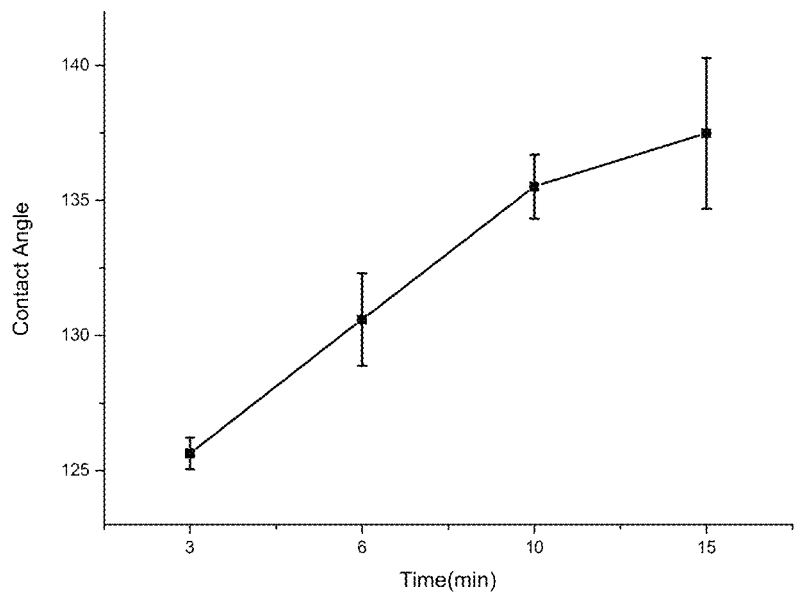

Similar method was used to evaluate the effect of microwave treatment time. The corresponding water contact angle was shown in FIG. 7B. When 100% power level was maintained, 3 min microwave treatment resulted in a hydrophobic cotton fabric with 125.64° of contact angle. The contact angle increased with longer treatment time. Contact angle reached 137.48 when 15 min of heating time was used.

Based on the results from FIG. 7, water contact angle shows a positive correlation with both power level and heating time. If the contact angle is solely considered, one can assume that the value can increase further with a longer microwave treatment time. However, it's true with a certain limitation. Microwave treatment is well known for its high energy efficiency for generating high temperature in a short time. However, FIG. 5 reveals that the reaction temperature has perhaps gone beyond the boiling point of heptanoic acid (223° C.). At such high temperature, the degradation of cellulose and loss of reactant due to evaporation can be significant.

Figure 8:
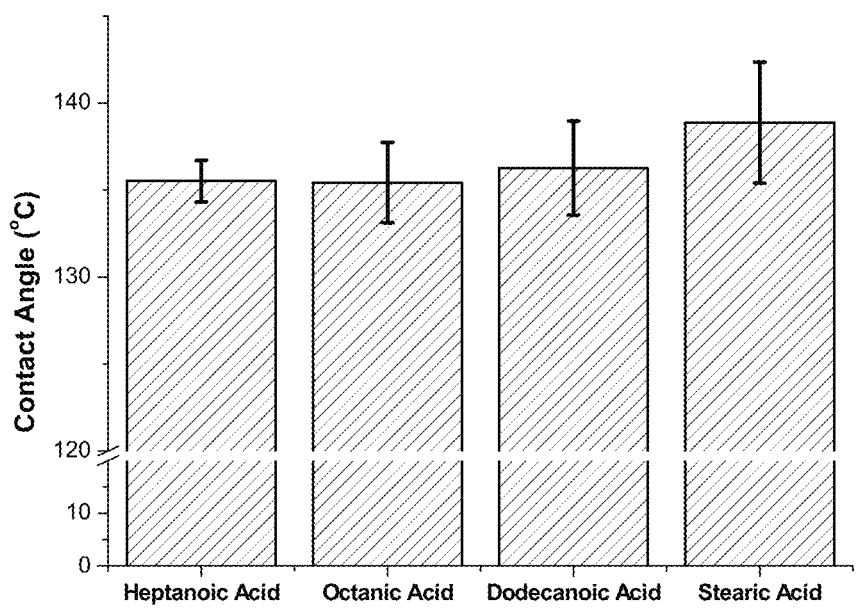
FIG. 8: Graph illustrating effect of fatty acid (alkyl) chain length on contact angle.

The effect of fatty chain length on contact angle was tested by using fatty acids with different chain length. Microwave treatment condition was set at 100% power level for 15 min. Fatty acids selected for this study were heptanoic acid, octanic acid, dodecanoic acid and stearic acid with carbon atoms in the alkyl chain of 7, 8, 12 and 18, respectively. It is expected that fatty acid with a longer alkyl chain will have a lower surface energy. By grafting fatty acyl groups on the surface of cotton, its surface energy (or surface tension) can be significantly reduced. For similar surface roughness, the surface energy has negative relationship with contact angle. Contact angle values for these fatty acids grafted onto cotton fabrics are listed in Table 1. The contact angle value only shows a 3.3° difference between them. This is probably due to the fact that only a small quantity of fatty acyl groups were grafted onto the cotton surface. As a result, the difference in surface energy and the contact angle is not significant. However, the data suggest that there may be a positive correlation between the chain length and the contact angle. FIG. 8 shows the histogram for the data listed in Table 1.

Unpaired t-test was used to determine if the contact angle values are significantly different. Results shown that at 95% confidence interval, the two-tailed P value equals 0.1887, which means there is no statistically significant between heptanoic acid and stearic acid treatment.

TABLE 1

Effect of fatty chain length grafted onto cotton on contact angle

| Specimens | Number of Carbon | Contact angle (°) Mean | St. Dev. |
|---|---|---|---|
| heptanoic acid | 7 | 135.51 | 1.19 |
| octanic acid | 8 | 135.42 | 2.31 |
| dodecanoic acid | 12 | 136.26 | 2.71 |
| stearic acid | 18 | 138.87 | 3.48 |

Mechanical Property Analysis

As mentioned previously, the high temperature generated by microwave treatment can cause cellulose degradation. To study this, tensile properties of the cotton yarns, both warp and weft, were studied for different treatment conditions. The results of the tensile tests are shown in Table 2. Pristine (untreated) cotton yarn showed a tensile stress at break of 733.43 MPa for warp and 630.15 MPa for weft. With 10 min microwave treatment but power levels ranging from 30% to 100%, tensile stress at break underwent a gradual decrease, confirming the cotton fiber degradation. For 100% power level and 10 min microwave treatment was applied, the warp retained 80.3% of its original strength whereas for weft it was 73.2%.

Figure 9A:
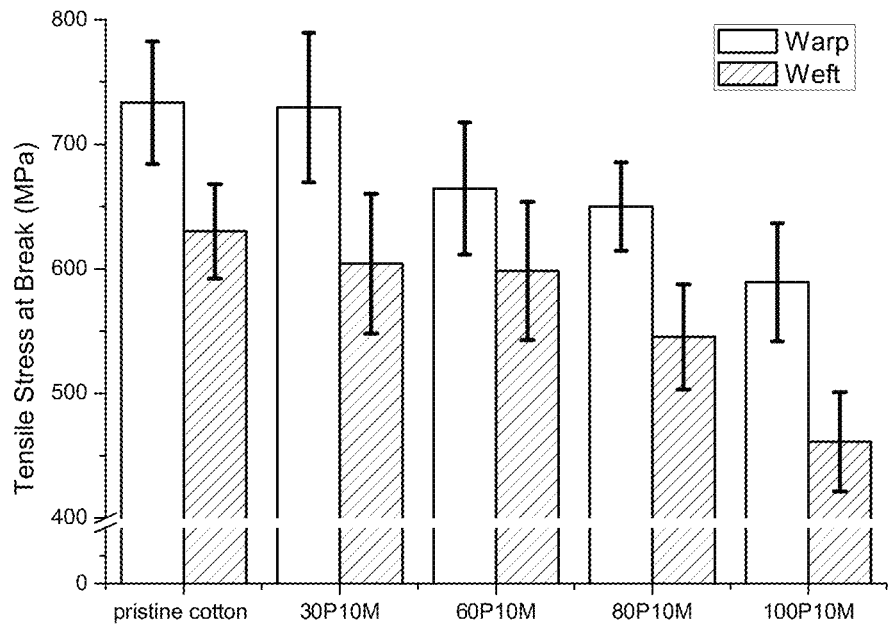
FIGS. 9A-9B: Graphs illustrating tensile test of cotton yarn.
Figure 9B:
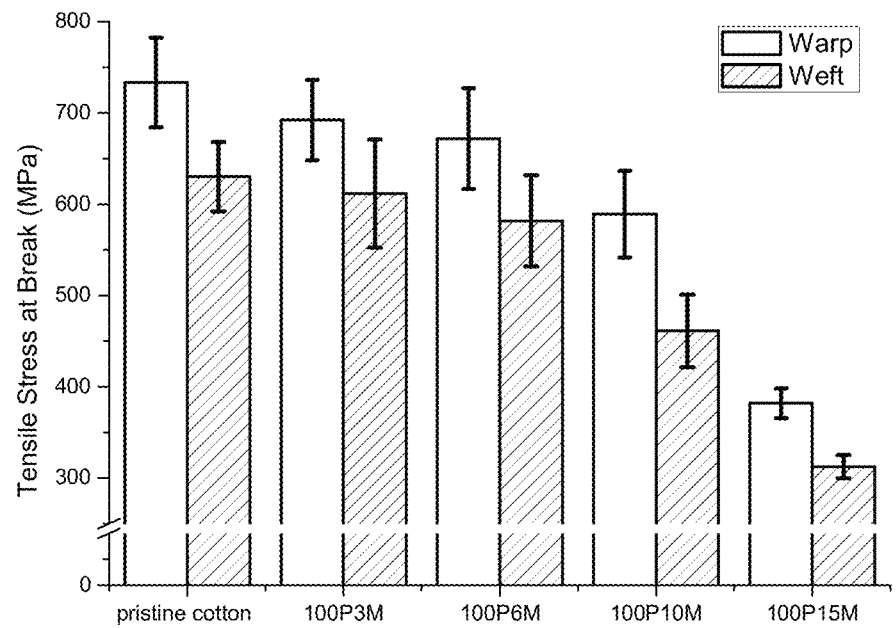

For 100% power level of microwave heating with times ranging from 3 to 15 min, tensile stress at break initially underwent a gradual decrease. However, after 15 min treatment, a huge drop was observed. For cotton yarn exposed to microwave treatment at 100% power level for 15 min, only 52.1% strength was retained for warp and 49.60% for weft. These results imply that between treatment times of 10 to 15 min, reaction temperature reaches a high point causing serious degradation of cellulose. FIGS. 9A and 9B show the histograms of tensile test data shown in Table 3 for easy comparison.

TABLE 2

Tensile Test Results for Cotton Yarns

| | Tensile Stress at Break (MPa) | | | | | |
|---|---|---|---|---|---|---|
| | Warp | | | Weft | | |
| Specimens | Average | St. Dev. | % Retained | Average | St. Dev. | % Retained |
| pristine cotton | 733.43 | 49.24 | | 630.15 | 37.88 | |
| 30% Power/10 min | 729.39 | 59.95 | 99.45 | 6017 | 56.15 | 95.88 |
| 60% Power/10 min | 664.52 | 52.90 | 90.60 | 598.34 | 55.49 | 94.95 |
| 80% Power/10 min | 649.98 | 35.42 | 88.62 | 545.37 | 42.34 | 86.55 |
| 100% Power/10 min | 589.21 | 47.37 | 80.34 | 461.25 | 39.90 | 73.20 |
| 100% Power/3 min | 692.32 | 43.96 | 94.39 | 611.74 | 59.26 | 97.08 |
| 100% Power/6 min | 671.69 | 55.24 | 91.58 | 581.66 | 50.04 | 92.31 |
| 100% Power/15 min | 381.93 | 16.25 | 52.07 | 312.53 | 12.77 | 49.60 |

Laundry Durability Test

With chemically grafted fatty acyl chain, durability of the hydrophobic characteristic of the cotton fabric can be expected to be longer than any other physical coating methods. In this study Tide® detergent was used to evaluate the laundry durability. The fabric was passed through several laundry cycles. Fabrics treated at higher microwave power level showed that more laundry cycles were needed before the fabric became hydrophilic. The laundry durability test results are shown in Table 3. When same 10 min treatment was applied, 30% microwave power level only retained hydrophobicity for 3 laundry cycles and the number increased significantly to 31, when 100% power level was applied. Same phenomenon was observed in the case of 100% microwave power level but different treatment times. Treatment for 3 min again retained hydrophobicity for 3 cycles of laundry, number increased to 35.7, when 15 min of heating time was used.

TABLE 3

Laundry durability test

| Specimens | Cycle of laundry test | | | Average | St. Dev. |
|---|---|---|---|---|---|
| 30% Power/10 min | 3 | 3 | 3 | 3 | 0 |
| 60% Power/10 min | 10 | 12 | 12 | 11.3 | 1.15 |
| 80% Power/10 min | 23 | 22 | 24 | 23 | 1 |
| 100% Power/10 min | 31 | 29 | 33 | 31 | 2 |
| 100% Power/3 min | 2 | 3 | 3 | 2.67 | 0.57 |
| 100% Power/6 min | 17 | 15 | 17 | 16.3 | 1.15 |
| 100% Power/15 min | 35 | 35 | 37 | 35.7 | 1.15 |

Figure 10:
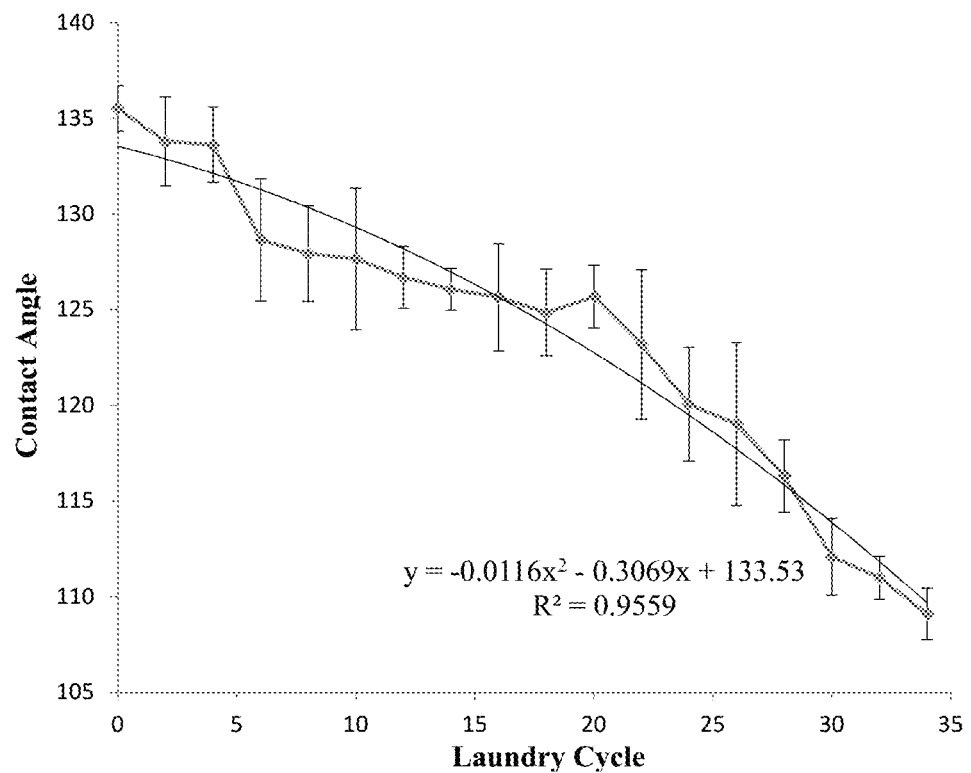
FIG. 10: Graph illustrating change in contact angle as a function of laundry cycles.

FIG. 10 shows the change in water contact angle as a function of laundry cycles. Contact angle values decrease gradually with laundry cycles. When contact angle approached 105°, the cotton fabric could no longer retain water droplet for 10 seconds, the water droplet was absorbed by cotton fabric. As a result, the fabric was classified as non-hydrophobic. The decrease in contact angle can be explained by the hydrolysis of ester group with the present of detergent.

Theory of Superhydrophobicity

From thermodynamics point of view, the contact angle on a flat surface is determined by interfacial surface tension of solid, liquid and vapor phases. It can be calculated by Young's equation:

$$\cos\theta = \frac{\gamma_{sv} - \gamma_{sl}}{\gamma_{lv}} \quad (1)$$

where, $\theta$ is the apparent contact angle on a flat surface, $\gamma_{sv}$, $\gamma_{sl}$ and $\gamma_{lv}$ stand for the interfacial surface tension of solid-vapor, solid-liquid and liquid-vapor, respectively [7].

By definition, superhydrophobicity refers to a surface with static water contact angle larger than 150° as well as low water contact angle hysteresis (usually lower than 10°) [8]. It's widely accepted that surface wetting property is govern by two key parameters, surface morphology and surface energy [9]. With a fixed surface morphology, lower surface energy will always lead to a higher contact angle. Also, by altering the surface morphology for a specific surface energy material, the contact angle will change based on roughness.

It's worth to mention that a complete flat surface with lowest known surface energy, 6.7 mJ/m$^2$, can only achieve water contact angle of 119° [10]. With the limited improvement of hydrophobicity by reducing surface energy of materials, significant efforts have been made to tailor the surface morphology. Several comprehensive reviews are available for this subject, [7, 9] they summarizes different strategies to fabricate superhydrophobic surface with hierarchical structure, especially micro and nanometer scale roughness.

Figures 11A, 11B:
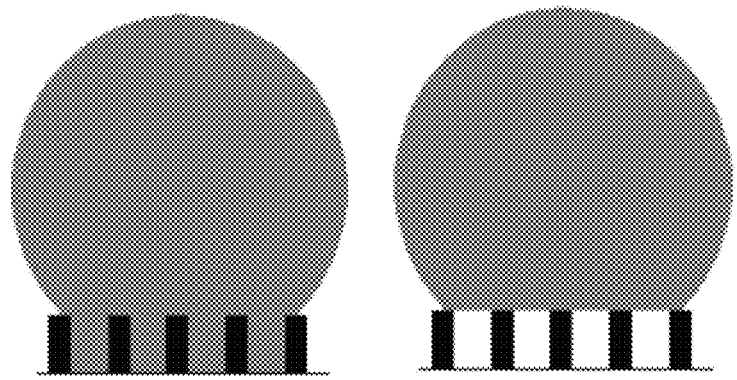
FIGS. 11A-11B: Schematics illustrating liquid droplet deposited on rough surface.

Two theoretical models have been widely accepted to explain the superhydrophobic phenomenon, they are Wenzel model [11] and Cassie-Baxter model [12]. Based on Wenzel model, the liquid follows the contours of a rough surface as shown in FIG. 11A. The contact angle on this type of surface can be calculated by Wenzel's equation [11]:

$$\cos \theta^W = r \cos \theta \quad (2)$$

where, r is roughness factor for solid phase, it represents the ratio of the actual surface area to its horizontal projection (r should always be larger than 1). $\theta^W$ is the contact angle under Wenzel state, $\theta$ is the apparent contact angle on a flat surface of that same material.

Based on this model, a hydrophobic surface should have $\theta^W > \theta > 90°$, and for a hydrophilic surface, $\theta^W < \theta < 90°$. In other word, based on the nature of material, hydrophobicity or hydrophilicity can be enhanced with increase of surface roughness. Moreover, due to the strong adhesive force between water and solid, a water droplet in Wenzel state is described as "sticky" [7].

However, Cassie-Baxter model suggests that water will only contact with the top of asperities, there will be air trapped between water droplet and solid phase, as shown in FIG. 11B. The Cassie-Baxter's contact angle can be calculated as following [12]:

$$\cos \theta^C = f \cos \theta - (1-f) \quad (3)$$

where, f is the fraction of the solid/liquid interphase and (1−f) is the fraction of the vapor/liquid interface. $\theta^C$ is the contact angle under Cassie-Baxter state, $\theta$ is the apparent contact angle on a flat surface of that same material.

Under Cassie-Baxter state, liquid has less contact area with solid phase than Wenzel state, which means a weaker adhesion between them. Thus, a water droplet under Cassie-Baxter state is often described as "non-sticky" and it will fall off from the solid surface with a slight inclination [7].

Researchers further developed these two models by introducing critical angle, $\theta_c$, for transition from Wenzel to Cassie-Baxter state, $\theta_c$ can be calculated by following equation:

$$\cos \theta_c = \frac{f-1}{r-f} \quad (4)$$

A contact angle larger than $\theta_c$ meaning the liquid droplet is in Wenzel state; otherwise, the liquid droplet will be in Cassie-Baxter state [7, 13].

Preparation of Amine-Silica Particles

Amine-silica nanoparticles were prepared by modified Stöber method [14], procedures are described as following: 50 mL of absolute ethanol, 1 mL of water and 1 mL of NH$_4$OH (conc. 28%) were mixed together in 125 mL Erlenmeyer flask; mixture was stirred for 5 min to form a uniform solution. Then 4 mL TEOS was quickly added into solution with stir speed at 500 RPM at room temperature. After 30 min, different predetermined amounts of (3-Aminopropyl) triethoxysilane (APTES) were added into each solution. Same stirring speed was maintained and reaction was kept going for 12 hr at room temperature. Amine-silica particles are purified by several cycles of centrifuging and dispersing in ethanol until supernatant didn't show purple color when heated together with ninhydrin.

Deposition of Amine-Silica Particles onto Cotton Fabric

Several strategies were used to deposit amine-silica particles onto cotton fiber surface.

Physical deposition method involves physical deposition of amine-silica particles onto the cotton fiber surface. Amine-silica particle dispersions with desired concentrations were prepared. Absolute ethanol was used as solvent. At least 1 hr of ultrasonication was performed to uniformly disperse the particles. Ethanol washed cotton fabric was cut into 5×5 cm specimens and immersed in amine-silica particle dispersion for desired length of time (30 min). Fabric was dried in an air circulating oven at 130° C. for 30 min.

Covalent bonding method involves covalent bonding amine-silica particles onto cotton fiber surface. Cotton fabric was first treated with 1,2,3,4-Butanetetracarboxylic acid (BTCA). BTCA treated cotton with free carboxyl group on surface can be further reacted with amine-silica particles to achieve covalent bonding. The detailed BTCA treatment was described as follows:

A 50 mL solution contains 10% (w/v) BTCA and 5% (w/v) sodium hypophosphite (SHP), as catalyst, was prepared. Ethanol washed cotton fabric was cut into 5×5 cm specimens and immersed into BTCA solution at 50° C. with stir speed at 80 revolutions per minute (RPM). After 10 min, the fabric was squeezed to maintain a reactant uptake around 100%, and then fabric was dried at 130° C. for 30 min. During this process, crosslinking in the bulk of cotton fabric was taken place. The fabric was then immersed in BTCA solution once more to allow more BTCA to penetrate into fabric structure. Same process as previously described was used. Finally, the cotton fabric was cured at 130° C. for 30 min again, to allow the reaction to be competed. BTCA treated cotton fabric was extensively washed with tap water to remove any residual chemicals, and dried in an air circulating oven.

Next step involving activation of carboxyl group by ethyl (dimethylaminopropyl) carbodiimide/N-Hydroxysuccinimide (EDC/NHS) coupling reaction. Fifty (50) mL 10 mM MES buffer solution contains 0.1 mM EDC and 0.4 mM NHS was prepared.

After that, the carboxyl group-activated cotton fabric was transferred into dispersed amine-silica NPs dispersion with desired concentration for 3 hr to allow complete reaction. Resulting cotton fabric was washed with tap water to remove any chemical residuals, and again, dried in an oven.

Crosslinking method also involves covalently bond amine-silica particles onto the surface of cotton fabric. Cotton fabric was first immersed in well dispersed amine-silica NPs solution with desired concentration. Mixture was stirred for 30 min to allow amine-silica particles to be physical adsorbed onto cotton surface. Cotton fabric was then dried in oven at 130° C. for 30 min followed by BTCA treatment. Same procedures were used as described in "Covalent bonding method". During the finally curing step, crosslinking reaction was expected to happen within cellulose, between top layer of cellulose and amine-silica particles, as well as within agglomerated amine-silica particles.

Resulting cotton fabric was washed with tape water to remove any chemical residuals, and again, dried by oven.

Green crosslinking method has similar procedures described above for the "Crosslinking method" except that different crosslinking agents were used. Dastidar and Netravali [15] reported that oxidized sugar can be potentially used as a green crosslinker. After further investigation, following method was developed to prepare green crosslinker:

Twenty (20) g of sucrose (or glycerol) was added into 150 mL distilled water in a 500-mL flask and stirred for 5 min to completely dissolve the sucrose. Then 50 mL of hydrogen peroxide (30%) was added to the solution, which made the final hydrogen peroxide concentration to be 7.5%. The oxidation reaction was performed at 60° C. for 12 hr. These conditions may be varied depending on the needs (reaction time can range from 30 min to 24 hrs, and temperature can range from 25° C. to 90° C.). The oxidized sucrose was dried in oven at 50° C. for at least 2 days to obtain highly viscous liquid or even solid. In order to remove any residual hydrogen peroxide, oxidized sucrose can be re-dissolved and dried one or more times.

Upon oxidation, the primary hydroxyl groups in sucrose will be oxidized into aldehyde or carboxyl groups. The oxidized sucrose that has two or more aldehyde groups can be used as a crosslinker. Green crosslinker was expected to crosslinking amine-silica particles as well as covalently bond particles onto cotton surface. Similar procedures were used as BTCA treatment by replacing BTCA by the green crosslinker.

Scanning Electron Microscopy

Scanning electron microscope (SEM, Tescan-Mira3-FE-SEM) was used to observe the surface morphology of fibers. Specimens were oven dried and sputter coated with gold. Images were captured at an accelerating voltage of 5 kV.

Ninhydrin Test for Amine Content Determination

A 0.35% (w/v) ninhydrin solution in absolute ethanol was freshly prepared. APTES solutions with different concentration of were used to build calibration curve. Amine-silica specimen was dried at 120° C. for 4-6 h, and then 0.2 g of specimen was placed in a capped vial containing 4 mL of absolute ethanol. The mixture was placed in a bath ultrasonicator for 30 min. Then, 1 mL of ninhydrin solution was added to the vial containing the sample and it was ultrasonicated for 10 more minutes. The ninhydrin-specimen dispersion was then placed in a water bath at 65° C. for 30 min. The sample was centrifuged at 10000 RPM for 15 min. Approximately 1 mL of supernatant was pipetted out and the absorbance at 568.11 nm was measured in an Agilent 8453 spectrophotometer. Measurements were repeated three times, average number was used to construct the calibration curve.

Preparation of Amine-Silica Submicron and Nanoparticles

Amine-silica particles were prepared based on Stöber method [14]. By changing reactant ratio, amine-silica particles with different sizes were obtained. FIGS. 12A and 12B show SEM images of amine-silica particles. Average diameter of particles was calculated by randomly measuring 50 particles. Results showed that the larger (submicron) particles have an average diameter of 458 nm and smaller (nanoparticles) ones have 107 nm. SEM images revealed that the particles had spherical morphology.

Recipes for the preparation of two amine-silica particles are summarized below:

(1) 107 nm amine-silica particles:
  Step 1: mix 1 mL $NH_4OH$, 1 mL $H_2O$ and 50 mL ethanol.
  Step 2: add 4 mL TEOS.
  Step 3: after 30 min stirring, add 3 mL APTES. Keep stirring for 12 hr.
  Step 5: Purification.

(2) 458 nm amine-silica particles:
  Step 1: mix 4 mL $NH_4OH$, 2 mL $H_2O$ and 50 mL ethanol.
  Step 2: add 4 mL TEOS.
  Step 3: after 30 min stirring, add 3 mL APTES. Keep stirring for 12 hr.
  Step 5: Purification.

ATR-FTIR technique was used to measure the amine-silica particles powder. The obtained ATR-FTIR spectra of amine-silica particles and pure APTES were illustrated in FIG. 13. APTES has one primary amine group in its chemical structure, the peak at 1552 $cm^{-1}$ is assigned to the primary amine group and it can be seen from ATR-FTIR spectra of pure APTES. However, the amine group peak at 1552 $cm^{-1}$ was not detected in the case of amine-silica particle [16]. It's not clear why the amine group didn't appear on ATR-FTIR spectra. A possible explanation is that the amine group content is below the detection limit of ATR-FITR spectroscopy.

Figure 14:
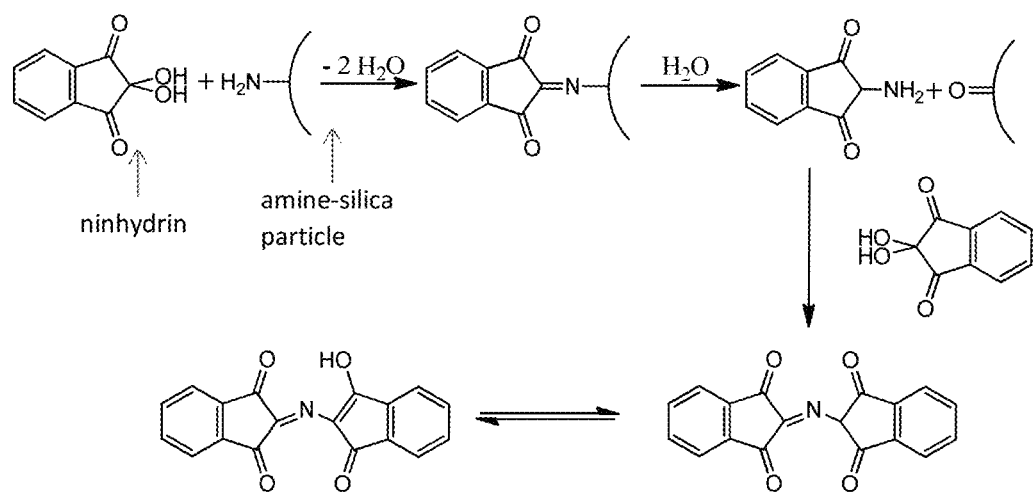
FIG. 14: Reaction mechanism between ninhydrin and amine-silica particles

Ninhydrin test was also used to detect the amine group, ninhydrin can readily react with primary and secondary amines, and the resulting compound produces a purple color. With the help of UV-vis spectroscopy the amount of amine group can be quantitatively determined. FIG. 14 shows the reaction mechanism between ninhydrin and amine-silica particles.

Figure 15:
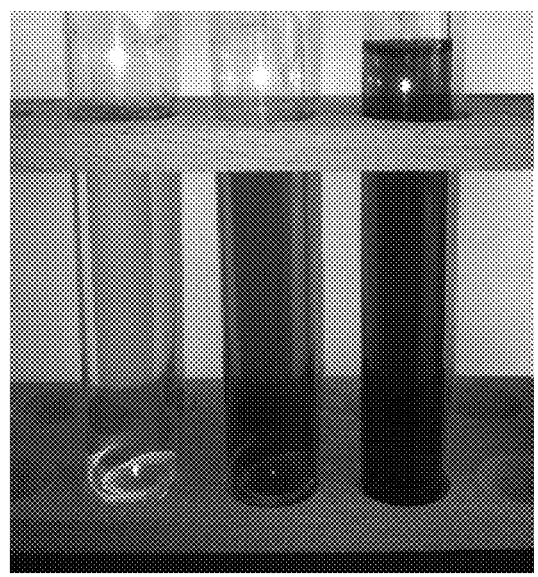
FIG. 15: Photograph of supernatant of amine-silica particle reacted with ninhydrin. From left to right, APTES concentration becomes higher.

Calibration curve was constructed with different known concentrations of APTES solutions, and followed by ninhydrin reaction. APTES was used because it contains one primary amine group, and it's also a raw material for amine-silica particle synthesis. Higher concentration of APTES resulted in a solution with deeper purple color. FIG. 15 shows the color difference in ninhydrin reacted amine-silica particle specimens ready for UV-vis spectroscopy measurement.

Figure 16:
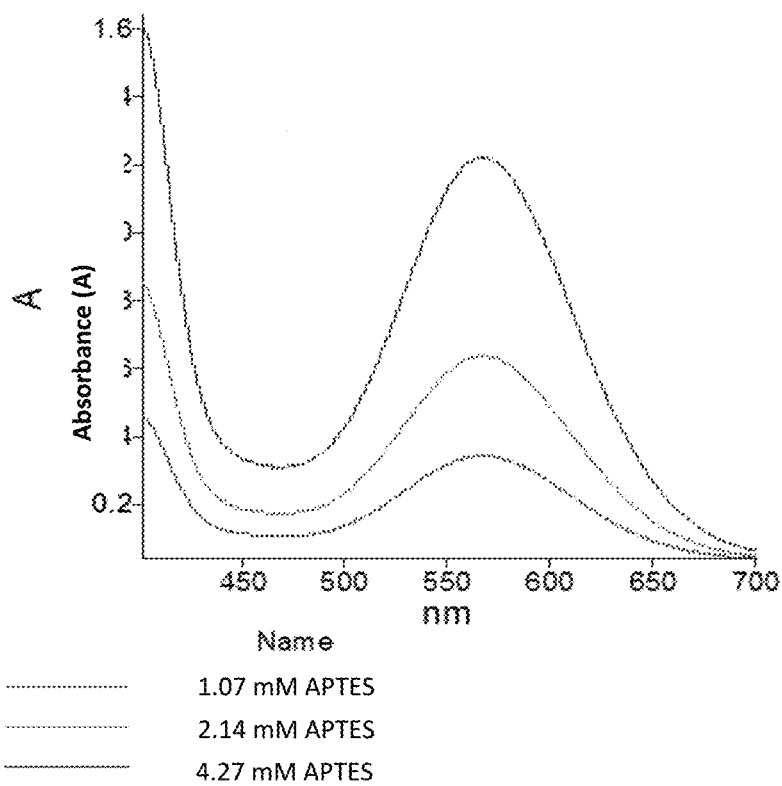
FIG. 16: Graph illustrating UV-vis spectrums of different ninhydrin reacted APTES solutions.
Figure 17:
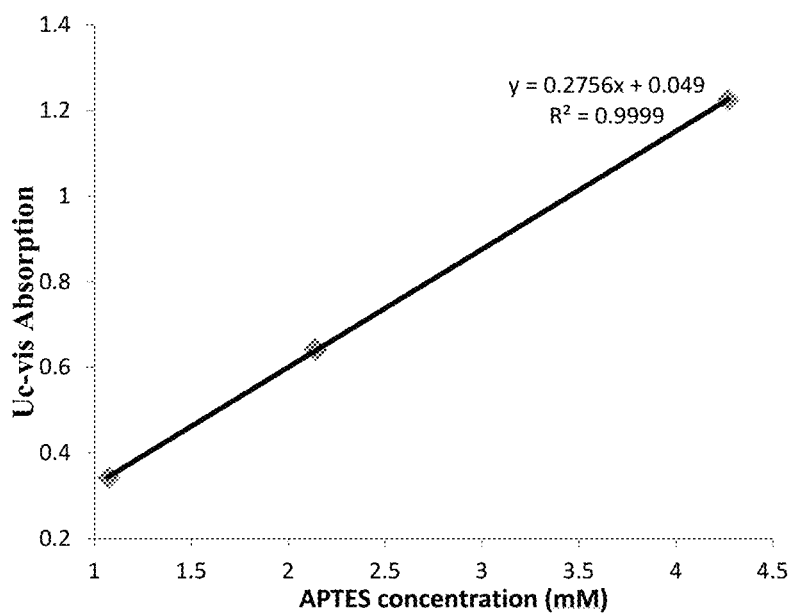
FIG. 17: Graph illustrating calibration curve for amine group concentration determination.

FIG. 16 shows the UV-vis spectra of previously mentioned specimens, the corresponding absorbance value at 568.11 nm was reported in Table 4. Based on the results in Table 4, calibration curve as shown in FIG. 17 was constructed, the UV-vis absorbance (y) and APTES concentration (x) has a linear relationship:

$$y=0.2756x+0.049 \qquad (5)$$

TABLE 4

Absorbance values from UV-vis spectroscopy measurement.

| Specimens | Absorbance at 568.11 nm |
|---|---|
| 1.07 mM APTES solution | 0.084789 |
| 2.14 mM APTES solution | 0.52435 |
| 4.27 mM APTES solution | 1.1954 |

With the help of the calibration curve, amine group concentration for amine-silica particles with different preparation methods can be calculated. Three different amine-silica particles were prepared. Their preparation procedures are summarized below:

Step 1: mix 1 mL of $NH_4OH$, 1 mL of $H_2O$ and 50 mL of ethanol.
Step 2: add 4 mL of TEOS.

Step 3: after 30 min stirring, add 0.2 mL of APTES (specimen: ASP #1) or 1 mL of APTES (specimen: ASP #2) or 3 mL of APTES (specimen: ASP #3).

Step 4: add 4 mL of TEOS, keep stirring for 12 hr.

Step 5: Purification.

Figure 18:
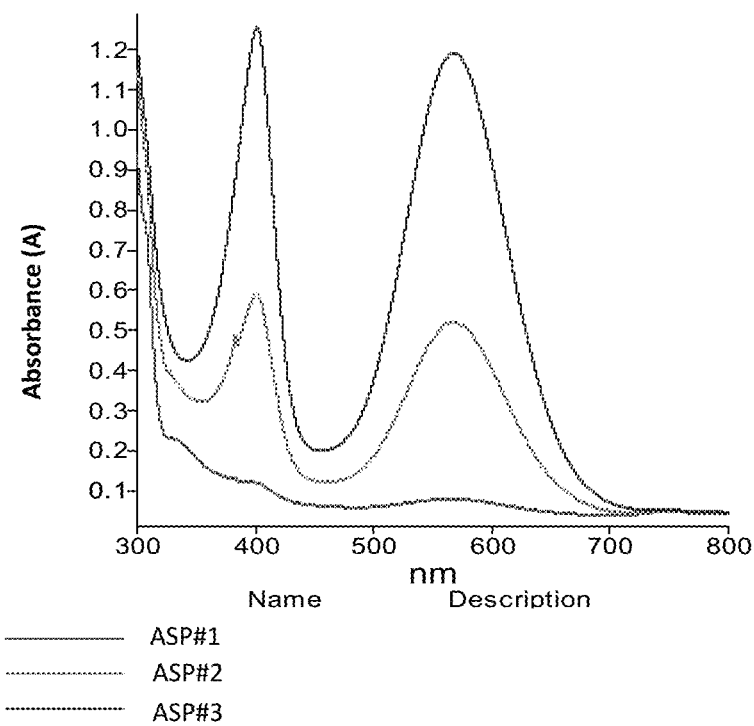
FIG. 18: UV-vis spectrums of different ninhydrin reacted amine-silica particle solutions.
Figures 19A, 19B:
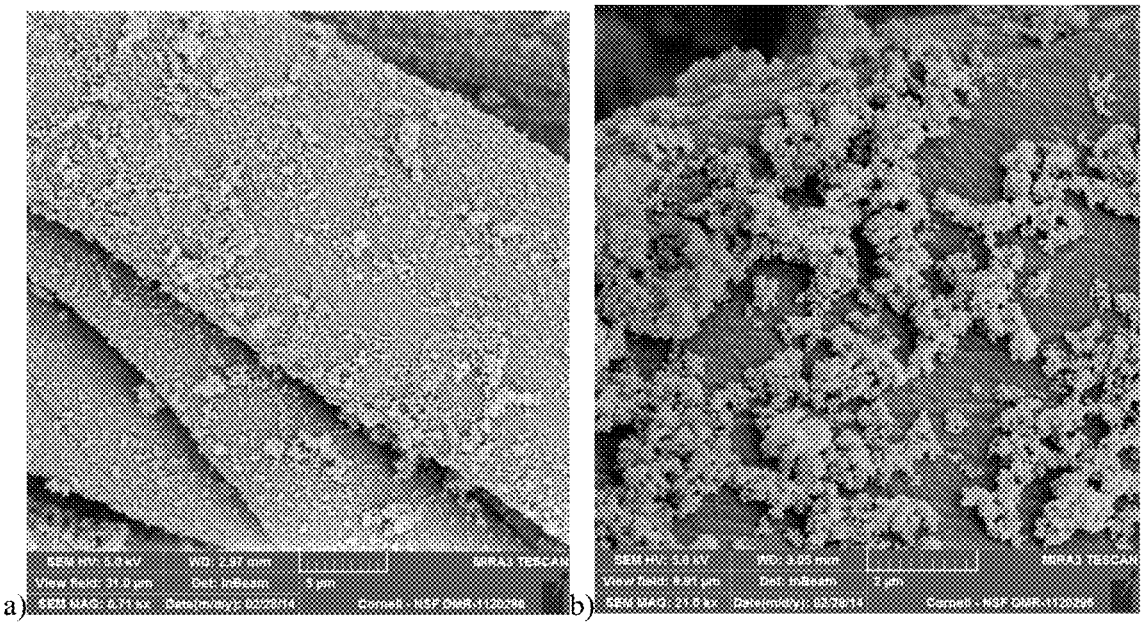

Since the only difference in the preparation methods was the amount of APTES added, the resulting specimens have similar properties except the surface amine group content. FIG. 18 shows the UV-vis spectra of those specimens, the corresponding absorbance values were recorded. Amine group concentration of the specimens can be calculated by Equation 8, the results are shown in Table 5. Specimen ASP #2 had 1 g of APTES added during the preparation step, 5 times more than ASP #1, surprisingly, amine group content in ASP #2 is 13 times more than ASP #1. However, with further increase of APTES amount to 3 g for ASP #3, about 2 times more amine group content was observed compared with ASP #2. Based on this result, it can be expected that amine group concentration can be further increased. Presence of more amine groups on the particle surface is highly preferred, since it means a higher chance for the particles to be bonded onto cotton surface.

TABLE 5

Quantitative determination of amine concentration on silica particle surface

| Specimens | Absorption (A) | Amine group conc. (mM) |
| --- | --- | --- |
| ASP#1 | 0.084789 | 0.130 |
| ASP#2 | 0.52435 | 1.725 |
| ASP#3 | 1.1954 | 160 |

Cotton Fabrics Treated with Single Size Particles

Single size amine-silica particle (nanoparticle: 107 nm) dispersions with different concentrations, 0.5%, 0.1% and 0.02% (w/v), were prepared. Physical deposited cotton fabric by different particle concentrations were prepared as described in "Physical deposition method" herein.

SEM images of final treated cotton fabrics are shown in FIGS. 19A-19D. As shown in all images, particles are not evenly distributed on the fiber surface, and their agglomeration forming different sizes can be detected. These agglomerations were expected to further increases the surface roughness, since the uniformly distributed layer of particles will result in a flattened surface. As mentioned by Bellanger et al., a rough surface is always preferred for hydrophobicity [8].

In addition, particle solution with higher concentration gives more particles on the fiber surfaces. There is a noticeable difference by comparing FIGS. 19B, 19C and 19D, where the corresponding amine-silica particle solution concentrations were 0.5%, 0.1% and 0.02%.

Figure 20C:
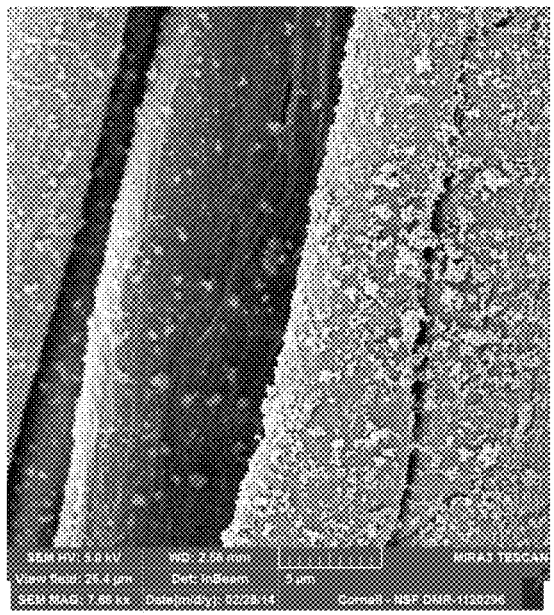
Figure 20D:
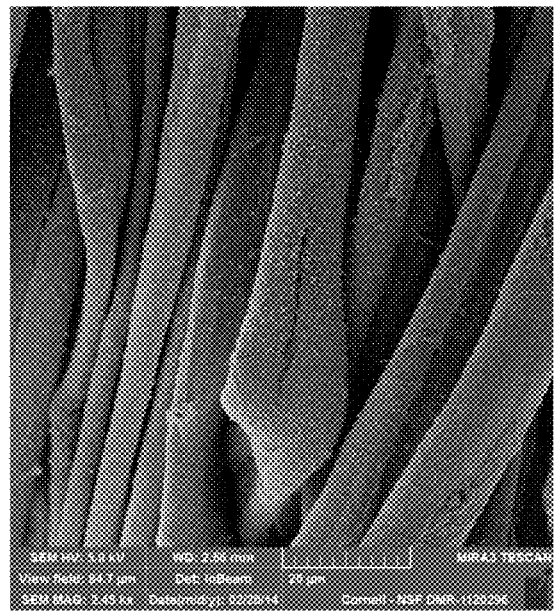
Figure 20E:
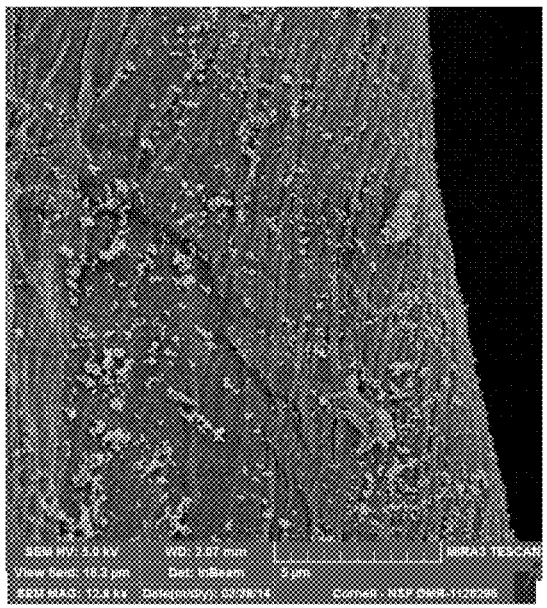
Figure 20F:
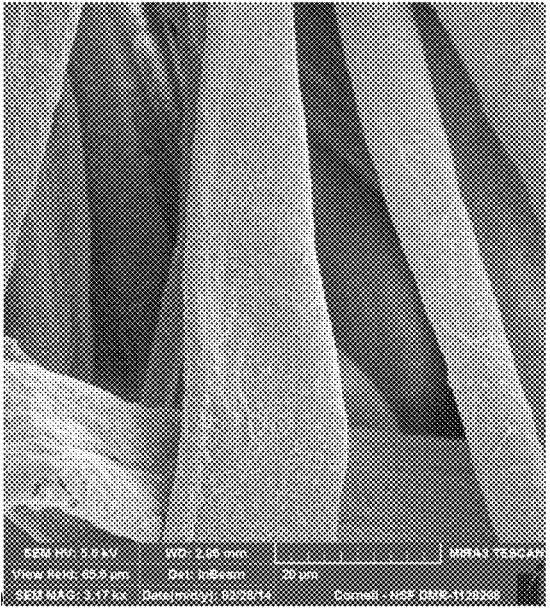
Figure 20G:
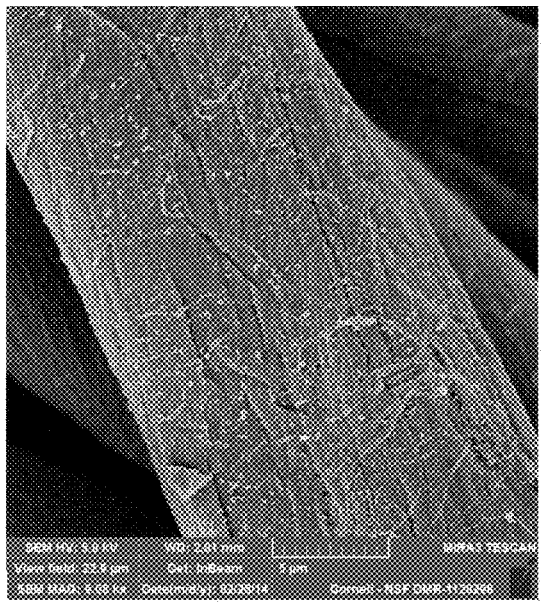
Figure 20H:
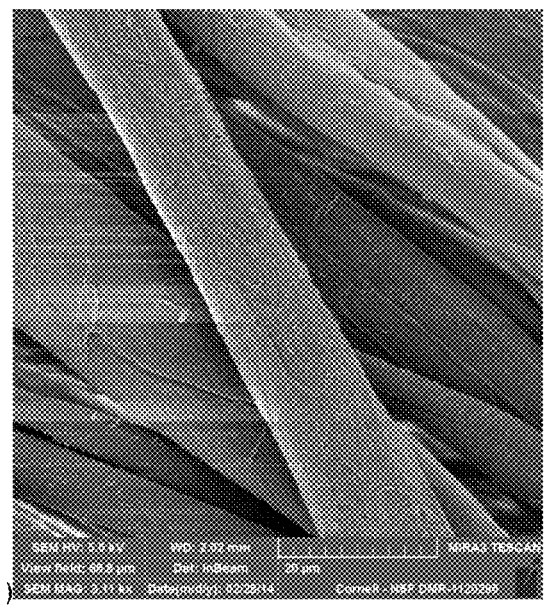

Ultrasonication of Cotton Fabric with Physically Deposited Single Size Particles Specimen as illustrated in FIG. 20A was used to measure the effects of ultrasonication on removal of physical adsorbed particles. Cotton fabric with physically deposited particles was immersed in water for ultrasonication. Ultrasonication will cause physically deposited particles to vibrate, and the loosened particles eventually leave the fiber surface and diffuse into water phase. SEM images were taken after different ultrasonication durations to obtain corresponding fiber surface topographical images.

FIG. 20 shows SEM images of cotton fabric with physically deposited particles with different ultrasonication durations. There is no significant difference by comparing SEM images of before ultrasonication specimen (FIG. 20A and FIG. 20B) and after 2 min of ultrasonication treatment (FIG. 20C and FIG. 20D). After 5 min of ultrasonication (FIG. 20E and FIG. 20F), the amount of large agglomerations had a noticeable decrease. However, smaller agglomerations were still retained on surface. After 10 min of ultrasonication, large agglomerations were completely removed, with one layer of small particles evenly distributed on cotton surface as shown in FIG. 20G and FIG. 20H.

As a result, ultrasonication was proved to remove majority physically deposited particles from cotton surface, and larger agglomerations are more likely to be removed than smaller agglomerations.

Hydrophobic Treatment for Cotton Fabric with Physically Deposited Particles

Cotton fabric with physically deposited amine-silica particles increased the surface roughness, however, in order to obtain hydrophobicity, cotton fabric still need to undergo hydrophobic treatment. Particles deposited cotton fabric was immersed in fatty anhydride solution, the mixture was heated at 100% microwave power for 10 min. During the treatment, fatty anhydride will react with both cellulose and amine-silica particles. Fatty anhydride reacts with hydroxyl groups on cellulose to form ester bond, and reacts with amine groups on amine-silica particle to form amide bond.

Figure 21A:
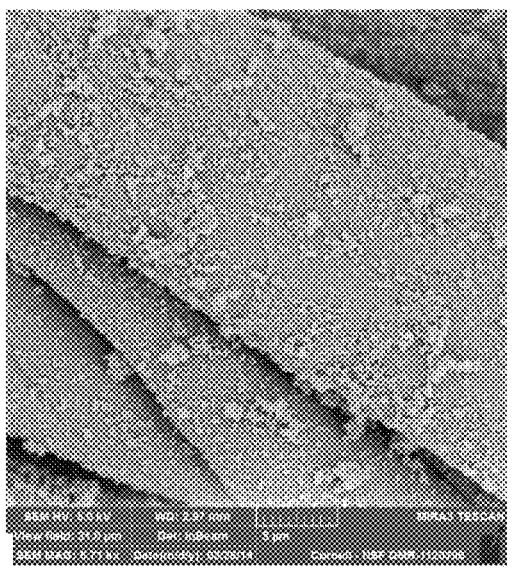
FIGS. 21A-21B: SEM images of cotton fabric with physically deposited amine-silica particles (FIG. 21A); and cotton fabric with physically deposited amine-silica particles followed by hydrophobic treatment (FIG. 21B).
Figure 21B:
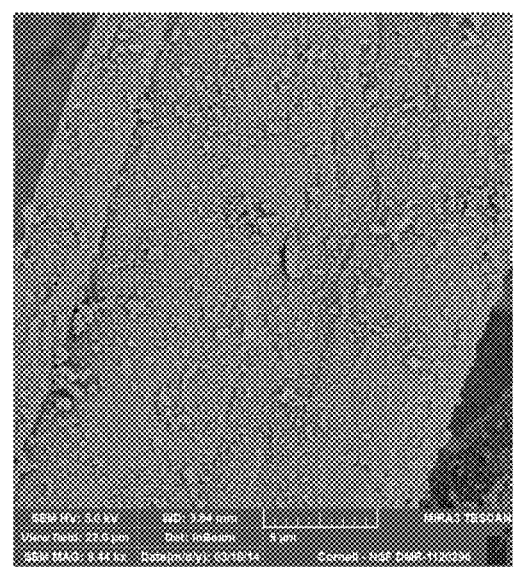

SEM analysis was conducted to study the influence of hydrophobic treatment on the surface morphology of the cotton fabric. FIGS. 21A-21B show SEM images of cotton fabric before and after the hydrophobic treatment. No significant difference was observed between these two images. Similar amount of both large and small agglomerations were seen on cotton fabric. From these images it may be concluded that the hydrophobic treatment does not influence the surface topography of physically deposited particles on cotton fabric.

Water contact angle of hydrophobic treated cotton fabrics were measured and the results are shown in Table 6. Hydrophobic cotton fabrics with deposited particles, all exhibit a higher water contact angle value than the control (hydrophobic treatment but with no particles deposited on the cotton fabric). In addition, with an increased concentration of amine-silica particle solution, more particles were deposited onto cotton surface, in other word, higher degree of surface roughness. As a result, fabric with higher concentration of amine-silica particle solution treatment leads to a higher water contact angle.

Cotton fabric treated in 0.02% amine-silica particle solution showed a 5.78° increase in water contact angle than control specimen. When 0.10% amine-silica particle solution was used, a 10.12° increase in water contact angle was obtained than control specimen. With further increase in amine-silica particle solution to 0.5%, a 12.37° increase in water contact angle was obtained than control specimen. Based on these results, it's expected that further increase in concentration of amine-silica particle solution will lead to a higher water contact angle. However, particle solution with high concentration will have difficulty for dispersion, and a very high load of particles onto surface will cause the initially roughened surface to be flattened. Flattened surface is expected to have reduced hydrophobicity.

Unpaired t-test was used to determine if the contact angle values are significantly different from each other. Results shown that at 95% confidence interval, there is no statistically significant between control and cotton fabric treated in 0.02% amine-silica particle solution, the two-tailed P value equals 0.0935. In addition, at 95% confidence interval, difference is not considered to be statistically significant between cotton fabric treated in 0.02% amine-silica particle solution and the one treated in 0.5% amine-silica particle solution, this the two-tailed P value equals 0.5874.

TABLE 6

Water contact angle results of hydrophobic cotton fabric with physically deposited particles

| Specimens | Water contact angle (°) | St. Dev. |
|---|---|---|
| Treated in 0.5% amine-silica particle solution | 144.88 | 2.23 |
| Treated in 0.1% amine-silica particle solution | 143.63 | 2.92 |
| Treated in 0.02% amine-silica particle solution | 139.29 | 2.74 |
| Control (no particle, hydrophobic treated) | 135.51 | 1.19 |

Effect of BTCA Treatment on Cotton Fabric

The purpose of BTCA treatment is to create pendent carboxyl groups on the surface of cotton fabric. Those carboxyl groups can be activated by EDC/NHS coupling reaction, then activated carboxyl groups can readily react with amine groups on the surface of amine-silica particle to form amide bond. As a result, amine-silica particles can be covalently bonded onto the surface of cotton fabric.

Figure 22:
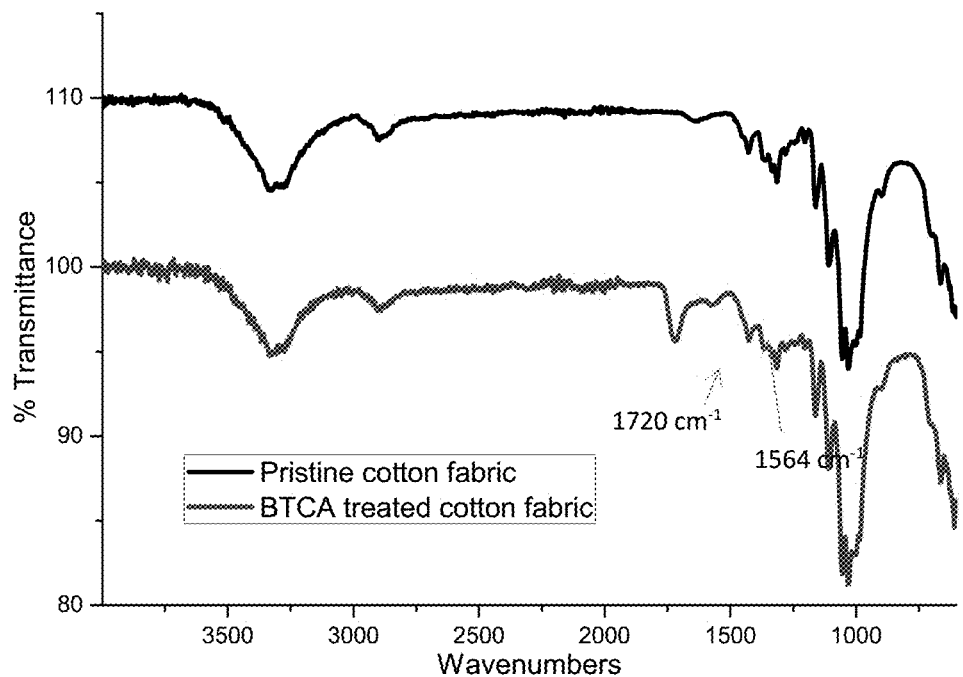
FIG. 22: Graph illustrating ATR-FTIR spectra of pristine cotton fabric and BTCA treated cotton fabric.
Figure 23:
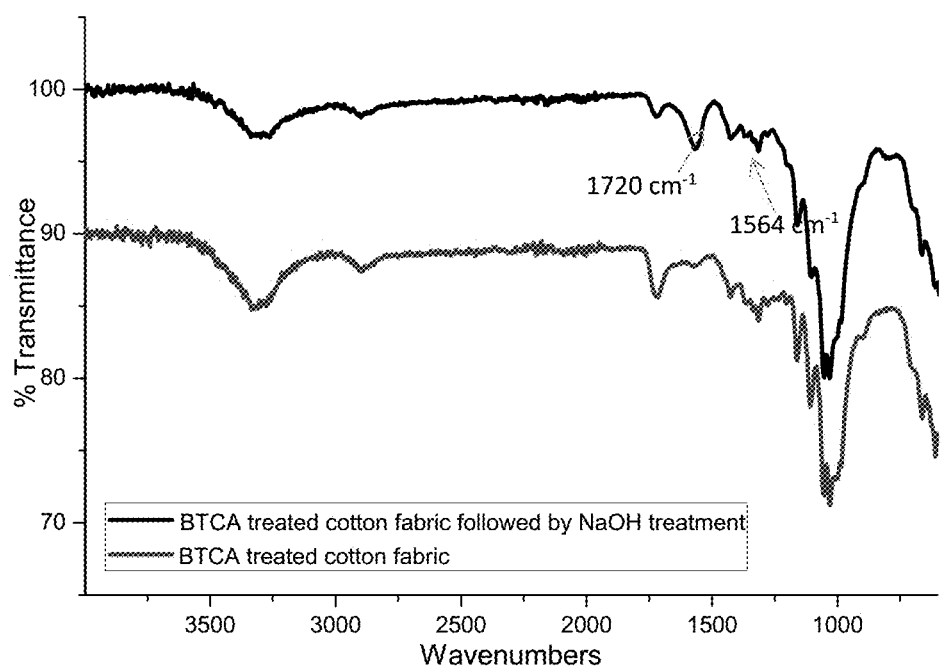
FIG. 23: ATR-FTIR spectra of BTCA treated cotton fabric and BTCA treated cotton fabric followed by NaOH treatment.
Figure 24A:
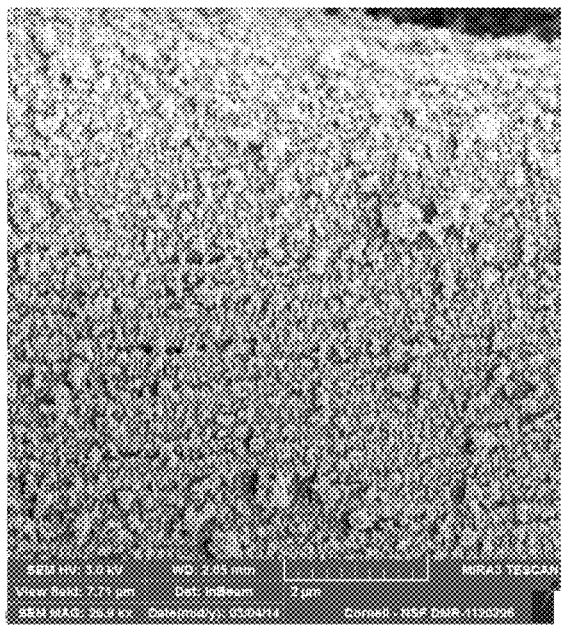
FIGS. 24A-24D: SEM images of cotton fabric treated with covalently bonding method, 0.5% amine-silica particle solution (FIG. 24A); 0.1% amine-silica particle solution (FIGS. 24B-24C); and 0.02% amine-silica particle solution (FIG. 24D).
Figure 24B:
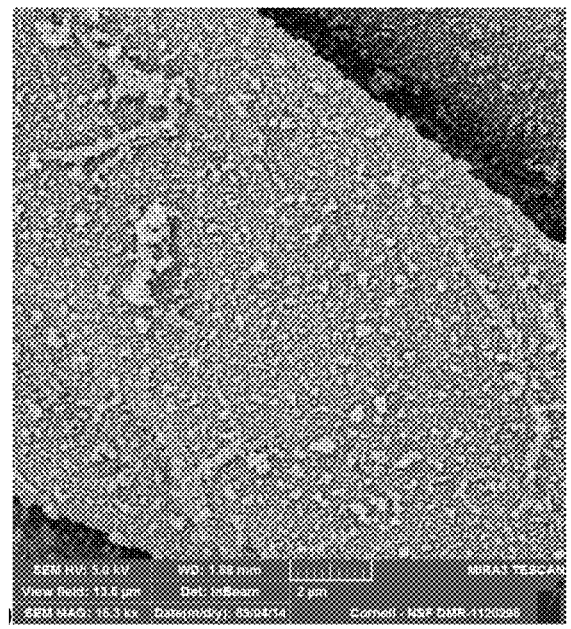
Figure 24C:
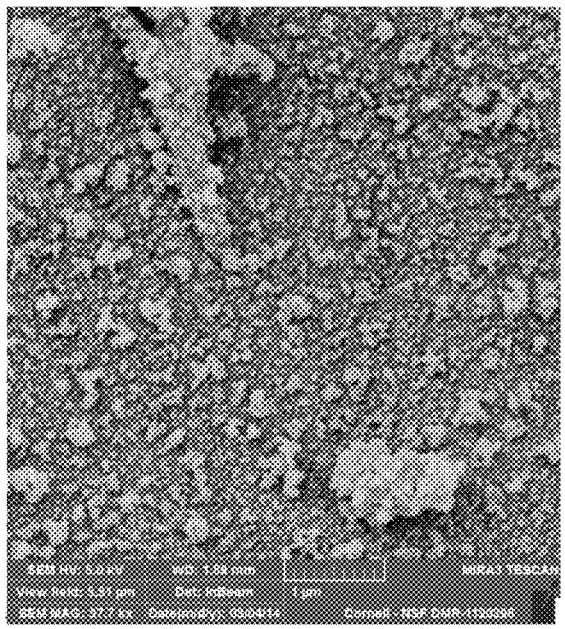
Figure 24D:
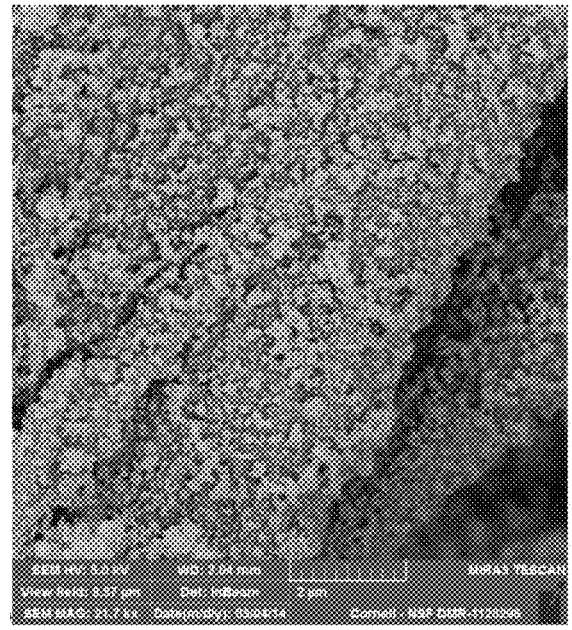

ATR-FTIR spectra of BTCA treated cotton fabric is shown in FIG. 22. The newly appeared peak at 1720 $cm^{-1}$ was assigned to both ester carbonyl group and carboxyl group. It's impossible to distinguish ester carbonyl group peak from carboxyl group peak due to overlapping. It's worthy to mention that there is a minor peak appeared at 1564 $cm^{-1}$ [17, 18], which is assigned to carboxylate group. By immersing BTCA treated cotton fabric in 0.1 M NaOH solution, the free carboxyl groups will react with NaOH to form carboxylate. The ATR-FTIR spectra of 0.1 M NaOH solution treated cotton fabric is shown in FIG. 23, the peak intensity at 1564 $cm^{-1}$ significantly increased indicated that BTCA treated cotton fabric has large amount of free carboxyl groups. Higher number of free carboxyl groups is always preferred in this situation, after activation by EDC/NHS coupling agent as higher number of free carboxyl groups will result in a higher probability of particle attachment.

Effect of Particle Deposition on BTCA Treated and Activated Cotton Fabric

BTCA treated cotton fabric has free carboxyl groups on the surface, and after EDC/NHS coupling reaction, those free carboxyl groups will be activated. Activated carboxyl groups will readily react with amine groups on amine-silica particles. Amine-silica particle solution with different concentrations, 0.5%, 0.1% and 0.02% (w/v), were prepared. BTCA treated cotton fabrics were immersed in particle solution with different concentrations. Room temperature stir of mixture for 3 hr was needed for reaction to reach completion.

SEM images of cotton fabrics treated with 'covalently bonding method' are shown in FIGS. 24A-24D. Similar surface morphology was obtained as compared with cotton fabric with 'physical deposition method'. Agglomerations of different sizes evenly distributed on fiber surface can be seen from the images. Amine-silica particle solutions with three different concentrations gave considerably similar surface morphology. This may be due to the fact that covalently bonding method involves 3 hr immersion time in amine-silica particle solution, much longer than physical deposition method (30 min). As a result, 3 hr immersion time seems to provide sufficient time for particles to be adsorbed onto the surface.

The major drawback of 'covalently bonding method' is that only the bottom layer of amine-silica particles can be covalently bonded with fiber surface. Beside bottom layer, all other particles in the agglomerations stayed in their position by physical attraction.

Hydrophobic Treatment of Cotton Fabric with Covalently Bonded Particles

Cotton fabric with covalently bonded particles was further treated with fatty anhydride to obtain hydrophobicity. Condition was set to be 100% microwave power and 10 min heating. During the treatment, fatty anhydride reacted with hydroxyl groups from cellulose to form ester bond and with amine groups on amine-silica particles to form amide bond.

Water contact angle of hydrophobic treated cotton fabrics were measured, the results are shown in Table 7. Hydrophobic treated cotton fabrics with covalently bonded particles all exhibited higher water contact angle values than the control (no particles deposited). This can be explained by the increase of surface roughness induced by amine-silica particles.

Interestingly, Hydrophobic treated cotton fabrics with 'covalently bonded particles' showed higher water contact angle value than those treated with 'physical deposition method'. By comparing SEM images obtained for those two methods, cotton fabrics treated with covalent bonding method showed a higher degree of roughness than those with physical deposition method. Covalent bonding method involves a longer particle deposition time to allow amide formation to be completed, also, it allowed more particles to be deposited on to fiber surface.

Cotton fabric treated in 0.02% amine-silica particle solution showed a 10.33 degree increase in water contact angle than control specimen. When 0.10% amine-silica particle solution was used, a 14.26 degree increase in water contact angle was obtained than control specimen. With further increase in amine-silica particle solution to 0.5%, a 13.31 degree increase in water contact angle was obtained than control specimen. Cotton fabric treated in 0.5% amine-silica particle solution showed a slightly lower water contact angle than fabric treated in 0.1% solution. However, unpaired t-test showed that at 95% confidence level, there is no statistically significance between water contact angle values obtained from 0.5% particle solution and 0.1% particle solution. The two-tailed P value was 0.2705.

TABLE 7

Water contact angle results of hydrophobic cotton fabric with covalently bonded particles

| Specimens | Water contact angle (°) | St. Dev. |
|---|---|---|
| Treated in 0.5% amine-silica particle solution | 148.82 | 3.54 |
| Treated in 0.1% amine-silica particle solution | 149.77 | 4.57 |
| Treated in 0.02% amine-silica particle solution | 145.84 | 2.74 |
| Control (no particle) | 135.51 | 1.19 |

Laundry Durability Test for Hydrophobic Cotton Fabric with Covalently Bonded Particles Hydrophobic cotton fabric with covalently bonded particles was washed with detergent to test its laundry durability. After 13 laundry cycles, cotton fabric absorbed water droplet within 10 second, meaning the hydrophobicity was lost due to laundry washing.

Figure 25A:
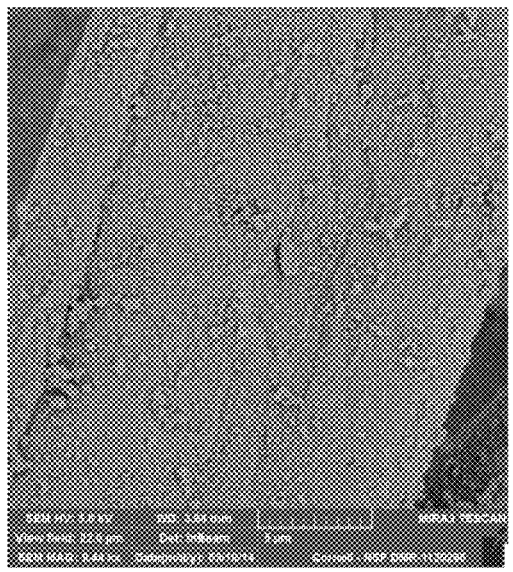
FIGS. 25A-25C: SEM images of hydrophobic treated cotton fabric taken before laundry wash (FIG. 25A), taken after 7 laundry cycles (FIG. 25B), and taken after 13 laundry cycles (FIG. 25C).
Figure 25B:
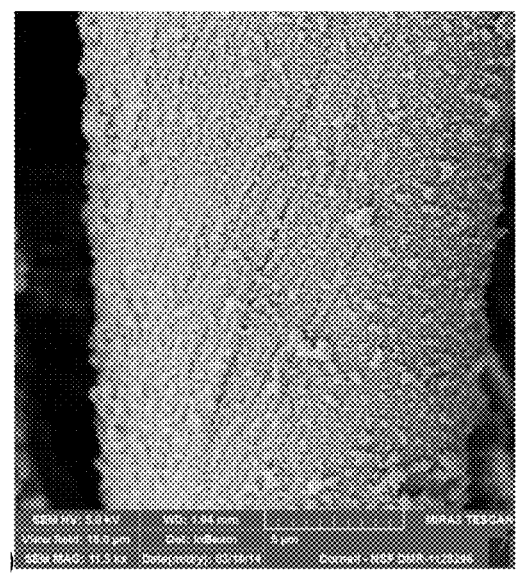
Figure 25C:
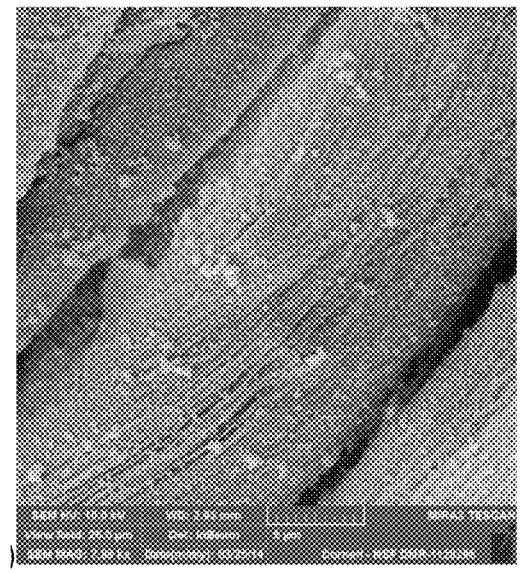

SEM images of cotton fabrics with different laundry washing conditions were shown in FIGS. 25A-25C. FIG. 25A was taken before laundry wash, FIG. 25B was taken after 7 laundry cycles and FIG. 25C was taken after 13 laundry cycles. No significant decrease in surface particle was observed by comparing FIGS. 25A and 25B. However, FIG. 25C did show a significant decrease in surface particles. In addition, increasing in cotton fiber surface fibrillation was detected.

Hydrophobic cotton fabric lost its water repellency after 13 wash cycles. This can be explained by the decrease in amount of silica particles made hydrophobic. During the laundry wash, top layer of hydrophobic silica particles will be washed away from fiber surface, because they are physically adsorbed. By removal of top layer of hydrophobic silica particles, inner layer of particles will be exposed to environment. Those inner layer particles may be hydrophilic, since they may not have chance to react with fatty anhydride. However, there was no scientific evidence generated to support this idea.

Figure 26:
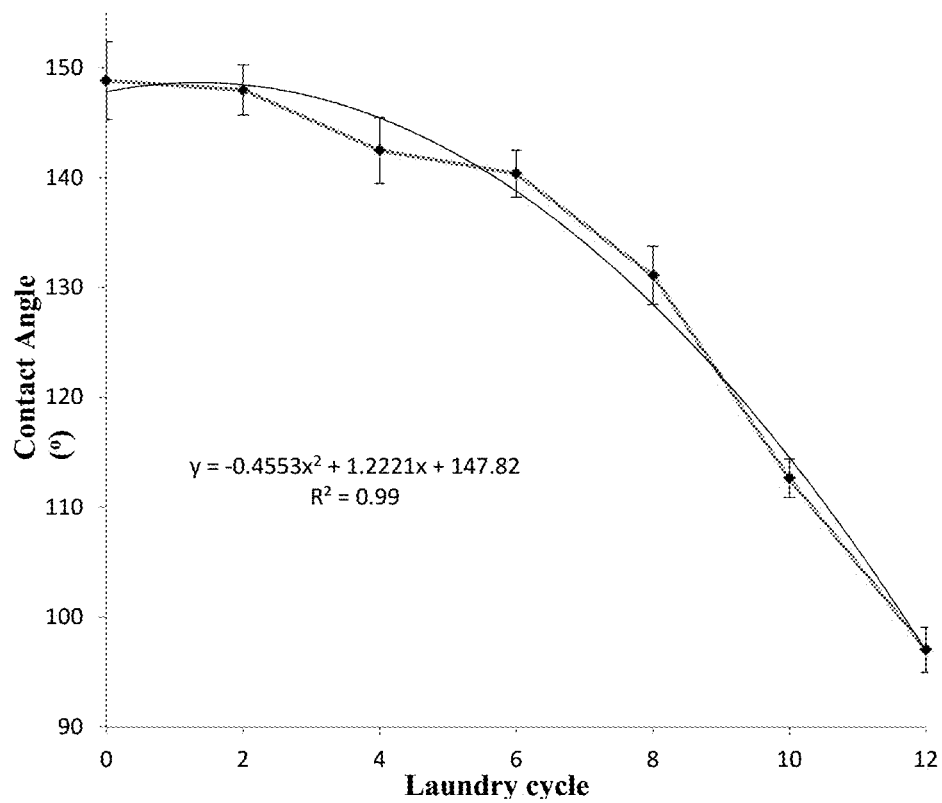
FIG. 26: Graph illustrating change of water contact angle with laundry cycles.

Water contact angle of hydrophobic treated cotton fabric was measured during laundry durability test. FIG. 26 shows the water contact angle after every two wash cycles. A constantly minor decrease in water contact angle was observed within 8 laundry cycles. Then, more significant decrease was appeared until cotton fabric became no longer hydrophobic. After 12 laundry cycles, water contact angle decreased to 97.4°, a decrease of about 500 compared to the initial hydrophobic cotton fabric.

Cotton Fabric with Dual-Size Particles Treatment

Previous described method involved the use of single size particles, only the smaller size amine-silica nanoparticles (107 nm) were used. In this section, both large and small size amine-silica particles (diameter size: 458 nm and 107 nm, respectively) were deposited onto cotton surface at the same time. 0.1 g of large particles and 0.1 g small particles were dispersed in 50 mL absolute ethanol. 1 hr of ultrasonication was used to form uniformly dispersed particle solution.

Figure 27:
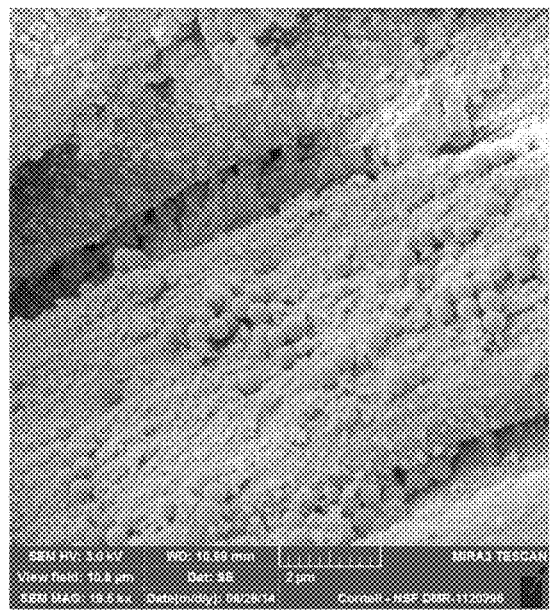
FIG. 27: SEM image of cotton fabric treated in dual size particle solution.

Different strategies were used to deposit particles onto cotton surface, namely, physical deposition, crosslinking, and green crosslinking methods. FIG. 27 shows SEM images of cotton fabric with physically deposited dual size particles. Both large and small amine-silica particles are seen to be deposited onto the surface of cotton fabric. While small nanoparticles are evenly distributed on fiber surface, large particles are not completely separated, in most cases, they rather form agglomerations.

Ultrasonication was used to study the removal of dual size particles from cotton surface. SEM images of the specimen after 10 and 20 min ultrasonication treatment are shown in FIGS. 28A and 28B, respectively. Similar result was observed as single size particles. After 10 min of ultrasonication, majority of the particles are removed from fiber surface. With further increase in ultrasonication time to 20 min, all large size particles are removed. But one layer of small particles is still present on the fiber surface.

Cotton fabric with dual size particles was also treated with two different crosslinkers, BTCA as well as a green crosslinker. During crosslinking reaction, both cotton and amine-silica particles will be crosslinked. In addition, crosslinkers act as a chemical bridge between cellulose and amine-silica particle through bond formation. BTCA will react with cellulose to form ester bond and react with amine groups on particle surface to form amide bond.

FIG. 29 shows the ATR-FTIR spectra of green crosslinker, oxidized sucrose. ATR-FTIR spectra of oxidized sucrose show a newly emerged peak at 1716 $cm^{-1}$ when compared with its non-oxidized form. Newly emerged peak is assigned to carbonyl group, which including aldehyde, ketone and carboxyl group. The desired oxidized form is aldehyde, since aldehyde group will readily react with both hydroxyl and amine group. Carboxyl group is considered has moderate reactivity and usually require coupling agent, EDC/NHS to facility reaction [19]. Ketone group does not react with hydroxyl or amine group, meaning it's not a desired product.

Figure 30:
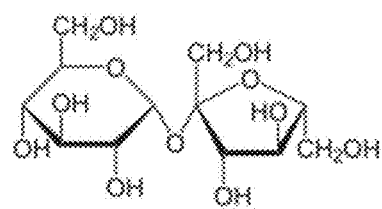
FIG. 30: Chemical structure of sucrose.

Hydroxylamine agent was used to quantitatively determine the aldehyde content in oxidized sucrose. Detailed procedures are described herein. FIG. 30 shows the chemical structure of sucrose, it has three primary hydroxyl groups and four secondary hydroxyl groups. The primary hydroxyl group can be oxidized into aldehyde and carboxyl form. However, it's not clear whether the secondary hydroxyl group can be oxidized into ketone form. Since hydroxylamine can react with both aldehyde and ketone, it necessary to assume that secondary hydroxyl cannot be oxidized in this case.

Results show that 30.89% of the primary hydroxyl groups were oxidized into aldehyde form. Which means that on an average there is one aldehyde group exists in one oxidized sucrose molecule. Oxidized sucrose molecules with two or more aldehyde groups is the desired product, as it can crosslink both cellulose and amine-silica nanoparticles, i.e., act as chemical bridge to covalently bond cellulose and particle.

Figure 31A:
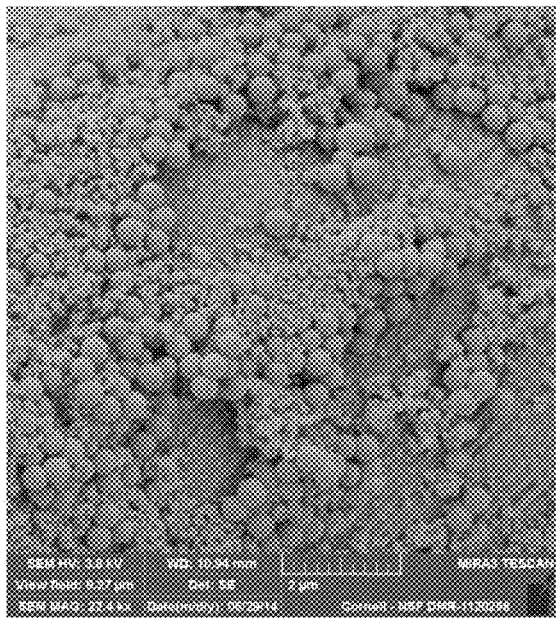
FIGS. 31A-31B: SEM images of cotton fabric with dual size particle crosslinked by BTCA (FIG. 31A); and oxidized sucrose (FIG. 31B).
Figure 31B:
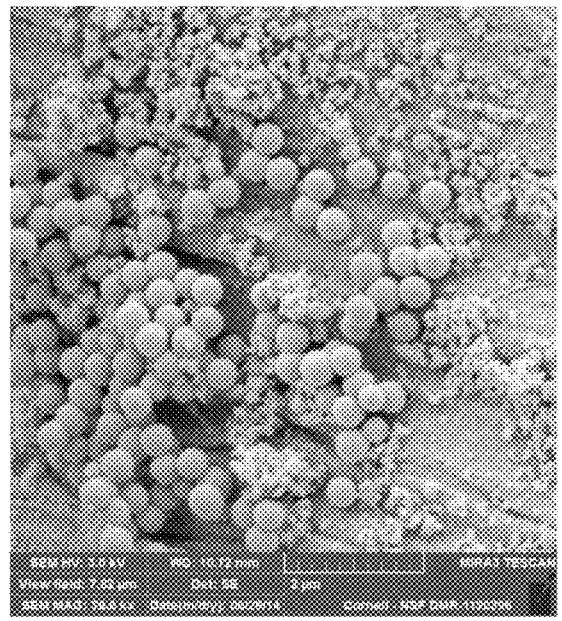

Cotton fabric with dual size particles was treated by crosslinker, BTCA and oxidized sucrose, separately. SEM images of cotton fabrics crosslinked by BTCA or oxidized sucrose are shown in FIGS. 31A and 31B, respectively. Similar surface morphology was obtained on cotton fabric with physical deposited dual size particles. Fiber surface was covered by both large and small amine-silica particles. However, certain degree of agglomeration was obtained in both cases.

Ultrasonication Treatment of Crosslinked Cotton Fabric with Dual Size Particles

Figure 32A:
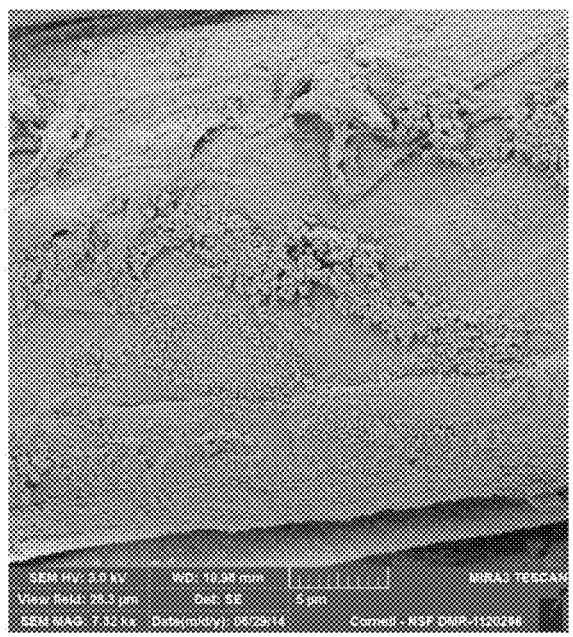
FIGS. 32A-32B: SEM images of crosslinked cotton fabric with dual size particles after ultrasonication treatment.
Figure 32B:
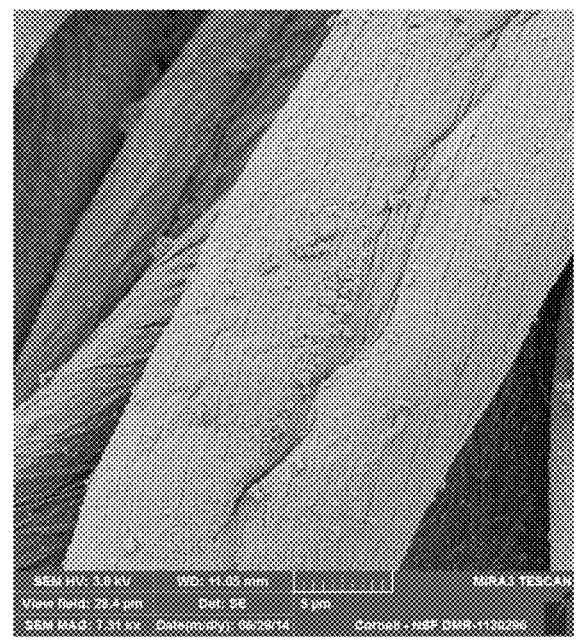

Ultrasonication treatment was used to remove any physically adsorbed particles, the residue particles are expected to be crosslinked or covalently bonded to fiber surface. SEM images of crosslinked cotton fabric after ultrasonication treatment was shown in FIGS. 32A-32B. Both images show that ultrasonication caused a significant loss of particles on cotton surface. However, BTCA crosslinked specimen (FIG. 32A) shows more residue particles than one crosslinked with oxidized sucrose (FIG. 32B).

This is not surprising, since the same weight of crosslinker was used during crosslinking step. However, every BTCA molecule can involve in crosslinking, but not all oxidized sucrose can be used for crosslinking. Only those oxidized sucrose with two or more aldehyde groups has crosslinking capability. This means that oxidized sucrose does not have enough of molecules with 2 aldehyde groups to bring about the crosslinking.

Hydrophobic Treatment of Crosslinked Cotton Fabric with Dual Size Particles

Cotton fabric with dual size particles increased the surface roughness. However, in order to obtain hydrophobicity, cotton fabrics still need to undergo hydrophobic treatment. Conditions were set to be 100% microwave power and 10 min heating. During the treatment, fatty anhydride will react with both cellulose and amine-silica particles. Fatty anhydride reacts with hydroxyl groups on cellulose to form ester bond, and with amine groups on amine-silica particle to form amide bond.

Water contact angles of hydrophobic treated cotton fabrics were measured and the results are shown in Table 8. Due to the increased surface roughness, hydrophobic cotton fabrics with surface deposited particles, all exhibit a much higher water contact angle value than the control fabric with no particles deposited. All fabrics with dual size particles and hydrophobic treatment showed water contact angles of over 150°, truly superhydrophobic behavior.

TABLE 8

Water contact angle results of hydrophobic cotton fabric with dual size particles

| Specimen | Water contact angle (°) | St. Dev. |
|---|---|---|
| Cotton fabric with physically deposited dual sized particles | 153.41 | 2.33 |
| BTCA crosslinked cotton fabric with dual sized particles | 150.81 | 3.81 |
| Oxidized sucrose crosslinked cotton fabric with dual sized particles | 152.73 | 3.09 |
| Control (no particles deposited) | 135.51 | 1.19 |

*All specimens were hydrophobic treated.

Unpaired t-test was used to determine if the contact angle values are significantly different from each other. Interestingly, at 95% confidence interval, highest and lowest contact angle values show no statistical difference with the two-tailed P value equals 0.3703. In other word, despite the fact that three specimens were treated with different condition, however, they have same particle deposition and hydrophobic treatment process. Similar surface roughness as well as same surface energy gives them statistically identical water contact angle.

Laundry Durability Test for Cotton Fabric with Dual Size Particles

Hydrophobic cotton fabrics with dual size particles were washed with detergent to test its laundry durability. Table 9 shows the number of laundry cycle needed to loss hydrophobicity. Hydrophobic cotton fabric treated with physical deposition method loss its hydrophobicity after 5 laundry cycles. Hydrophobic cotton fabric after crosslinking treatment showed a higher durability than physical deposition method. Oxidized sucrose crosslinked specimen shown 11 laundry cycles durability, and BTCA crosslinked specimen shown 24 laundry cycles (equivalent to over 120 machine washes) durability. However, all these three specimens exhibited lower laundry durability than the control (no particle but hydrophobic treated), which lost its hydrophobicity after 31 cycles of laundry.

TABLE 9

Laundry durability test for hydrophobic cotton fabric with dual size particles

| Specimen | Laundry cycle |
|---|---|
| Cotton fabric with physically deposited dual sized particles | 5 |
| BTCA crosslinked cotton fabric with dual sized particles | 24 |
| Oxidized sucrose crosslinked cotton fabric with dual sized particles | 11 |
| Control (no particles deposited) | 31 |

*all specimens were hydrophobic treated.

The possible reasons contributed to the loss of hydrophobicity during laundry durability test listed as followings:
1) Detergent causing removal of particles.
2) Chemical bonding between particles and cellulose may be hydrolyzed by the detergent.
3) Enzymes in the detergent removing the top layer of cellulose.

REFERENCES

Citation of a reference herein shall not be construed as an admission that such reference is prior art to the present invention. All references cited herein are hereby incorporated by reference in their entirety. Below is a listing of various references cited with respect to this example:

[1] Heinze, Th, and T. Liebert. "Unconventional methods in cellulose functionalization." *Progress in Polymer Science* 26, no. 9 (2001): 1689-1762.

[2] Wang, Pinglang, and Bernard Y. Tao. "Synthesis and characterization of long-chain fatty acid cellulose ester (FACE)." *Journal of applied polymer science* 52, no. 6 (1994): 755-761.

[4] Vaca-Garcia, C., S. Thiebaud, M. E. Borredon, and Giuseppe Gozzelino. "Cellulose esterification with fatty acids and acetic anhydride in lithium chloride/N, N-dimethylacetamide medium." *Journal of the American Oil Chemists' Society* 75, no. 2 (1998): 315-319.

[5] Chauvelon, G., L. Saulnier, A. Buleon, J-F. Thibault, C. Gourson, R. Benhaddou, R. Granet, and P. Krausz. "Acidic activation of cellulose and its esterification by long-chain fatty acid." *Journal of applied polymer science* 74, no. 8 (1999): 1933-1940.

[6] www.sigmaaldrich.com/catalog/product/aldrich/d80002?lang=en&region=US

[7] Deng, Bo, et al. "Laundering durability of superhydrophobic cotton fabric." *Advanced Materials* 22.48 (2010): 5473-5477.

[8] Bellanger, Hervé, Thierry Darmanin, Elisabeth Taffin de Givenchy, and Frederic Guittard. "Chemical and physical pathways for the preparation of superoleophobic surfaces and related wetting theories." *Chemical reviews* 114, no. 5 (2014): 2694-2716.

[9] Tuteja, Anish, Wonjae Choi, Minglin Ma, Joseph M. Mabry, Sarah A. Mazzella, Gregory C. Rutledge, Gareth H. McKinley, and Robert E. Cohen. "Designing superoleophobic surfaces." *Science* 318, no. 5856 (2007): 1618-1622.

[10] Ma, Minglin, and Randal M. Hill. "Superhydrophobic surfaces." *Current Opinion in Colloid & Interface Science* 11, no. 4 (2006): 193-202.

[11] Nishino, Takashi, Masashi Meguro, Katsuhiko Nakamae, Motonori Matsushita, and Yasukiyo Ueda. "The lowest surface free energy based on-CF3 alignment." *Langmuir* 15, no. 13 (1999): 4321-4323.

[12] Wenzel, Robert N. "Resistance of solid surfaces to wetting by water." *Industrial & Engineering Chemistry* 28, no. 8 (1936): 988-994.

[13] Cassie, A. B. D., and S. Baxter. "Wettability of porous surfaces." *Transactions of the Faraday Society* 40 (1944): 546-551.

[14] Bico, José, Uwe Thiele, and David Quere. "Wetting of textured surfaces." *Colloids and Surfaces A: Physicochemical and Engineering Aspects* 206, no. 1 (2002): 41-46.

[15] Stöber, Werner, Arthur Fink, and Ernst Bohn. "Controlled growth of monodisperse silica spheres in the micron size range." *Journal of colloid and interface science* 26, no. 1 (1968): 62-69.

[16] Dastidar, Trina Ghosh, and Anil N. Netravali. "A soy flour based thermoset resin without the use of any external crosslinker." *Green Chemistry* 15, no. 11 (2013): 3243-3251.

[17] Chen, Song, Akiyoshi Osaka, Satoshi Hayakawa, Kanji Tsuru, Eiji Fujii, and Koji Kawabata. "Novel one-pot sol-gel preparation of amino-functionalized silica nanoparticles." *Chemistry Letters* 37, no. 11 (2008): 1170-1171.
[18] Yang, Charles Q. "FT-IR spectroscopy study of the ester crosslinking mechanism of cotton cellulose." *Textile Research Journal* 61, no. 8 (1991): 433-440.
[19] Sricharussin, W., W. Ryo-Aree, W. Intasen, and S. Poungraksakirt. "Effect of boric acid and BTCA on tensile strength loss of finished cotton fabrics." *Textile research journal* 74, no. 6 (2004): 475-480.
[20] Grabarek, Zenon, and John Gergely. "Zero-length crosslinking procedure with the use of active esters." *Analytical biochemistry* 185, no. 1 (1990): 131-135.

Example 2

'Green' Surface Treatment for Water Repellent Cotton Fabrics

1. Abstract

A 'green' method to obtain water repellent (hydrophobic) cotton fabrics has been developed. Aliphatic fatty chains were grafted onto cotton (cellulose) fiber surface to decrease the surface energy and, thus, obtain the water repellency. A benign accelerator was used to facilitate the reactivity between fatty acid and cellulosic hydroxyl groups. Microwave heating, an energy efficient method, was used to reach the reaction temperature.

Fatty anhydride, considered to have higher reactivity than fatty acid, was initially prepared. The chemical process was monitored using HPLC and ATR-FTIR techniques. Effect of fatty acid chain lengths as well as microwave heating parameters were studied on hydrophobicity of the resulting cotton fabrics. Resulting hydrophobic cotton fabrics were characterized by water contact angle, laundry durability test, tensile test, ATR-FTIR and SEM.

The green method developed here resulted in hydrophobic cotton fabric with a water contact angle of over 137° (±2.79°). In addition, it was shown that the hydrophobicity was permanent and lasted for 37 cycles of laboratory laundry washes (equivalent to over 185 regular washes). ATR-FTIR results confirmed the grafting of fatty chain on cotton fabrics. SEM images proved that this process has negligible effect on fiber surface topography.

To our knowledge, no fully green, durable and hydrophobic cotton surface has been reported in the open literature. A permanent or durable hydrophobic surface usually requires covalent attachment of low surface energy compounds or molecules onto cotton. Nevertheless, there are several greener attempts with the minimal use of petroleum based chemicals to achieve durable and hydrophobic cotton surface which are discussed below.

In the present study, several different fatty acids were grafted onto cellulose to decrease the surface energy using a green method. Fatty acid can be easily obtained by hydrolysis of triglycerides that are natural and abundantly available. In order to avoid the use or toxic chemicals, e.g. TosCl and DCC, acetic anhydride, was used to facilitate the reactivity of fatty acid. In addition, microwave heating, as an energy efficient way to increase temperature, was used replacing the conventional hydrothermal (oil bath) heating.

2. Experimental Methods

All chemicals used in this study were purchase from Sigma Aldrich. They include acetic anhydride, heptanoic acid, octanoic acid, dodecanoic acid, stearic acid. Sunbeam microwave with 0.9 Cu. ft chamber capacity and 900 Watts of power was used in this study.

Desized, scoured and bleached woven cotton fabric was used as raw material for the hydrophobic treatment in this study. Fabric was cut into 10 cm×10 cm size specimens and treated using 300 ml ethanol solution (ethanol to water volume ratio=8:2) in 500 mL Erlenmeyer flask at 50° C. for 20 min. The purpose of this pretreatment was to partially remove any remaining impurities such as ash, hemicellulose and lignin and obtain as high cellulose content as possible.

Figure 33:
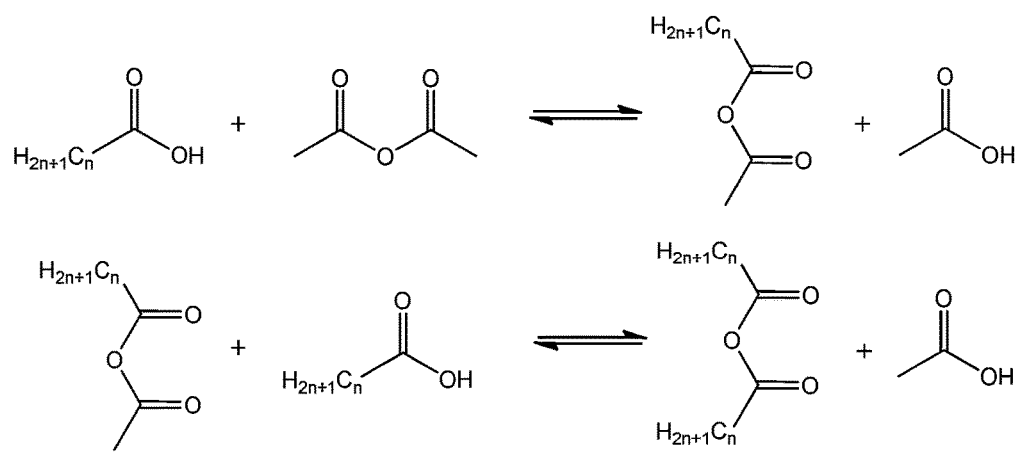
FIG. 33: Schematic of chemical process of fatty anhydride preparation.

A mixture of 26 g of heptanoic acid and 20 g of acetic anhydride were introduced in a petri dish. After they were thoroughly mixed, petri dish was covered and placed into a microwave oven (900 W). The mixture was microwave heated at different power levels and for desired durations. Every time after the reaction was completed, the petri dish was taken out from the microwave oven and both the chemical mixture and the microwave oven were allowed to cool to room temperature. During the microwave heating, proposed chemical reaction as illustrated in FIG. 33 is expected to take place. The resulting mixture was characterized using HPLC to confirm its chemical composition.

Fatty acid with a melting point higher than room temperature was used, e.g. dodecanoic acid, (melting point: 43.2° C.) in this study. Initially, the fatty acid was completely melted by heating to just over 48° C., 5° C. above its melting point. After that acetic anhydride was added and stirred for 5 min to form a uniform mixture.

Figure 34:
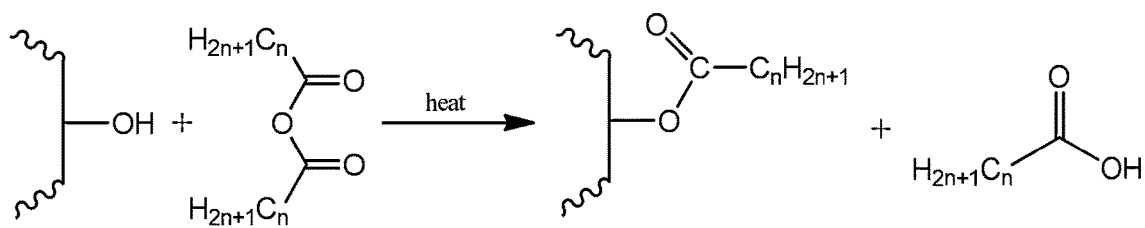
FIG. 34: Schematic of chemical reaction between cellulose and fatty anhydride.

Purified cotton fabric specimen was placed in the petri dish containing as-prepared fatty-acetic anhydride solution, making sure that the fabric is completely immersed in reaction mixture. Petri dish was then covered and placed in the microwave oven and the mixture was heated at different predetermined power levels and for different durations. During the microwave heating, the chemical reaction illustrated in FIG. 34 was expected to take place, where fatty anhydride reacts with hydroxyl groups on cellulose backbone forming an ester bond and fatty acid as byproduct. Every time after the reaction was completed, the petri dish was removed from the microwave oven. The treated fabric was purified by Soxhlet extraction with ethanol to remove unreacted chemical residues for at least 12 hrs. The treated and purified fabric was dried in oven at 60° C. overnight.

Attenuated total reflectance-Fourier transform infrared spectroscopy (ATR-FTIR) is the most straight forward technique that can be used to confirm the successful esterification between cellulose and fatty acid. The ester carbonyl has stretch band around 1745 $cm^{-1}$. Besides the obvious carbonyl band, the peaks induced by long alkyl chain can be identified as well. For example, peak around 2950 $cm^{-1}$ is assigned to $CH_2$ anti-symmetric stretch, 2880 $cm^{-1}$ is assigned to $CH_2$ symmetric stretch, and 1280 $cm^{-1}$ is assigned to CH deformation such as bending and stretching (Heinze et al., 2006). While ATR-FTIR spectra, with these peaks present, can be used to confirm the successful grafting of acyl chain, this technique is qualitative, and cannot be used to quantitatively determine the amount of acyl chains present on each anhydroglucose unit. In addition, this technique is not so sensitive. Even when aldehyde and carboxyl groups are present, if the concentration is low this technique may not be useful.

In the present study all specimens were characterized using an FTIR spectrophotometer (Nicolet Magna-IR 560, Thermo Scientific, Waltham, MA). ATR-FTIR spectra were taken in the range of 550-4000 $cm^{-1}$ wavenumbers using a split pea accessory. The spectra were recorded as averages of 64 scans obtained at a resolution of 4 cm$^{-1}$.

High performance liquid chromatography (HPLC, Agilent Technologies, 1200 Series) was used to study the chemical reaction between fatty acid and acetic anhydride. An Eclipse XDS-C$_{18}$ 5µ 4.6 mm×150 mm Agilent column was used for the analysis. Flow rate was set at 1.5 mL/min with an eluent gradient starting at starting time (t=0) from 75% acetonitrile/25% water with 0.02 wt % phosphoric acid in water to 100% acetonitrile in 5 min and then keeping at 100% acetonitrile until the end of the analysis. Specimens measuring 10 µL were injected. Wavelength of 214 nm was used to conduct quantitative analysis of the mixture using a UV detector (Peydecastaing et al., 2009).

Scanning electron microscope (SEM, Tescan-Mira3-FE-SEM) was used to characterize the surface topography of fibers. Specimens were oven dried in an air circulating oven and sputter coated with gold prior to obtaining SEM images. The SEM images were captured at an accelerating voltage of 5 kV.

Effects of chemical treatment conditions on yarn (both weft and warp) removed from the fabric specimens were studied for their tensile properties using Instron universal testing machine (Model 5566). Due to the limitation of the specimen size (5 cm×5 cm), modified version of ASTM D2256, for specimen size, was used in these tests. Gauge length for all test specimens was 30 mm and the crosshead speed was set to 13 mm/min. Under these conditions the breakage of yarn was expected to take place in about 20±3 s. Specimens were oven dried prior to testing using the same air circulating oven. At least 15 specimens were tested to confirm reproducibility and their average values are reported. All tests were performed in standard ASTM conditions of 65% relative humidity and 21° C.

Laundering durability evaluation of water repellency was carried out in a modified version according to the American Association of Textile Chemists and Colorists (AATCC) Test Method 61-2003. The test was performed using a 500 mL flask containing 150 mL aqueous solution of Tide® laundry detergent (0.15%, w/w) and 50 stainless steel balls (diameter=6 mm), the test was performed at 49° C., 40 rpm for 45 min. The size of the fabric specimens was 5 cm×5 cm for the test. Each cycle in this study was considered to be equivalent to five hand or home launderings (Deng et al., 2010).

X-ray photoelectron spectroscopy (XPS, Model: SSX-100, Manufacturer: Surface Science Instruments) was used to analysis the surface elemental composition of cotton fabric. XPS equipped with Aluminum Ku X-rays and all binding energies were referenced to the carbon CIs energy peak at 284.63 eV. Photoemission electrons were collected at a 55 degree emission angle and the hemispherical analyzer used a 150V pass energy for survey scans and 50V pass energy for high resolution scans.

3. Results and Discussion

3.1 Chemical Composition Analysis by HPLC

Figure 35:
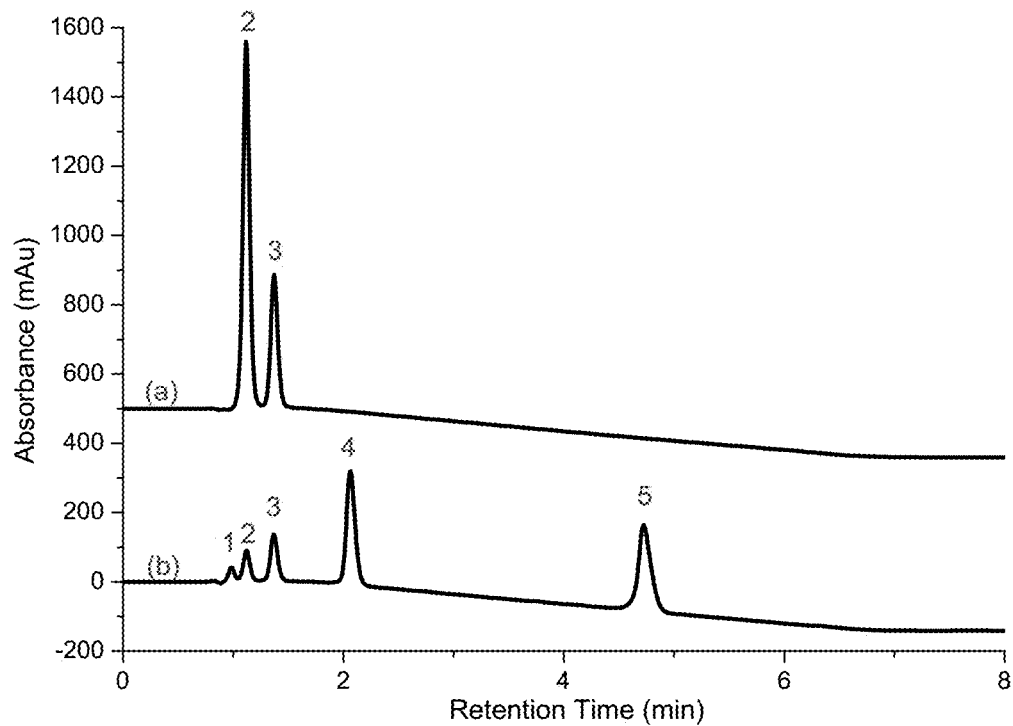
FIG. 35: HPLC chromatograms a) as-mixed equal mole of heptanoic acid and acetic anhydride; b) 70% power/5 min microwave treated equal mole of heptanoic acid and acetic anhydride.
Figure 40:
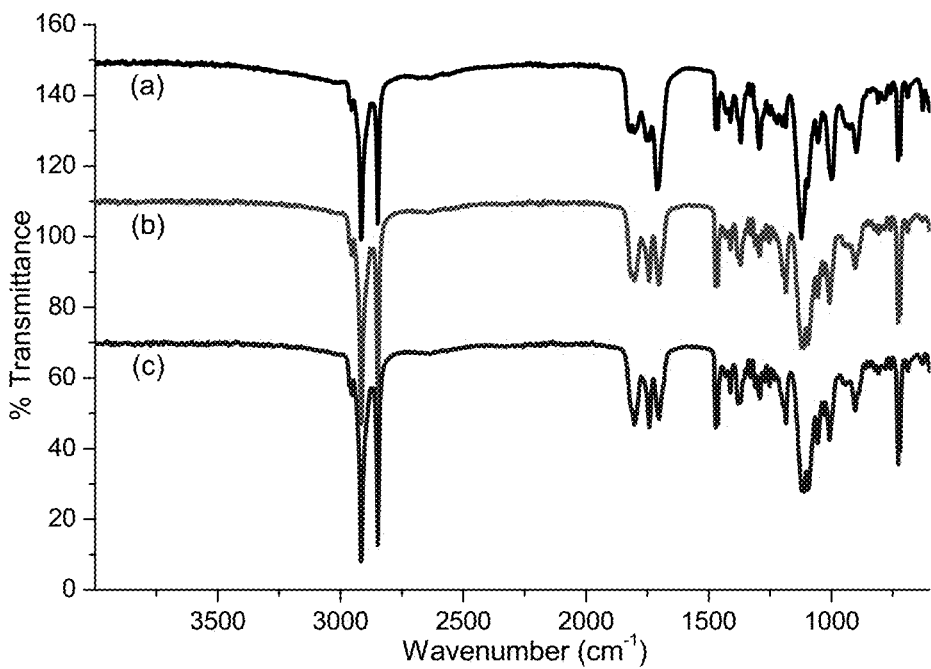
FIG. 40: Graph illustrating ATR-FTIR spectra a) mixture of stearic acid and acetic anhydride before microwave heating; b) mixture of stearic acid and acetic anhydride after 100% power/8 min microwave heating; c) mixture of stearic acid and acetic anhydride after 100% power/15 min microwave heating.

The HPLC was used to track the changes occurring in the chemical composition during the reaction, as illustrated in FIG. 35. FIG. 35 (line a) shows the HPLC chromatogram of as-mixed equal moles of heptanoic acid and acetic anhydride where peaks #2 and #3 are assigned to acetic anhydride and heptanoic acid, respectively. The peak intensity difference is due to the difference in detector sensitivity for these two chemicals. FIG. 40 (line b) shows the HPLC chromatogram of microwave treated mixture containing equal moles of heptanoic acid and acetic anhydride at 70% power level for 5 min. The newly emerged peaks seen after microwave treatment were assigned to acetic acid (#1), acetic-fatty anhydride (#3) and fatty anhydride (#4), respectively.

Figure 36:
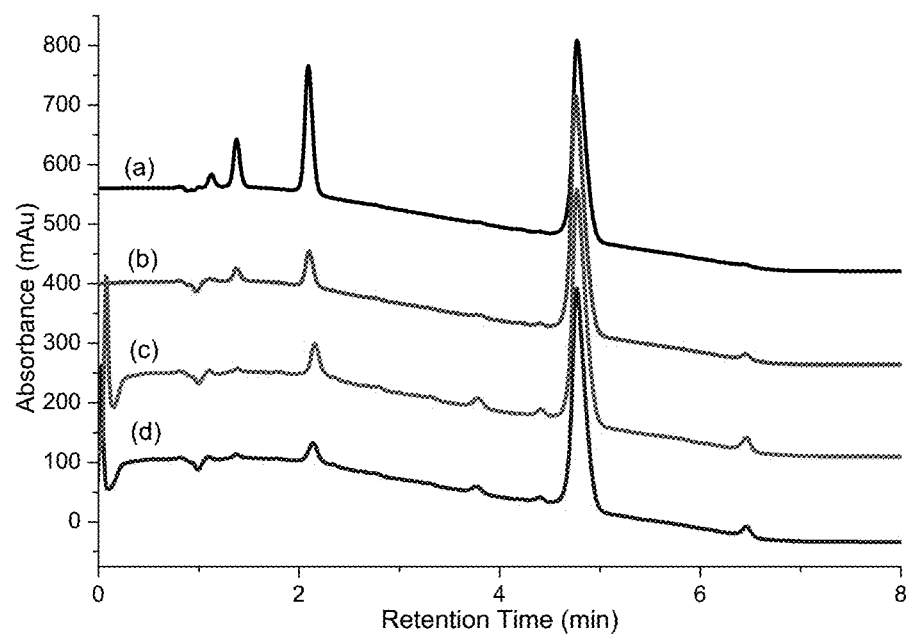
FIG. 36: HPLC chromatograms a) 100% power/5 min; b) 100% power/10 min; c) 100% power/15 min; d) 100% power/30 min.

Further investigation was carried out to maximize conversion of fatty acid into fatty anhydride form. FIG. 36 shows chromatograms of microwave treated mixtures of equal moles of heptanoic acid and acetic anhydride heated at 100% power level for different times. After analyzing the peaks, it's clear that after 10 min of microwave heating, acetic anhydride peak (#2) disappeared. This is due to both being consumed by the reaction and also by evaporation. After 15 min of microwave heating, heptanoic acid peak (#3) disappeared. However, in the absence of acetic anhydride, the reaction proposed in FIG. 33 can no longer propagate, so the appropriate explanation for the disappearance of heptanoic acid peak (#3) would be its evaporation. When the reaction mixture was further heated in the microwave for 30 min, no significant difference was observed compared to the spectrum obtained for 15 min heating, except for the slight decrease in intensity observed for heptanoic-acetic anhydride. The reason for this minor change after 15 min is because of the high boiling point of both heptanoic-acetic anhydride and heptanoic anhydride. This suggests that the additional 15 min of microwave heating did not reach the boiling point of heptanoic-acetic anhydride and heptanoic anhydride.

Based on these chromatograms, optimized condition for preparation of heptanoic anhydride was decided to be between 10 to 15 min heating at 100% microwave power level. Since after 10 min of heating, heptanoic-acetic anhydride content was minimized, the majority present in treated mixture was heptanoic anhydride, thus, only heptanoic acyl grafting needs to be considered for later degree of substitution calculation. For microwaves with different wattages, the time as well as the power levels would be expected to be different and will need to be optimized.

Figure 37:
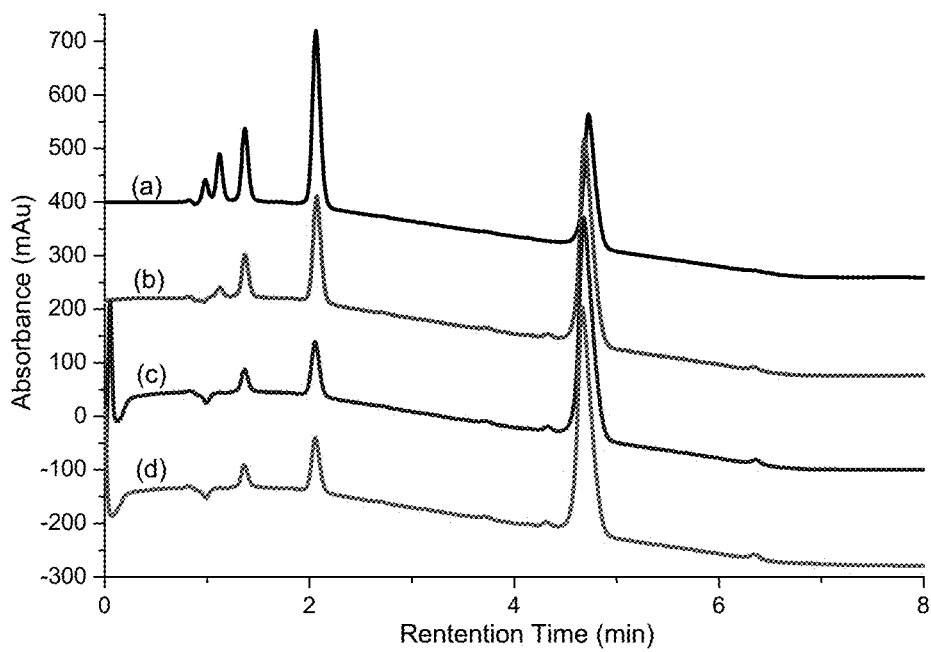
FIG. 37: HPLC chromatograms a) 70% power/5 min; b) 70% power/10 min; c) 70% power/20 min; d) 70% power/30 min.

FIG. 37 shows chromatograms of microwave heated mixtures containing equal moles of heptanoic acid and acetic anhydride heated for different times at 70% power level. A lower power level is expected to result in a lower reaction temperature, since the same amount of the reaction mixture was used. Under these conditions heptanoic acid either completely reacted or evaporated after 20 min of heating. However, significant amount of heptanoic-acetic anhydride was still present even after 30 min of microwave heating.

These results suggest that HPLC can be a powerful technique to optimize the end point of acetic anhydride-heptanoic acid reaction and when the heptanoic acid is consumed. However, when a higher fatty acid (with larger alkyl chain, e.g. stearic acid) was used, their poor solubility in acetonitrile makes it impossible to track the reaction process by HPLC method. This suggests that there is a need to develop an alternative method to track reaction process when higher fatty acid (longer chain) is used.

3.2 Tracking Fatty Anhydride Preparation by ATR-FTIR

Figure 38:
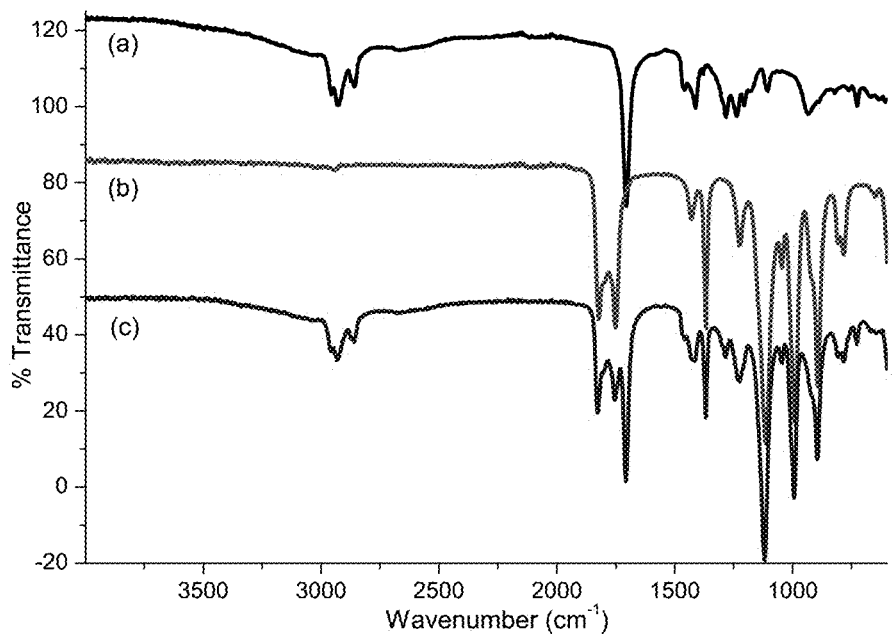
FIG. 38: Graph illustrating ATR-FTIR spectra a) pure heptanoic acid; b) pure acetic anhydride; c) mixture of heptanoic acid and acetic anhydride without microwave heating.

FIG. 38 (line a) shows the ATR-FTIR spectrum of pure heptanoic acid. Absorption peaks around 2800 cm$^{-1}$ are assigned to aliphatic —CH$_2$ and —CH$_3$ groups in its long fatty alkyl chain and peak at 1706.6 cm$^{-1}$ is assigned to the carboxyl groups. FIG. 38 (line b) shows the ATR-FTIR spectrum of pure acetic anhydride. The two peaks for pure acetic anhydride at 1752.9 $cm^{-1}$ and 1826.3 $cm^{-1}$ are assigned to stretching vibration of aldehyde carbonyl groups. FIG. 38 (line c) shows the ATR-FTIR spectrum of equal moles mixture of heptanoic acid and acetic anhydride where all peaks assigned to both heptanoic acid and acetic anhydride are seen.

Figure 39:
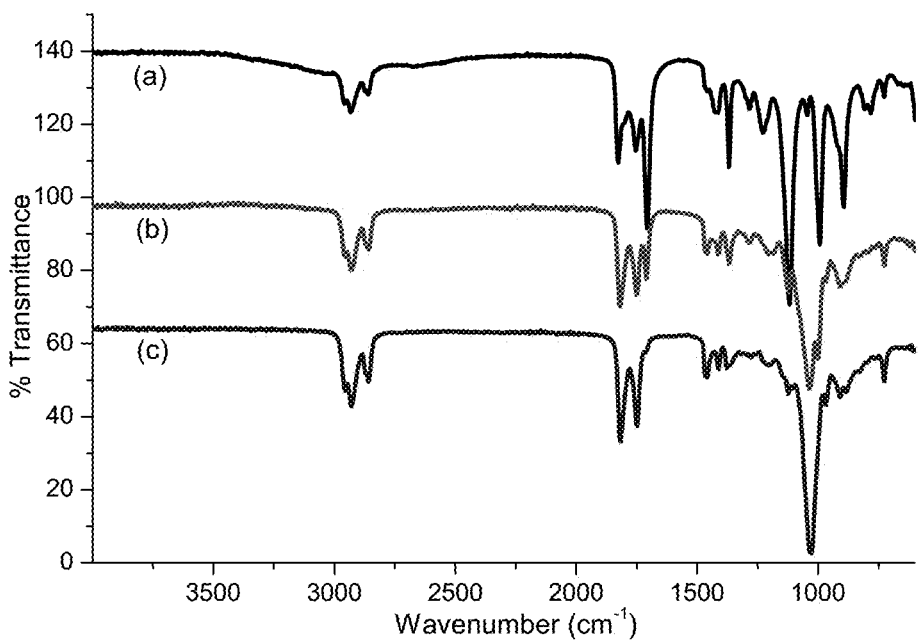
FIG. 39: Graph illustrating ATR-FTIR spectra of a) mixture of heptanoic acid and acetic anhydride before microwave heating; b) mixture of heptanoic acid and acetic anhydride after 100% power/8 min microwave heating; c) mixture of heptanoic acid and acetic anhydride after 100% power/15 min microwave heating.

As discussed in section 3.1, HPLC method had shown that at the end of the acetic anhydride-heptanoic acid reaction, heptanoic acid was mostly consumed either through the reaction or by evaporation and heptanoic-acetic anhydride and heptanoic anhydride remained. Same conclusion can be reached based on ATR-FTIR analysis discussed above. FIG. 39 (line a) shows ATR-FTIR spectrum of as-mixed equal moles of acetic anhydride and heptanoic acid, as was shown in FIG. 38 (line c). FIG. 38 (line b) shows ATR-FTIR spectrum of reaction mixture after microwave heating at 100% power for 8 min. As can be seen in FIG. 39 (line b) the intensity of 1706.6 $cm^{-1}$ peak, assigned to carboxyl group, has been significantly reduced. The reduced peak intensity means a significant reduction in the presence of heptanoic acid. With further microwave heating to 15 min, as shown in FIG. 39 (line c), the carboxyl peak at 1706.6 $cm^{-1}$ disappeared from the spectrum, indicating complete absence of the acid group. However, the intensity of two aldehyde peaks (1752.9 $cm^{-1}$ and 1826.3 $cm^{-1}$) remained unchanged. Based on FIG. 39 (line c), it can be concluded that the formation of a new compound which contains alkyl chain and anhydride carbonyl group, and in this case, heptanoic-acetic anhydride and heptanoic anhydride. However, from the ATR-FTIR spectra it is difficult to distinguish between heptanoic-acetic anhydride mixture and heptanoic anhydride. As a result, end point of the reaction can only conclude on complete consumption of heptanoic acid and the formation of anhydride.

Similar process was used to track the chemical reaction when stearic acid was used in place of heptanoic acid. FIG. 40 (line a) shows ATR-FTIR spectrum for a mixture of equal moles of acetic anhydride and stearic acid. When the reactant mixture was microwave heated for 8 min and at 100% power level, intensity of carboxylic carbonyl peaks (1706.6 $cm^{-1}$) underwent a significant drop as can be seen in FIG. 40 (line b). However, with further heating to 15 min, carboxylic acid peak was still present in the spectrum as shown in FIG. 40 (line c). This clearly indicates the presence of stearic acid. Stearic acid (boiling point=382° C.) has a much higher boiling point than heptanoic acid (boiling point=223° C.) and with same microwave heating temperature, less stearic acid can be expected to evaporate from the reaction mixture. It's worth mentioning here that, it's not clear whether the higher fatty acid requires a higher temperature for the reaction to go in the desired direction.

3.3 ATR-FTIR Analysis of Hydrophobic Treated Cotton Fabrics

Figure 41:
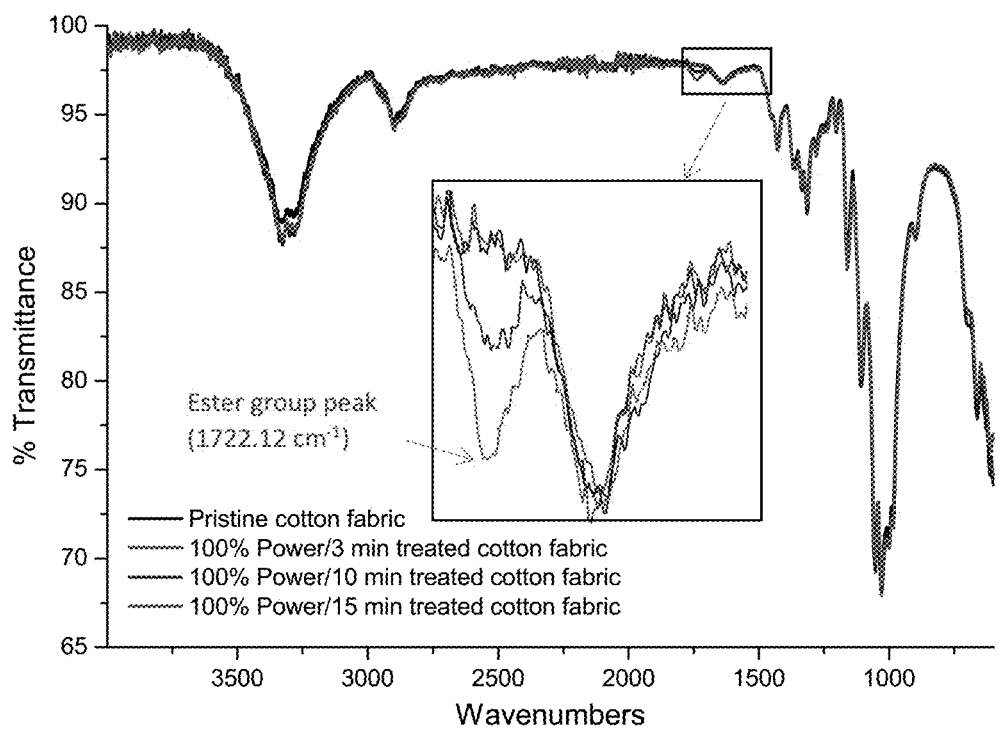
FIG. 41: Graph illustrating ATR-FTIR spectra of unmodified and hydrophobic treated cotton fabric treated under different conditions.

ATR-FTIR was used to determine the ester formation and qualitatively compare the amount of ester groups present on cotton fabric treated to obtain hydrophobic characteristic. FIG. 41 shows ATR-FTIR spectra of cotton fabrics with different hydrophobic treatment conditions. When 100% power level of the microwave was applied, increase in heating time from 3 min to 15 min resulted in larger peak intensity at 1728 $cm^{-1}$, indicating larger amount of fatty acyl groups grafted onto cotton (cellulose). This suggests that better hydrophobicity can be obtained with 15 min heating time.

Table 10 summarizes the assignment of ATR-FTIR peaks particularly for cellulose and its derivatives. After 3 min heating at 100% power, the resulting cotton fabric shows no difference with pristine cotton fabric, which implies that there are only a trace amount of fatty acyl groups grafted or the amount is below the sensitivity of ATR-FTIR. However, spectra for cotton fabric after 10 min microwave heating shows newly emerged carbonyl peak at 1728 $cm^{-1}$. The cotton fabric, with further heating time to 15 min, showed an even stronger carbonyl peak than one obtained for 10 min treatment.

TABLE 10

Assignment of ATR-FTIR spectra peaks for cellulose (Heinze et al., 2006)

| Wavenumber ($cm^{-1}$) | Assignment |
|---|---|
| 3450-3570 | OH stretch |
| 3200-3400 | OH stretch |
| 2933-2981 | $CH_2$ antisymmetric stretch |
| 2850-2904 | $CH_2$ symmetric stretch |
| 1725-1730 | C=O stretch from acetyl- or COOH groups |
| 1635 | Adsorption of water |
| 1455-1470 | $CH_2$ symmetric ring stretch at pyrane ring; OH in-plane deformation |
| 1416-1430 | $CH_2$ scissors vibration |
| 1374-1375 | CH deformation |
| 1335-1336 | OH in-plane deformation |
| 1315-1317 | $CH_2$ tip vibration |
| 1277-1282 | CH deformation |
| 1225-1235 | OH in-plane deformation, also in COOH groups |
| 1200-1205 | OH in-plane deformation |
| 1125-1162 | C—O—C antisymmetric stretch |
| 1107-1110 | Ring antisymmetric stretch |
| 1015-1060 | C—O stretch |
| 925-930 | Pyran ring stretch |
| 892-895 | C-anomeric groups stretch, $C_1$—H-deformation; ring stretch |
| 800 | Pyran ring stretch |

3.4 Effect of Different Modification Conditions on Water Contact Angle of Cotton Fabrics

3.4.1 Effect of Microwave Power Level and Heating Time

Figure 42A:
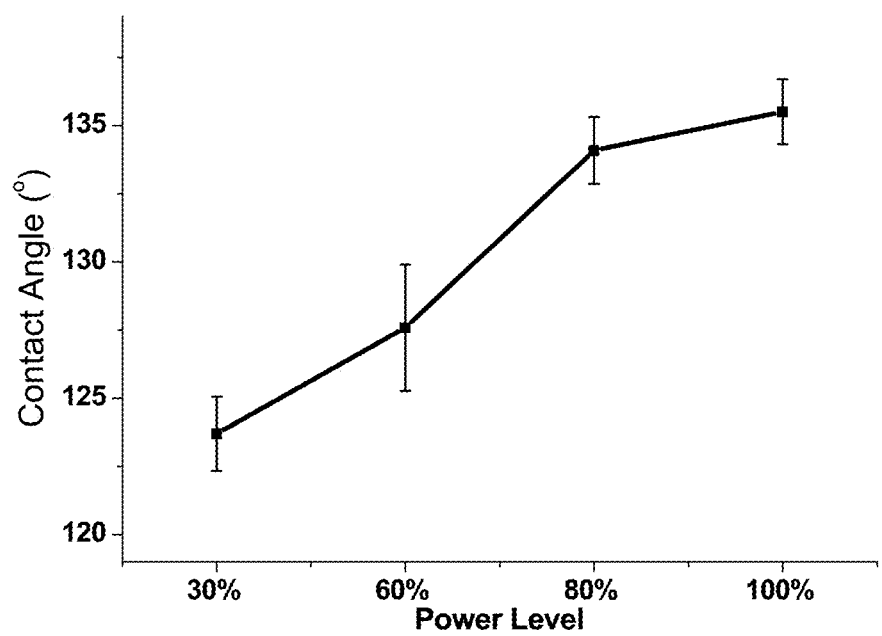
FIGS. 42A-42B: Graphs illustrating water contact angle measurement of modified cotton with different microwave heating conditions.

Hydrophobicity of the modified cotton fabric was evaluated by measuring water contact angle with water. The ethanol washed pristine (untreated) cotton fabric has a water contact angle of 0° since the water spreads and is absorbed in the fabric immediately. FIG. 42A shows the effect of power level (energy input) on water contact angle with fixed microwave heating time of 15 min and in the presence of fatty anhydride (preparation procedures as described in section 2.3). Cotton fabric treated in a higher power level resulted in a higher water contact angle. For example, for hydrophobic treatment at 30% power level, the corresponding treated cotton fabric has a water contact angle of 123.7°. When the power level was increased to 100%, the corresponding water contact angle increased to 135.51°, an increase of about 12°. Both these treatments can be considered to have made the cotton fabric hydrophobic, though not superhydrophobic.

Figure 42B:
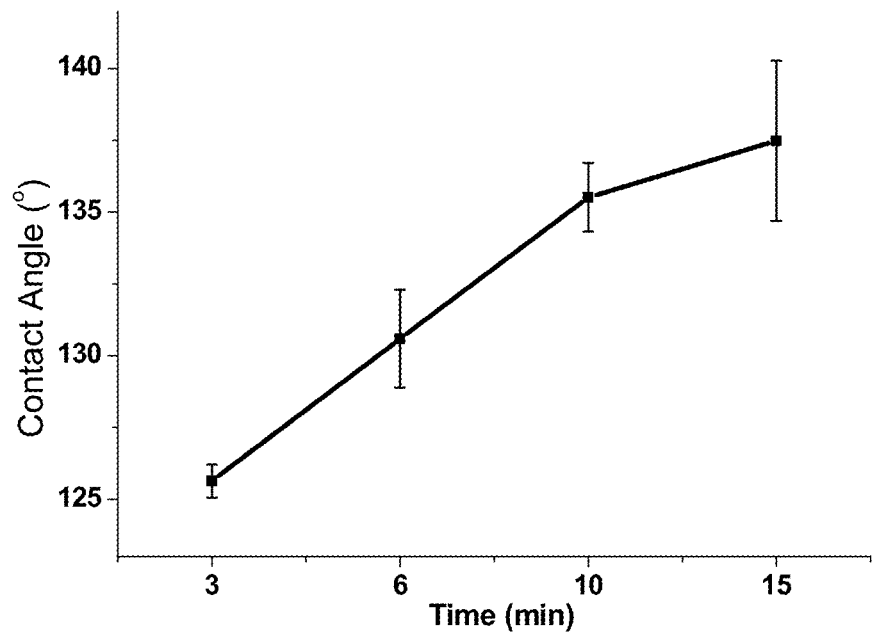

Water contact angle measurements were also used to evaluate the effect of microwave treatment time for cotton fabrics treated at 100% power level. The corresponding water contact angles are shown in FIG. 42B. When the microwave treatment was carried out for 3 min the treatment resulted in a hydrophobic cotton fabric with 125.64° water contact angle. The water contact angle increased with longer treatment time and reached 137.48° for 15 min of microwave heating time.

Based on the results seen in FIGS. 42A-42B, it can be concluded that water contact angle is positively correlated with both power level and heating time, within the experimental parameters used. If the water contact angle is solely considered, it can be assumed that the value can increase further with a longer microwave treatment time. However, it's true that this will have a certain limitation as it will reach equilibrium under the experimental conditions. Microwave treatment is well known for its high energy efficiency for generating high temperatures in a short time. However, it has been shown that the reaction temperature, in some experiments, went beyond the boiling point of heptanoic acid (223° C.). At such high temperatures, the degradation of cellulose and loss of reactant due to evaporation can be significant, and hence, it is important to be careful and avoid such conditions. In the present research such conditions were avoided.

3.4.2 Effect of Fatty Acid Chain Length

Figure 43:
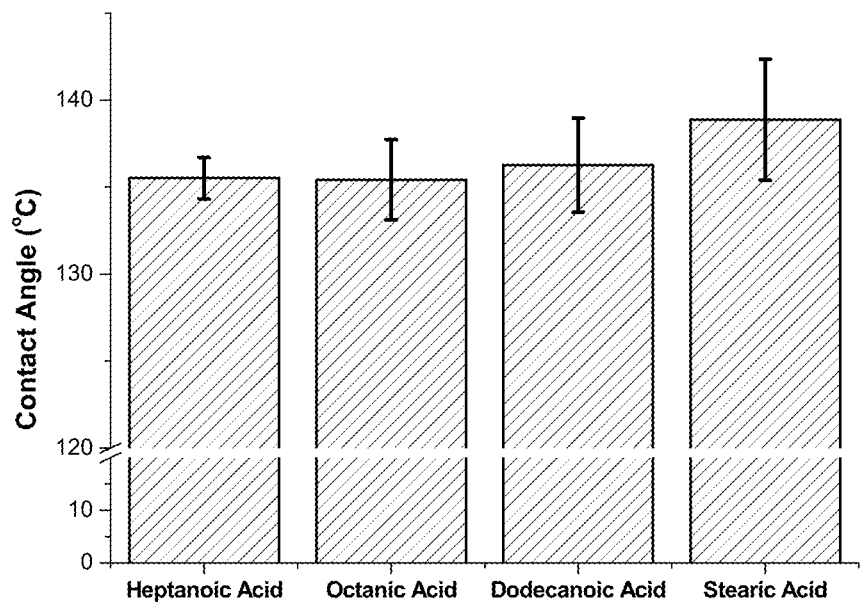
FIG. 43: Graph illustrating effect of fatty chain length on water contact angle.

The effect of fatty chain length on water contact angle was characterized using fatty acids with different chain lengths. Microwave treatment condition was set at 100% power level for 15 min for these experiments. Fatty acids selected for this study were heptanoic acid, octanic acid, dodecanoic acid and stearic acid with carbon atoms in the alkyl chains of 7, 8, 12 and 18, respectively. It was expected that fatty acid with a longer alkyl chain will have a lower surface energy because of the hydrophobicity of the alkyl chain itself. By grafting fatty acyl groups on the surface of cotton, its surface energy (or surface tension) can be significantly reduced without changing the surface topography. And for similar surface roughness, the surface energy has negative relationship with water contact angle. Water contact angle values for the cotton fabric when these fatty acids were grafted are listed in Table 11. It is interesting to note that the water contact angle value showed only a 3.3° difference between them. This is probably due to the fact that only a small number of fatty acyl groups were grafted on to the cotton surface. As a result, the difference in surface energy and the water contact angle is not significant for different fatty acids. However, the data indicate that there may be a positive correlation between the chain length and the water contact angle. If the process is optimized to obtain higher grafting level, higher water contact angles may be obtained making the cotton fabric superhydrophobic. FIG. 43 shows the histogram for the data listed in Table 11.

TABLE 11

Effect of fatty chain length grafted onto cotton on water contact angle

| Specimens | Number of Carbon in fatty chain | Water contact angle (°) Mean | St. Dev. |
|---|---|---|---|
| Heptanoic acid | 7 | 135.51 | 1.19 |
| Octanic acid | 8 | 135.42 | 2.31 |
| Dodecanoic acid | 12 | 136.26 | 2.71 |
| Stearic acid | 18 | 138.87 | 3.48 |

Unpaired t-test was used to determine if the water contact angle values are significantly different between the different fatty acids. Results shown that at 95% confidence interval, the two-tailed P value equals 0.1887, which means there is no statistically significant difference between heptanoic acid and stearic acid treatment.

3.5 Mechanical Property Results

As mentioned previously, the high temperature generated by microwave treatment can cause cellulose (cotton fiber) degradation. To study this, tensile properties of the cotton yarns, both warp and weft, were characterized for fabrics treated under different conditions. The results of the tensile tests are shown in Table 12. Pristine (untreated) cotton yarn showed a tensile fracture stress at break (strength) of 733.4 MPa for warp and 630.2 MPa for weft. After 10 min of microwave treatment and power levels ranging from 30% to 100%, the yarn tensile stress at break underwent a gradual decrease, confirming the cotton fiber degradation. For 100% power level and 10 min microwave treatment, the warp retained 80.3% of its original strength, i.e., lost 19.7%, whereas for weft it was 73.2% strength retention (loss of 26.8%).

TABLE 12

Tensile test results of cotton yarn

| | Tensile Stress at Break (MPa) | | | | | |
|---|---|---|---|---|---|---|
| | Warp | | | Weft | | |
| Specimens | Average | St. Dev. | % Retained | Average | St. Dev. | % Retained |
| Pristine cotton | 733.4 | 49.2 | | 630.1 | 37.8 | |
| 30% Power/10 min | 729.4 | 59.9 | 99.4 | 604.1 | 56.1 | 95.8 |
| 60% Power/10 min | 664.5 | 52.9 | 90.6 | 598.3 | 55.4 | 94.9 |
| 80% Power/10 min | 649.9 | 35.4 | 88.6 | 545.3 | 42.3 | 86.5 |
| 100% Power/10 min | 589.2 | 47.3 | 80.3 | 461.2 | 39.9 | 73.2 |
| 100% Power/3 min | 692.3 | 43.9 | 94.3 | 611.7 | 59.2 | 97.0 |
| 100% Power/6 min | 671.6 | 55.2 | 91.5 | 581.6 | 50.0 | 92.3 |
| 100% Power/15 min | 381.9 | 16.2 | 52.0 | 312.5 | 12.7 | 49.6 |

Figure 44A:
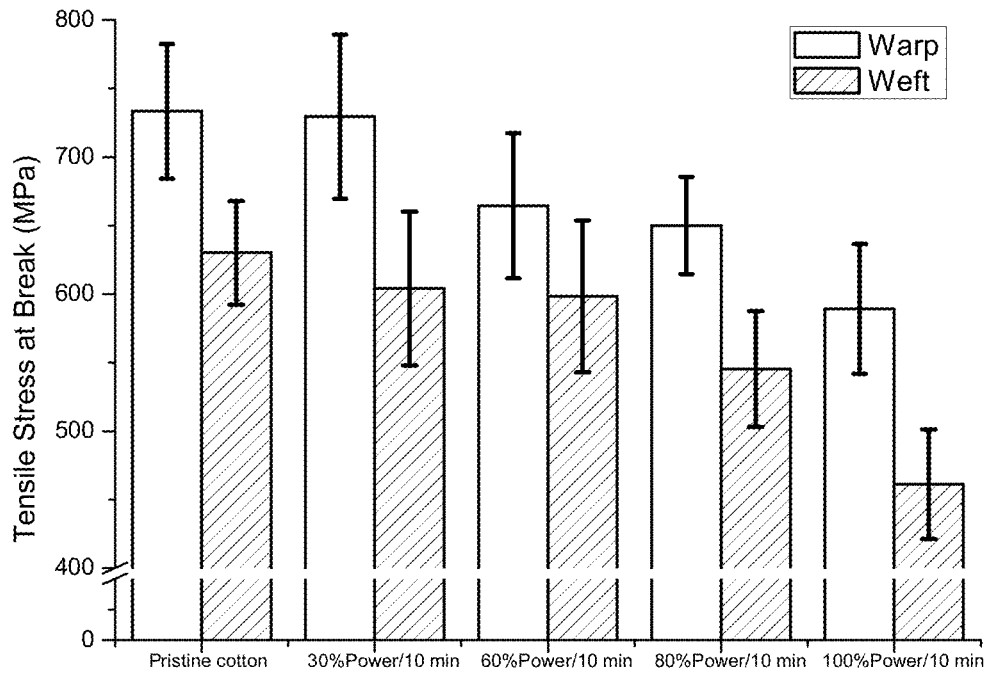
FIGS. 44A-44B: Histograms of tensile test results of cotton yarn.
Figure 44B:
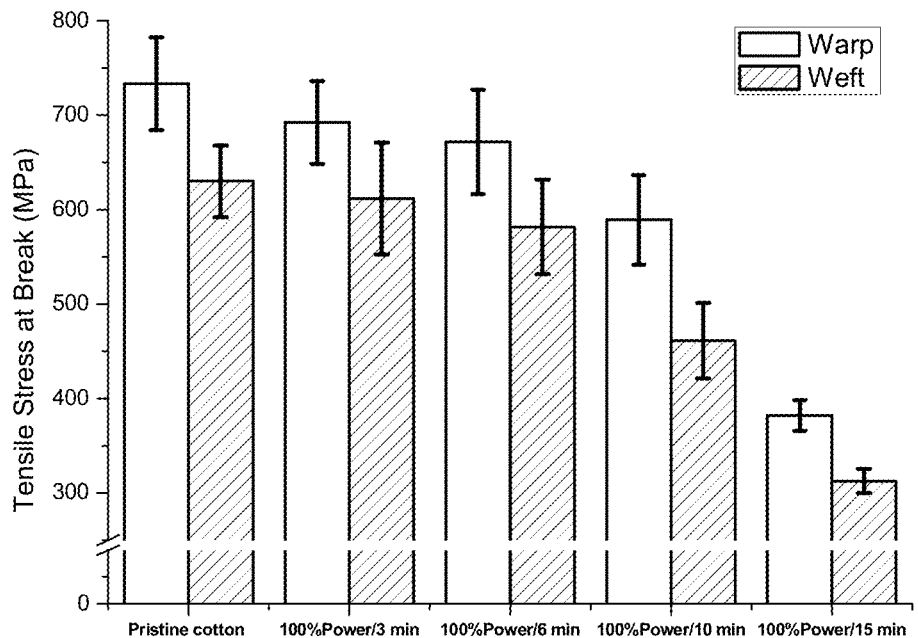

For the treatment at 100% power level of microwave and with times ranging from 3 to 15 min, the yarn tensile fracture stress at break initially underwent a gradual decrease. However, after 15 min of treatment, a significant drop was observed. For cotton yarn exposed to microwave treatment at 100% power level for 15 min, only 52.7% strength retention (loss of 47.3%) for warp and 49.6% strength retention for weft (loss of 50.4%) was observed. These results imply that between the treatment time of 10 to 15 min, reaction temperature reaches the highest point causing serious degradation of cellulose. Thus, these conditions need to be avoided. FIGS. 44A-44B show the histogram of data presented in Table 12 for easy comparison.

3.6 Treatment Durability after Laundering

It is important that the hydrophobic treatment be durable and be able to sustain many launderings without deteriorating or decrease the water contact angle. With a chemically grafted (covalently bonded) fatty acyl chain, however, the durability of the hydrophobic nature of the cotton fabric can be expected to be longer than any physical coating methods. In the present study Tide® detergent was used to evaluate the laundry durability of the hydrophobic treatment. The treated fabric was passed through several successive laundry cycles. Table 13 presents the laundry results of specimens treated with different microwave conditions. As was expected, fabrics treated at higher microwave power level showed higher durability of the treatment, i.e., more laundry cycles were needed before the fabric became hydrophilic. For the 10 min treatment applied at 30% microwave power level, the treated fabric only retained hydrophobicity for 3 laundry cycles. This number increased significantly to 31, for the same time but when 100% power level was applied. Same phenomenon was observed in the case of 100% microwave power level but different treatment times. Fabrics treated for 3 min retained its hydrophobicity for only 3 laundry cycles. However, this number increased to over 35, when the microwave treatment was carried out for 15 min. As stated earlier each cycle in this study was considered to be equivalent to five hand or home launderings (Deng et al., 2010). This means that the 15 min treatment can last for over 175 home launderings and may be considered as permanent.

TABLE 13

Laundry durability of fabric hydrophobicity

| Specimens | Cycle of laundry test | | | Average | St. Dev. |
| --- | --- | --- | --- | --- | --- |
| 30% Power/10 min | 3 | 3 | 3 | 3 | 0 |
| 60% Power/10 min | 10 | 12 | 12 | 11.3 | 1.15 |
| 80% Power/10 min | 23 | 22 | 24 | 23 | 1 |
| 100% Power/10 min | 31 | 29 | 33 | 31 | 2 |
| 100% Power/3 min | 2 | 3 | 3 | 2.67 | 0.57 |
| 100% Power/6 min | 17 | 15 | 17 | 16.3 | 1.15 |
| 100% Power/15 min | 35 | 35 | 37 | 35.7 | 1.15 |

Figure 45:
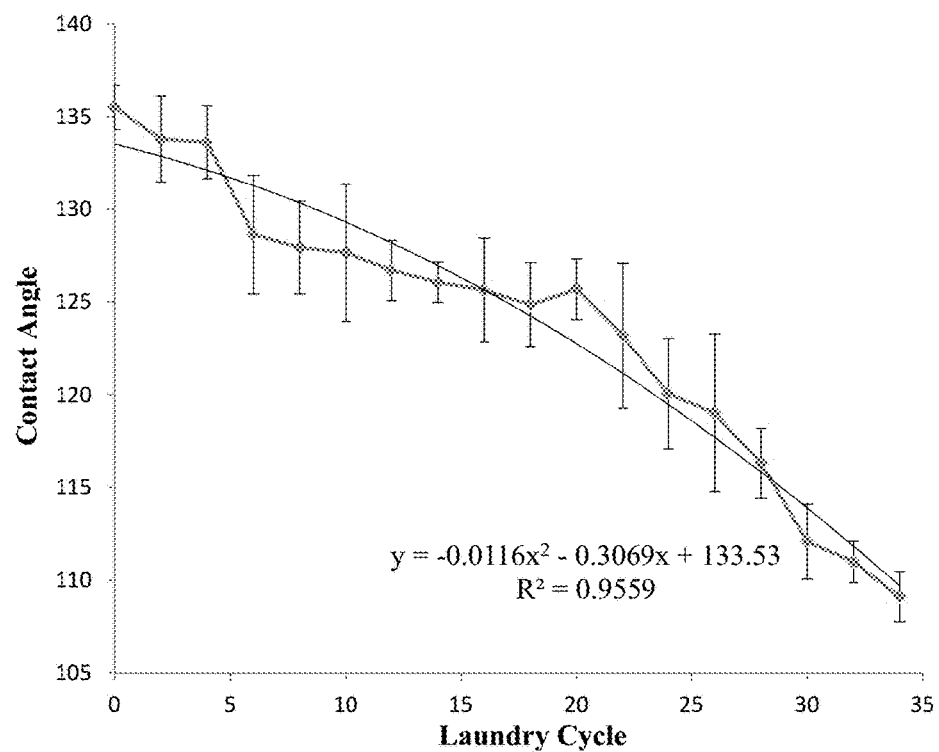
FIG. 45: Graph illustrating change in water contact angle with different laundry cycles.

FIG. 45 shows the change in water contact angle as a function of laundry cycles. It can be seen that the water contact angle values decreased gradually with laundry cycles. When water contact angle approached 105°, the cotton fabric could no longer retain water droplet for 10 seconds, the water droplet was absorbed by cotton fabric. As a result, this condition was classified as non-hydrophobic. The decrease in water contact angle can be possibly explained by the hydrolysis of ester group occurring in the presence of detergent. It may also be due to the cellulase enzymes used in the detergent to degrade and remove the top cellulose layer in cotton. In our case, unfortunately, the top layer is the one that gets grafted and gives the fiber its hydrophobic characteristic. If that is removed, the next layer, that is not grafted, is exposed.

4 Conclusions

Fatty acid was converted to a more reactive form of fatty anhydride, by using acetic anhydride as co-reactant. HPLC and ATR-FTIR spectroscopy were used to successfully track the fatty anhydride conversion process.

With the presence of fatty anhydride, longer microwave heating time and higher power level resulted in higher contact angles of hydrophobic cotton fabrics. Cotton fabric treated in 100% microwave power and 15 min along with fatty anhydride resulted in a water contact angle of over 1370 making it hydrophobic.

Fatty anhydride prepared using either heptanoic acid or stearic acid showed no statistical difference in the hydrophobicity of treated cotton fabrics.

One hundred (100%) power level and 15 min microwave treated cotton fabrics showed laundering durability of up to 37 cycles. However, the yarns showed significant reduction in strength under these conditions; about 50% strength was retained. Since 37 laundering cycles are considered to be equivalent to 185 normal home washings, the hydrophobic treatment presented here can be considered as permanent.

Fatty acid hydrophobic treatment showed no significant effect to fiber surface topography.

REFERENCES

Citation of a reference herein shall not be construed as an admission that such reference is prior art to the present invention. All references cited herein are hereby incorporated by reference in their entirety. Below is a listing of various references cited with respect to this example:

Antova G, Vasvasova P and Zlatanov M (2004) Studies upon the synthesis of cellulose stearate under microwave heating. *Carbohydrate Polymers*, 57(2), 131-134.

Chauvelon G, Saulnier L, Buleon A et al. (1999) Acidic activation of cellulose and its esterification by long-chain fatty acid. *Journal of Applied Polymer Science*, 74(8), 1933-1940.

Christie W W (1993) Preparation of ester derivatives of fatty acids for chromatographic analysis. *Advances in Lipid Methodology*, 2(69), e111.

Dankovich T A and Hsieh Y L (2007) Surface modification of cellulose with plant triglycerides for hydrophobicity. *Cellulose*, 14(5), 469-480.

Deng B, Cai R, Yu Y et al. (2010) Laundering durability of superhydrophobic cotton fabric. *Advanced Materials*, 22(48), 5473-5477.

Edgar K J, Buchanan C M, Debenham J S et al. (2001) Advances in cellulose ester performance and application. *Progress in Polymer Science*, 26(9), 1605-1688.

Heinze T, Liebert T and Koschella A (2006) *Esterification of Polysaccharides*. Springer.

Heinze T, & Glasser, W. G. (1998). *Cellulose derivatives: modification, characterization, and nanostructures* (Vol. 688). An American Chemical Society Publication.

Heinze T and Liebert T (2001) Unconventional methods in cellulose functionalization. *Progress in Polymer Science*, 26(9), 1689-1762.

Heinze U and Wagenknecht W (1998) Comprehensive Cellulose Chemistry: Functionalisation of Cellulose. Hon D N S ed. (1995) *Chemical Modification of Lignocellulosic Materials*. CRC Press.

Jandura P, Kokta B V and Riedl B (2000) Fibrous long-chain organic acid cellulose esters and their characterization by diffuse reflectance FTIR spectroscopy, solid-state CP/MAS 13C-NMR, and X-ray diffraction. *Journal of Applied Polymer Science*, 78(7), 1354-1365.

Klemm D, Heublein B, Fink H P et al. (2005) Cellulose: fascinating biopolymer and sustainable raw material. *Angewandte Chemie International Edition*, 44(22), 3358-3393.

Lai Y K, Chen Z and Lin C J (2011) Recent progress on the superhydrophobic surfaces with special adhesion: from natural to biomimetic to functional. *Journal of Nanoengineering and Nanomanufacturing*, 1(1), 18-34.

Liebert T F and Heinze T (2005) Tailored cellulose esters: synthesis and structure determination. *Biomacromolecules*, 6(1), 333-340.

Maim C J, Mench J W, Kendall D L et al. (1951) Aliphatic acid esters of cellulose. Preparation by acid-chloride-pyridine procedure. *Industrial & Engineering Chemistry*, 43(3), 684-688.

Navard P ed. (2012) The European Polysaccharide Network of Excellence (EPNOE), Springer-Verlag Wien.

Peydecastaing J, Vaca-Garcia C and Borredon E (2009) Consecutive reactions in an oleic acid and acetic anhydride reaction medium. *European Journal of Lipid Science and Technology*, 111(7), 723-729.

Samaranayake G and Glasser W G (1993) Cellulose derivatives with low DS. I. A novel acylation system. *Carbohydrate Polymers*, 22(1), 1-7.

Satge C, Verneuil B, Branland P et al. (2002) Rapid homogeneous esterification of cellulose induced by microwave irradiation. *Carbohydrate Polymers*, 49(3), 373-376.

Vaca-Garcia C, Thiebaud S, Borredon M E et al. (1998) Cellulose esterification with fatty acids and acetic anhydride in lithium chloride/N, N-dimethylacetamide medium. *Journal of the American Oil Chemists' Society*, 75(2), 315-319.

Wang P and Tao B Y (1994) Synthesis and characterization of long-chain fatty acid cellulose ester (FACE). *Journal of Applied Polymer Science*, 52(6), 755-761.

Example 3

Ultrahydrophobic Cotton Based on Halloysite Nanotubes Decorated with Silica Nanospheres and Fatty Acid Abstract Direct assembly of silica nanospheres on halloysite nanotubes for ultrahydrophobic cotton fabrics is shown. The main aim of the present research is to fabricate ultrahydrophobic cotton fabrics using green chemistry. Amine functionalized silica nanospheres were assembled on the surface of halloysite nanotubes (HNTs) and covalently bonded onto the cotton fabrics. Any other particles can also be used in place of HNT in the same fashion to obtain the surface roughness and resulting ultrahydrophobicity. Any other cellulosic fabrics such as viscose rayon can also be treated using the same process. This new approach was designed to create a multiple size roughness on the surface of the fabrics. The covalent bonding of the halloysite nanotubes decorated with silica nanospheres ensures the long term durability of the modified cotton fabrics during wear and washing. It also decreases environmental concerns about the nanoparticles being washed away. Cotton fabrics were given the ultrahydrophobic characteristics by attaching low surface energy chemicals to the cotton fabric surfaces after tailoring the surface morphology of the fabrics to create the desired roughness.

EXPERIMENTAL

Preparation of Halloysite Nanotubes Decorated with Silica Nanospheres

The external surface of the halloysite nanotube is composed of siloxane (Si—O—Si) groups, whereas the internal surface consists of a gibbsite-like array of aluminol (Al—OH) groups (Yuan et al., *The Journal of Physical Chemistry C*, 112:15742 (2008)). 1 g HNT was dispersed in 50 ml ethanol using sonicator for 20 min. 1 ml water, 2 ml ammonium hydroxide and 4 ml Tetraethyl orthosilicate (TEOS) was added to the dispersed HNT solution. This mixture was stirred at 1200 rpm for 30 min and then 2 ml (3-Aminopropyl) triethoxysilane (APTES) was added to the solution to functionalize the nanoparticles with amine groups. It was further purified by centrifuging and washing with ethanol. The centrifuge and washing step was done three times to get rid of all the residual chemicals Covalent Bonding of Amine Functionalized Si Nanoparticles on Cotton Fabrics The purified amine functionalized halloysite nanotubes decorated with silica nanospheres were covalently attached to the cotton fabrics. The secondary hydroxyl groups on the cotton fabrics were oxidized to aldehyde groups using sodium periodate by immersing the fabrics (15 cm×15 cm) in 0.5% solution of $NaIO_4$ solution at 60° C. for 20 min. They were further washed with DI water and dried in an air circulation oven at 80° C. for 1 h. The HNT-Si NP solution was made by dispersing required amounts of amine functionalized halloysite nanotubes decorated with silica nanospheres in ethanol using a sonicator for 15 min. Aldehyde functionalized cotton fabrics were placed in the dispersed nanoparticle solution of required concentration (0.02%-0.5%) and placed in the shaker bath for 1 h and placed in an air circulating oven at 130° C. for 20 min to allow covalent bonding of the silica nanoparticles to the cotton fabrics. The treated fabric was immersed in prepared NP solution again to ensure maximum pick-up of nanoparticles and cured at 100° C. to 130° C. for 10 to 60 min for covalent bonding through the aldehyde and amine (Maillard) reaction. This process may be repeated until the desired nanoparticle pick-up is obtained.

Preparation of Heptanoic Anhydride

A mixture of 26 g of heptanoic acid and 20 g of acetic anhydride were mixed in a Petri dish. After they were thoroughly mixed, the petri dish was covered and placed into a microwave oven (900 W). (Higher power microwave should work as well.) The petri dish containing the mixture was microwave heated at different power levels (50%-100%) and for desired durations (5 min-15 min). Every time after the reaction was completed, the petri dish was taken out from the microwave oven and both the chemical mixture and the microwave oven were allowed to cool to room temperature. Any fatty acid can be converted to respective fatty anhydride using this method.

Preparation of Hydrophobic Cotton Fabrics

The cotton fabric with covalently bonded NP was further treated to graft low surface energy fatty acid. Many fatty acids can be selected. For the present research, heptanoic anhydride solution was selected as a candidate. Heptanoic anhydride solution (10 ml) was sprayed onto fabrics to uniformly coat the fabric with the solution and cured in an air-circulating oven at 150° C. for 30 min. The curing temperature can be varied from 120 to 170° C. and the time can be varied from 2 to 100 mins, as desired. The treated fabrics were then washed using ethanol to wash the residual fatty acid and placed overnight in ethanol to further remove any residual fatty acid and obtain clean fabric. The fabric was then dried at 50° C. for 3 h (can be dried at different temperatures and for different lengths of times as desired) to get rid of any fatty acid odor. No color change was observed in the NP bonded and fatty acid treated fabrics.

Laundering Durability

Laundry durability evaluation was carried out in a modified version according to the American Association of Textile Chemists and Colorists (AATCC) Test Method 61-2003. The test was performed using a 500 mL flask containing 150 mL aqueous solution of Tide® laundry detergent (0.15%, w/w) and 50 stainless steel balls (diameter=6 mm), the test was performed at 49° C., 40 rpm for 45 min. The size of the fabric specimens was 5 cm×5 cm for the test. Each cycle in this study is considered to be equivalent to five home launderings.

Results and Discussion

Characterization of HNT Decorated with Silica Nanospheres

Figure 46A:
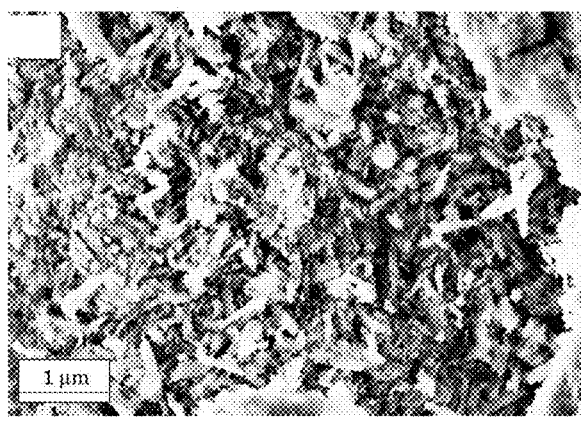
FIGS. 46A-46B: SEM image of Pure HNT (FIG. 46A) and HNT decorated with silica nanospheres (FIG. 46B).
Figure 46B:
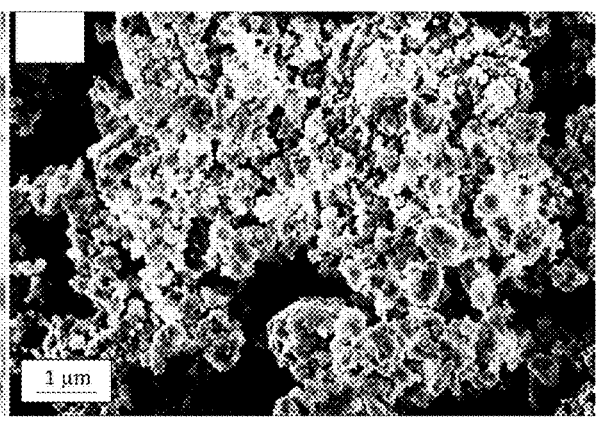
Figure 49:
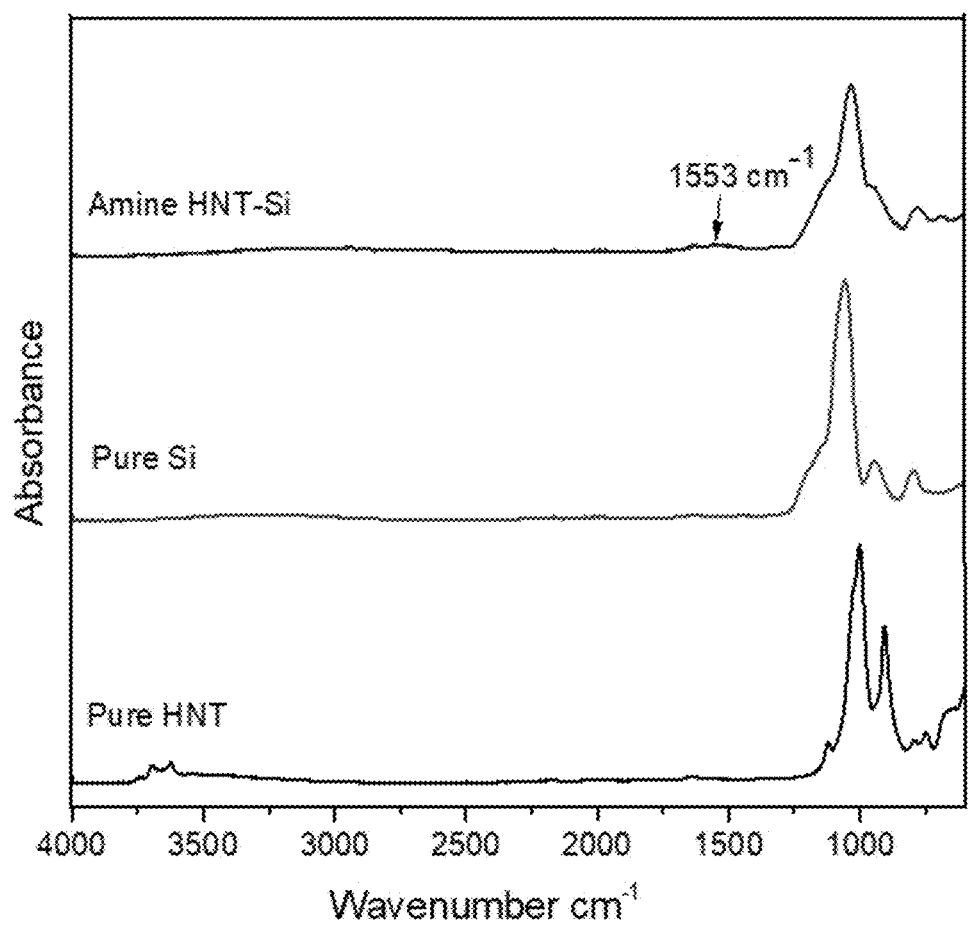
FIG. 49: ATR-FTIR spectra of pure HNT, pure Si nanospheres and amine functionalized HNT decorated with Si nanospheres.
Figure 50A:
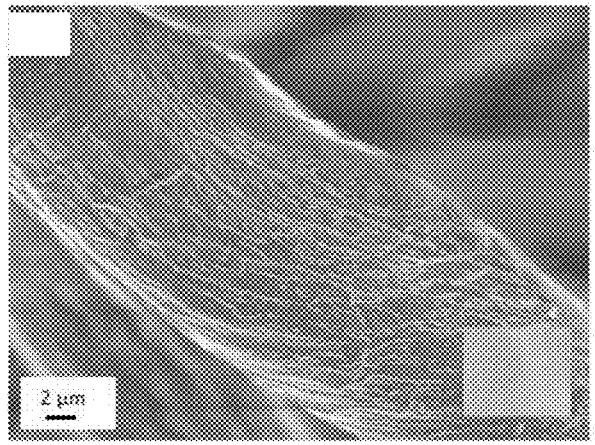
FIGS. 50A-50D: SEM images of hydrophobic treated fabrics with different amounts of HNT decorated with silica nanospheres with photograph of water droplet in the inset.
Figure 50B:
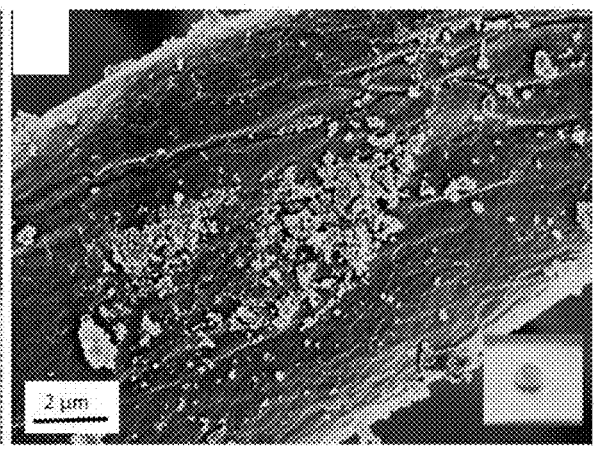
Figure 50C:
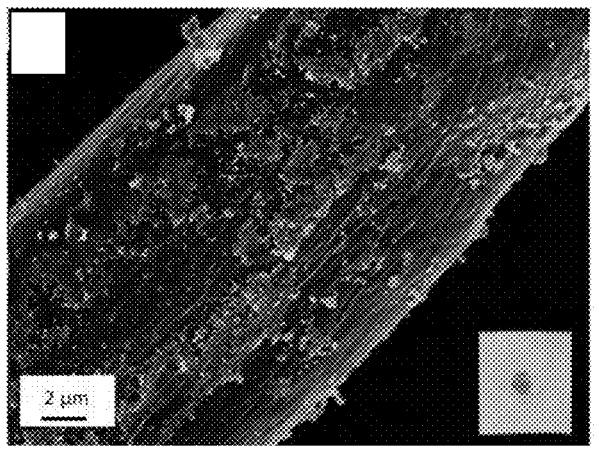
Figure 50D:
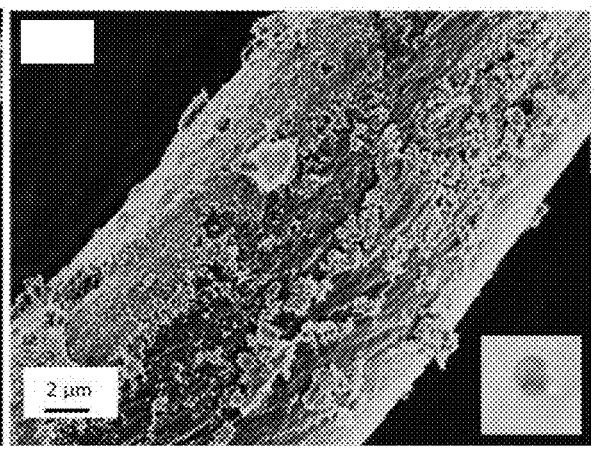

FIGS. 46A-46B show SEM images of pure HNT and HNT decorated with Si nanospheres. As can be seen in FIG. 46A, HNT has hollow tubular structure with average diameter less than 100 nm and length varying from 500 nm to 800 nm. While HNT has been used in this case as an example, any other particles with size ranging from a few nanometers to up to 2 μm (micrometer) with irregular (non-spherical) shapes can work. Any exfoliated nanoclay (Montmorillonite, cloisite, etc.) can work as well. The external surface of HNT is composed of siloxane (Si—O—Si) groups. A layer of Si nanospheres easily gets coated onto the HNT surface due to chemical similarities. FIG. 46B shows that Si nanospheres are formed on the surface. FIGS. 47A-47D and FIGS. 48A-48B show SEM and TEM images of HNT coated with nanospheres at a higher magnification. It was observed that the average diameter of HNT was less than 100 nm after coating and the Si nanospheres with average diameter of 40 nm were formed on HNT, thus forming HNT decorated with Si nanospheres particles. The nanospheres increase the surface roughness of HNT significantly. This, when deposited on cotton fabrics can increase the surface roughness of the cotton fabrics. FIG. 49 shows the ATR-FTIR spectra of the pure HNT, pure Si nanospheres and amine functionalized HNT-Si NP. As seen in FIG. 49, the OH stretching of inner surface of hydroxyl groups is seen at 3656 cm$^{-1}$ and 3618 cm$^{-1}$ (Yuan et al., *The Journal of Physical Chemistry C*, 112:15742 (2008)). No such peak was seen in pure Si. The two peaks between 1000 cm$^{-1}$ and 1115 cm$^{-1}$ in pure HNT is the characteristic in plane and perpendicular Si—O stretching. Pure Si nanospheres also show this peak. As HNT consists of Si—O—Si on the outer surface, Si nanospheres are readily found to assemble on the outer surface of HNT due to chemical similarity through hydrogen bonding. The peaks at 3656 and 3628 cm$^{-1}$ disappeared in HNT-Si NP as HNT was coated with Si nanospheres. It is necessary to form a Si coating around HNT because if hydroxyl groups are exposed, it can attract water, making the fabric hydrophilic. A new peak appears at 1553 cm$^{-1}$ which is due to the amine functionalization of the HNT-Si NP.

Effect of Covalently Bonded Si NP and Hydrophobic Treatment on Cotton Fabrics

Si nanospheres are used to create surface roughness at a nanoscale on the Halloysite nanotubes. The surface roughness created by HNT decorated with Si nanospheres on cotton fabrics is significantly higher than just the Si nanospheres or HNT individually. The fabric still needs to go through the hydrophobic treatment after the covalent bonding of nanoparticles on the surface of the fabric. The grafting of fatty acid (heptanoic acid) lowers the surface energy of the cotton fabrics making it hydrophobic. Optimum combination of surface roughness and lower surface energy is required to achieve ultrahydrophobic cotton surfaces. Table 14 shows the effect of nanoparticle concentration on contact angle of the treated fabrics.

TABLE 14

Effect of NP concentration on contact angle of cotton fabrics

| Treatment | Contact Angle (°) | Std. Dev (°) |
|---|---|---|
| Control: Fatty acid (FA) treatment 150° C. 30 min | 127 | 2.1 |
| 0.1% amine HNT-Si dispersion + FA 150° C. 30 min | 143 | 1.7 |
| 0.3% amine HNT-Si dispersion + FA 150° C. 30 min | 148 | 2.2 |
| 0.5% amine HNT-Si dispersion + FA 150° C. 30 min | 154 | 1.6 |

The fatty acid treatment was same for all the concentrations of NP. FIGS. 50A-50D show the SEM images of hydrophobic treated fabrics with HNT decorated with silica nanospheres. FIGS. 50A-50D show that as the concentration of NP increases, the surface roughness of the cotton fabrics increases which leads to the increase in the contact angle (as seen in Table 14). It was observed that the control fabric (fatty acid treated without any NP) showed the contact angle of 127°. The contact angle increased as the HNT-Si concentration increased from 143° at 0.10% NP concentration to 148° at 0.3% NP concentration. Further increasing the NP concentration to 0.5% makes the cotton fabric ultrahydrophobic with the contact angle of 1540.

Laundry Durability of the Hydrophobic Treated Fabrics

Table 15 shows the effect of laundry durability (up to 5 laundry cycles) of the hydrophobic treatment.

TABLE 15

Effect of hydrophobic treatment on laundry durability

| Specimen | $CA_0$ (°) | $CA_1$ (°) | $CA_3$ (°) | $CA_5$ (°) |
|---|---|---|---|---|
| Control: Fatty acid (FA) treatment (150° C., 30 min) | 127 ± 2.1 | 126 ± 2.7 | 119 ± 1.3 | 120 ± 3.3 |
| 0.1% amine Si dispersion + FA (150° C., 30 min) | 143 ± 1.7 | 142 ± 2.1 | 140 ± 1.2 | 136 ± 1.7 |
| 0.3% amine Si dispersion + FA (150° C., 30 min) | 148 ± 2.2 | 148 ± 3.1 | 144 ± 2.3 | 143 ± 1.3 |
| 0.5% amine Si dispersion + FA (150° C., 30 min) | 154 ± 1.6 | 153 ± 2.3 | 150 ± 1.4 | 149 ± 1.6 |

Each laundry cycle, as mentioned earlier, corresponds to 5 home washings. It was observed that the contact angle decreases with the increasing laundry cycles. Even though the contact angle decreases, the fabrics still maintained their hydrophobic characteristics after 5 laundry cycles. These 5 laundry cycles correspond to 25 home laundry washes. NP are covalently bonded to the fabrics on the aldehyde sites created on the fabrics by oxidation of secondary hydroxyl groups. Fatty anhydrides primarily react with the primary hydroxyl groups on the cotton fabrics forming ester bonds while they react with amine groups on Si NP forming amide bonds. It was observed that the cotton fabric retained its ultrahydrophobic characteristic after 3 cycles. After which it is still found to be hydrophobic.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Citation of a reference herein shall not be construed as an admission that such reference is prior art to the present invention. All references cited herein are hereby incorporated by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

Although the present invention has been described for the purpose of illustration, it is understood that such detail is solely for that purpose and variations can be made by those skilled in the art without departing from the spirit and scope of the invention which is defined by the following claims.

What is claimed is:

1. A process for increasing hydrophobicity of a cellulosic surface, said process comprising:
   providing a cellulosic surface comprising cellulose fibers; and
   grafting a plurality of aliphatic fatty acid molecules onto the cellulosic surface to yield a modified cellulosic surface having increased hydrophobicity,
   wherein said grafting comprises reacting fatty anhydride with hydroxyl groups of the cellulose fibers in order to covalently bond the aliphatic fatty acid molecules to the cellulose fibers, and
   wherein said grafting takes place without using any toxic reagents or without exogenous solvents.

2. The process according to claim 1, wherein the aliphatic fatty acid molecules do not comprising fluorine.

3. The process according to claim 1, wherein heat is applied during the grafting step to facilitate the reaction between the fatty anhydride and the cellulose fibers.

4. The process according to claim 1, wherein the fatty anhydride is prepared by reacting acetic anhydride with a fatty acid having a saturated or unsaturated aliphatic chain of between about 3 and about 38 carbon atoms.

5. The process according to claim 1 further comprising:
   depositing amine-functionalized particles onto the cellulosic surface prior to said grafting step;
   wherein the aliphatic fatty acid molecules of the grafting step do not comprise fluorine, and
   wherein said depositing and grafting steps take place without using any toxic reagents or exogenous solvents.

6. The process according to claim 5, wherein the amine-functionalized particles are amine-silica particles or amine nanotube particles.

7. The process according to claim 5, wherein the amine-functionalized particles are deposited by physical deposition onto the cellulosic surface or by covalent bonding to the cellulose fibers of the cellulosic surface.

8. The process according to claim 5 further comprising:
   treating the cellulosic surface with a crosslinking agent prior to or after depositing the amine-functionalized particles thereon.

9. The process according to claim 8, wherein the crosslinking agent is selected from the group consisting of 1,2,3,4-Butanetetracarboxylic acid (BTCA), oxidized sucrose, oxidized higher sugars including raffinose, stachiose, lactose, maltose, and their combinations, and various molasses.

10. The process according to claim 1 further comprising depositing amine-functionalized particles onto the cellulosic surface.

11. The process according to claim 10, wherein said depositing step is prior to said grafting step.

12. The process according to claim 10, wherein said grafting takes place without using any exogenous solvents.

13. The process according to claim 10, further comprising reacting the fatty anhydride with the amine groups of the amine-functionalized particles to covalently bond aliphatic fatty acid molecules to the amine-functionalized particles.

14. The process according to claim 10, further comprising reacting an acetic anhydride with a fatty acid having a saturated or unsaturated aliphatic chain of between about 4 and about 38 carbon atoms to generate fatty anhydride prior to said grafting step.

15. The process according to claim 10, further comprising covalently bonding the amine functionalized particles on cellulosic surface via a crosslinking agent.

16. The process according to claim 10, wherein the amine-functionalized particles are single sized, dual sized, or multiple sized.

17. The process according to claim 10, wherein the amine-functionalized particles are deposited on the cellulosic surface to form a surface topography having a lotus leaf effect.

* * * * *